United States Patent
Iwashita et al.

(10) Patent No.: US 10,437,107 B2
(45) Date of Patent: *Oct. 8, 2019

(54) LIQUID-CRYSTAL DISPLAY ELEMENT

(71) Applicant: DIC Corporation, Tokyo (JP)

(72) Inventors: Yoshinori Iwashita, Kita-adachi-gun (JP); Shinji Ogawa, Kita-adachi-gun (JP); Hiroshi Hasebe, Kita-adachi-gun (JP); Masanao Takashima, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/033,529

(22) PCT Filed: Oct. 29, 2014

(86) PCT No.: PCT/JP2014/078739
§ 371 (c)(1),
(2) Date: Aug. 22, 2016

(87) PCT Pub. No.: WO2015/064630
PCT Pub. Date: May 7, 2015

(65) Prior Publication Data
US 2016/0349574 A1  Dec. 1, 2016

(30) Foreign Application Priority Data

Oct. 30, 2013 (JP) ................. 2013-225452

(51) Int. Cl.
*G02F 1/1333* (2006.01)
*G02F 1/1337* (2006.01)
(Continued)

(52) U.S. Cl.
CPC ...... *G02F 1/133711* (2013.01); *C09K 19/062* (2013.01); *C09K 19/3003* (2013.01); *C09K 19/3852* (2013.01); *C09K 19/44* (2013.01); *C09K 19/56* (2013.01); *C09K 19/601* (2013.01); *G02F 1/137* (2013.01); *G02F 1/1341* (2013.01); *G02F 1/1368* (2013.01); *G02F 1/13439* (2013.01); *G02F 1/133723* (2013.01); *G02F 1/133784* (2013.01); *G02F 1/133788* (2013.01); *G02F 1/134309* (2013.01); *G02F 1/136286* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01);
(Continued)

(58) Field of Classification Search
CPC ............. C09K 19/062; C09K 19/3003; C09K 19/3852; C09K 19/44; C09K 19/56; C09K 19/601; C09K 2019/0448; C09K 2019/122; C09K 2019/123; C09K 2019/3004; C09K 2019/3009; C09K 2019/301; C09K 2019/3016; C09K 2019/3027; G02F 1/1333; G02F 1/133723; G02F 1/133784; G02F 1/133788; G02F 1/1341; G02F 1/134309; G02F 1/13439; G02F 1/136286; G02F 1/1368; G02F 1/137; G02F 1/133514; G02F 1/1339; G02F 1/13394; G02F 2001/133742; G02F 2001/13398; G02F 2001/134372; G02F 2001/13712; G02F 2201/121; G02F 2201/123
USPC ..................................... 252/299.01
See application file for complete search history.

(56) References Cited

U.S. PATENT DOCUMENTS 6,497,828 B1  12/2002  Hirschmann et al.
8,368,067 B2   2/2013  Uchiyama et al.
(Continued)

FOREIGN PATENT DOCUMENTS

CN  101133138 A  2/2008
CN  101276106 A  10/2008
(Continued)

OTHER PUBLICATIONS

International Search Report dated Jan. 27, 2015, issued in International Application No. PCT/JP2014/079197.
(Continued)

*Primary Examiner* — Geraldina Visconti
(74) *Attorney, Agent, or Firm* — Westerman, Hattori, Daniels & Adrian, LLP

(57) ABSTRACT

An object of the present invention is to provide a liquid-crystal display element using a liquid-crystal composition having negative dielectric anisotropy, capable of realizing excellent display characteristics by being used in a liquid-crystal display element provided with a photo-alignment film, without deteriorating various characteristics as a liquid-crystal display element such as dielectric anisotropy, viscosity, a nematic phase upper limit temperature, nematic phase stability at low temperatures, and γ1, and burn-in characteristics of a display element. A liquid-crystal display element using a liquid-crystal composition containing at least one compound selected from the group consisting of compounds represented by the following General Formula (I) is provided.

[Chem. 1]

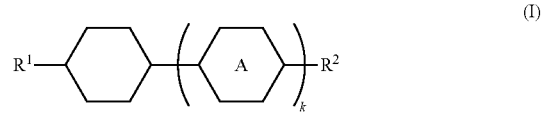

(I)

6 Claims, 9 Drawing Sheets

(51) Int. Cl.

| | | |
|---|---|---|
| C09K 19/30 | (2006.01) | |
| C09K 19/44 | (2006.01) | |
| G02F 1/1343 | (2006.01) | |
| C09K 19/56 | (2006.01) | |
| G02F 1/1341 | (2006.01) | |
| G02F 1/1362 | (2006.01) | |
| G02F 1/1368 | (2006.01) | |
| G02F 1/137 | (2006.01) | |
| C09K 19/06 | (2006.01) | |
| C09K 19/38 | (2006.01) | |
| C09K 19/60 | (2006.01) | |
| C09K 19/12 | (2006.01) | |
| G02F 1/1335 | (2006.01) | |
| G02F 1/1339 | (2006.01) | |
| C09K 19/04 | (2006.01) | |

(52) U.S. Cl.
CPC ........... *C09K 2019/3016* (2013.01); *C09K 2019/3027* (2013.01); *G02F 1/1339* (2013.01); *G02F 1/13394* (2013.01); *G02F 1/133514* (2013.01); *G02F 2001/13398* (2013.01); *G02F 2001/13712* (2013.01); *G02F 2001/133742* (2013.01); *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 8,860,912 | B2 | 10/2014 | Kaneoya et al. |
| 8,885,124 | B2 | 11/2014 | Kaneoya et al. |
| 8,961,823 | B2 | 2/2015 | Gotoh et al. |
| 9,120,968 | B2 | 9/2015 | Kaneoya et al. |
| 9,376,618 | B2 * | 6/2016 | Ogawa .............. C09K 19/12 |
| 9,389,462 | B2 * | 7/2016 | Takeuchi .......... C09K 19/3066 |
| 9,464,229 | B2 * | 10/2016 | Kurisawa .............. C09K 19/42 |
| 2001/0010576 | A1 | 8/2001 | Lee et al. |
| 2001/0048501 | A1 | 12/2001 | Kim et al. |
| 2003/0117558 | A1 | 6/2003 | Kim et al. |
| 2005/0280762 | A1 | 12/2005 | Lee et al. |
| 2006/0257763 | A1 | 11/2006 | Araki |
| 2008/0239181 | A1 | 10/2008 | Jin |
| 2009/0268150 | A1 | 10/2009 | Hattori et al. |
| 2009/0309066 | A1 | 12/2009 | Klasen-Memmer et al. |
| 2010/0140614 | A1 | 6/2010 | Uchiyama et al. |
| 2010/0271569 | A1 | 10/2010 | Ohkuma et al. |
| 2011/0116017 | A1 | 5/2011 | Gere |
| 2011/0193020 | A1 | 8/2011 | Klasen-Memmer et al. |
| 2011/0248216 | A1 | 10/2011 | Klasen-Memmer et al. |
| 2011/0297881 | A1 | 12/2011 | Hirata et al. |
| 2012/0236246 | A1 | 9/2012 | Furusato et al. |
| 2012/0261614 | A1 | 10/2012 | Goto et al. |
| 2012/0268706 | A1 | 10/2012 | Goebel et al. |
| 2012/0326084 | A1 | 12/2012 | Klasen-Memmer et al. |
| 2013/0169906 | A1 | 7/2013 | Nakanishi et al. |
| 2013/0183460 | A1 | 7/2013 | Klasen-Memmer et al. |
| 2013/0193377 | A1 | 8/2013 | Saigusa et al. |
| 2013/0207039 | A1 | 8/2013 | Hattori et al. |
| 2013/0265527 | A1 | 10/2013 | Takeuchi et al. |
| 2014/0104524 | A1 | 4/2014 | Lee et al. |
| 2014/0218667 | A1 | 8/2014 | Miyachi et al. |
| 2015/0002773 | A1 | 1/2015 | Ogawa et al. |
| 2016/0060522 | A1 | 3/2016 | Kurisawa et al. |
| 2016/0272889 | A1 | 9/2016 | Ogawa et al. |
| 2016/0306236 | A1 * | 10/2016 | Iwashita ............... C09K 19/44 |
| 2016/0349574 | A1 | 12/2016 | Iwashita et al. |

FOREIGN PATENT DOCUMENTS

| | | |
|---|---|---|
| CN | 102264867 A | 11/2011 |
| CN | 103476905 A | 12/2013 |
| EP | 2 684 935 A1 | 1/2014 |
| JP | 5170602 A | 6/1976 |
| JP | H11-202356 A | 7/1999 |
| JP | 2000-019321 A | 1/2000 |
| JP | 2000-192040 A | 7/2000 |
| JP | 2002-31812 A | 1/2002 |
| JP | 2002-309255 A | 10/2002 |
| JP | 2003-233083 A | 8/2003 |
| JP | 2005-281559 A | 10/2005 |
| JP | 2006-165528 A | 6/2006 |
| JP | 2006-317602 A | 11/2006 |
| JP | 2007-96055 A | 4/2007 |
| JP | 2009-058546 A | 3/2009 |
| JP | 2009-109542 A | 5/2009 |
| JP | 2009-163014 A | 7/2009 |
| JP | 2010-503733 A | 2/2010 |
| JP | 2010-189560 A | 9/2010 |
| JP | 2010-250117 A | 11/2010 |
| JP | 2010-256509 A | 11/2010 |
| JP | 2010-535910 A | 11/2010 |
| JP | 2011-141356 A | 7/2011 |
| JP | 2011-186043 A | 9/2011 |
| JP | 2013-144796 A | 7/2013 |
| JP | 52-88224 B1 | 9/2013 |
| JP | 2013-173915 A | 9/2013 |
| KR | 10-2012-0048434 A | 5/2012 |
| KR | 2012-0120992 A | 11/2012 |
| TW | 200808943 A | 2/2008 |
| TW | 200819520 A | 5/2008 |
| TW | 2008-29965 A | 7/2008 |
| TW | 200918646 A | 5/2009 |
| TW | 2011-24479 A | 7/2011 |
| TW | 2011-39343 A | 11/2011 |
| TW | 2011-42502 A | 12/2011 |
| TW | 2012-45426 A | 11/2012 |
| TW | 2013-21484 A | 6/2013 |
| TW | 201527497 A | 7/2015 |
| WO | 2010/095506 A1 | 8/2010 |
| WO | 2011/092973 A1 | 8/2011 |
| WO | 2012/053323 A1 | 4/2012 |
| WO | 2012/117875 A1 | 9/2012 |
| WO | 2012/144321 A1 | 10/2012 |
| WO | 2013/024749 A1 | 2/2013 |
| WO | 2013/115164 A1 | 8/2013 |
| WO | 2013/133383 A1 | 9/2013 |

OTHER PUBLICATIONS

K. Nomura, et al. "Room-temperature fabrication of transparent flexible thin-film transistors using amorphous oxide semiconductors", Nature Publishing Group, vol. 432, 2204, p. 488-492.

International Search Report dated Aug. 20, 2013, issued in application No. PCT/JP2013/065713.

International Search Report and Written Opinion dated Aug. 20, 2013, issued in International Application No. PCT/JP2013/065713.

Non-Final Office Action dated Apr. 21, 2017, issued in U.S. Appl. No. 15/035,652.

Non-Final Office Action dated Apr. 26, 2016, issued in U.S. Appl. No. 14/788,874.

Final Office Action dated Sep. 26, 2016, issued in U.S. Appl. No. 14/788,874.

Notice of Allowance dated Mar. 31, 2017, issued in U.S. Appl. No. 14/788,874.

International Search Report dated Jan. 27, 2015, issued in International Application No. PCT/JP2014/079196 (1 page).

Final Office Action dated Aug. 15, 2017, issued in U.S. Appl. No. 15/033,535.

Final Office Action dated Aug. 16, 2017, issued in U.S. Appl. No. 15/035,652.

Non-Final Office Action dated Sep. 6, 2017, issued in U.S. Appl. No. 15/035,354.

Non-Final Office Action dated Feb. 27, 2017, issued in U.S. Appl. No. 15/035,354.

Non-Final Office Action dated Jan. 13, 2017, issued in U.S. Appl. No. 15/033,535.

International Search Report issued in PCT/JP2014/078739 dated Jan. 20, 2015.

(56) References Cited

OTHER PUBLICATIONS

Non-Final Office Action dated Jan. 2, 2018, issued in U.S. Appl. No. 15/033,535.
International Search Report dated Dec. 10, 2013, issued in application No. PCT/JP2013/076806.
Non Final Office Action dated Mar. 7, 2016, issued in U.S. Appl. No. 14/405,057.
Written opinion dated Dec. 10, 2013, issued in application No. PCT/JP2013/076805.
International Search Report dated Jan. 20, 2015, issued in application No. PCT/JP2014/078738.
Young Jin Lim et al., "High performance transflective liquid crystal display associated with fringe-field switching device", Optics Express, Apr. 25, 2014, vol. 19, No. 9, pp. 8085-8091.

\* cited by examiner

LIQUID-CRYSTAL DISPLAY ELEMENT

TECHNICAL FIELD

The present invention relates to a liquid-crystal display device provided with a photo-alignment film, using a nematic liquid-crystal composition having negative dielectric anisotropy.

BACKGROUND ART

From the fact that display quality is excellent, active matrix type liquid-crystal display elements have been put on the market for portable terminals, liquid-crystal televisions, projectors, computers and the like. In the active matrix type, TFT (thin film transistor), MIM (metal-insulator-metal), or the like is used for each pixel, and it is important that the liquid-crystal compound or the liquid-crystal composition used in this type has a high voltage holding ratio. In addition, a liquid-crystal display element obtained by combining a VA (Vertical Alignment) mode, an IPS (In Plane Switching) mode, and an OCB (Optically Compensated Bend, Optically Compensated Birefringence) mode to obtain wider viewing angle characteristics and an ECB (Electrically Controlled Birefringence) mode reflective liquid-crystal display element to obtain a brighter display have been proposed. To cope with such a liquid-crystal display element, currently, proposals on a new liquid-crystal compound or liquid-crystal composition are made.

At present, as the liquid-crystal display for smartphones, a fringe field switching mode liquid-crystal display device (FFS mode liquid-crystal display device) with high quality which is one type of an IFS mode liquid-crystal display element excellent in visual characteristics is widely used (refer to PTLs 1 and 2). The FFS mode is a mode introduced for improving the low opening ratio and transmittance of the IFS mode, and as the liquid-crystal composition used, a material using a p-type liquid-crystal composition having positive dielectric anisotropy is widely used from the viewpoint of easily lowering a voltage. In addition, since most applications of the FFS mode are for portable terminals, more power saving is strongly demanded, and liquid-crystal element manufacturers are continuously per forming active development such as adoption of array using IGZO.

In addition, as the alignment method of the liquid-crystal molecules, a method called a rubbing method is widely used. In this method, by rubbing the surface of the alignment film in a certain direction by rotating a roller wrapped with cloth such as nylon or the like with respect to a thin film obtained by applying an alignment film material such as polyimide and firing the applied material while pushing with a constant pressure, an alignment restricting force is imparted to the liquid-crystal molecules. The exact alignment mechanism of this method is still not clear, and since there are problems that streaky display unevenness occurs by rubbing the surface of the alignment film, a part of the alignment film material falls off, and then, is mixed into the liquid-crystal layer, and TFT is destroyed by static electricity generated in the array substrate, an alignment imparting method in which rubbing is not performed has been studied. In particular, since alignment can be imparted in a non-contact manner with respect to a photo-alignment film obtained by imparting anisotropy to an alignment film by using ultraviolet rays linearly polarized light, development of the photo-alignment film has been progressing as a method for solving the problems of the rubbing method, and the use of the photo-alignment film has been sought even in a horizontal electric field type display element (refer to PTL 3).

CITATION LIST

Patent Literature

[PTL 1] JP-A-11-202356
[PTL 2] JP-A-2003-233083
[PTL 3] JP-A-2013-109366

SUMMARY OF INVENTION

Technical Problem

When comparing a vertical electric field type such as the VA mode described above and a horizontal electric field type such as the IPS mode or the FFS mode described above, both are significantly different in all of the electrode structure, the direction of alignment, the orientation of the electric field, and the optical properties required. In particular, since the FFS mode liquid-crystal display element is characterized by the structure of an electrode, there is no knowledge regarding the problems that the effects will be difficult to be predicted from the techniques in the related art, as burn-in or drip marks. In addition, the IPS mode and the FFS mode are the same in the large category of the horizontal electric field type, but are different in the electrode structure, the direction of alignment, and the orientation of the electric field. Accordingly, in the case where the liquid-crystal composition used for VA is simply used in the FFS mode, it is difficult to configure a liquid-crystal display element having high performance as is demanded these days, and an optimized n-type liquid-crystal composition using a photo-alignment film has been demanded.

In addition, in the horizontal electric field type liquid-crystal display element using an n-type material, it is necessary to arrange the liquid-crystal molecules vertical to the longitudinal direction of strip shape electrodes, and it was confirmed that, if rubbing is performed vertically to the longitudinal direction of the electrodes, problems that rubbing irregularity is inevitably increased due to unevenness of the electrode, and an alignment restricting force with respect to the liquid-crystal molecules is significantly reduced, occur. In addition, the problem of drip marks considered to be caused by rubbing irregularity also occurs.

Furthermore, in PTL 3, it is described that, when an electric field is not applied, the liquid-crystal molecules are aligned by a photo-alignment film in which an acute angle α between the long axis direction of the liquid-crystal molecule and the direction (x-direction) of extension or the scanning signal lines is 75 to 85 degrees, and if a potential difference is applied between the pixel electrode and the common electrode, an electric field (so-called horizontal electric field) which mainly has a component parallel to the liquid-crystal layer with respect to the substrate plane (xy plane) is applied, and thus, the long axis direction of the liquid-crystal molecules of the liquid-crystal layer is arranged along the electric force lines. Therefore, it is possible to grasp that the invention of PTL 3 is an IFS mode using a p-type liquid-crystal composition from the fact that the electric force lines and the long axis direction of the liquid-crystal molecules are identical.

However, in the IFS mode using a p-type liquid-crystal composition as shown in PTL 3, problems of a low opening ratio and transmittance occur. Furthermore, in the case of using a p-type material as shown in PTL 3, even if reduction of light transmittance by coloring the alignment film which is an object of the literature can be improved, a new problem of reduction of transmittance that the long axis of the liquid-crystal molecules close to the pixel electrode is inclined along the electric field of the edge, and thus transmittance is decreased occurs.

However, by the alignment film being a photo-alignment film, it is possible to reduce the decrease in alignment properties with respect to the liquid-crystal molecules due to rubbing irregularity, and it is possible to provide a liquid-crystal display element having excellent transmittance characteristics.

In addition, a thin film transistor and a transparent electrode layer are formed on a substrate, and an alignment film is formed thereon. If performing alignment processing by a rubbing method which is a contact method, random scratches are formed on the surface of the alignment film by rubbing. In particular, in the first substrate on which a thin film transistor or a transparent electrode layer pattern has been formed, deeper scratches due to steps due to the thin film transistor or the transparent electrode layer pattern and the diameter (several tens of μm) of the fiber of buff cloth of the rubbing roller are likely to be formed along the steps. Since, at the areas where the scratches have been formed, the liquid-crystal molecules can not be arrayed in a certain direction at the time when the electric field is turned off, light leakage occurs in the liquid-crystal panel at the time of displaying black. As a result, a contrast of equal to or greater than a certain value is less likely to be obtained.

Furthermore, in the resolution mode called 4K recently put into practical use, with the calculation example of a 40-inch panel, 1 pixel size is 0.23 mm. In addition, in the resolution mode called 8K recently put into practical use, with the calculation example of a 40-inch panel, 1 pixel size is fine to the extent of 0.11 mm. That is, since 1 pixel size is close to the diameter of a fiber of a buff cloth of the rubbing roller, there is a concern that, by the scratches formed at the time of being subjected to alignment processing by a rubbing method, in a pixel unit or an intermittent pixel array unit, the areas where the liquid-crystal molecules cannot be arrayed in a certain direction at the time when the electric field is turned off are generated, and a significant decrease in contrast due to a large amount of light leakage at the time of displaying black or a large number of display defects is caused.

An object of the present invention is to solve the above problems and to provide a liquid-crystal display element using an n-type liquid-crystal composition capable of realizing excellent display characteristics by being used in a liquid-crystal display element provided with a photo-alignment film, which is excellent in various characteristics as a liquid-crystal display element such as dielectric anisotropy (Δε), viscosity (η), a nematic phase-isotropic liquid transition temperature ($T_{NI}$), nematic phase stability at low temperatures, and rotational viscosity ($\gamma_1$).

Another object of the present invention is to achieve a clear black display in which there is no light leakage and the contrast is high since scratches are not generated on the surface of the alignment film by performing alignment processing in a non-contact manner by a photo-alignment method.

Solution to Problem

As a result of diligent studies to solve the above problems and examining various configurations of the liquid-crystal compositions and the photo-alignment films optimal for a liquid-crystal display element, the present inventors completed the present invention.

The present invention provides a liquid-crystal display element having a first substrate and a second substrate disposed to face each other, a liquid-crystal layer containing a liquid-crystal composition with which the gap between the first substrate and the second substrate is filled, an electrode layer including a common electrode including a transparent conductive material, a plurality of gate bus lines and data bus lines disposed in a matrix shape, a thin film transistor provided at the intersection at which the gate bus lines and the data bus lines intersect each other, and a pixel electrode including a transparent conductive material and forming an electric field between the common electrode and the pixel electrode by being driven by the thin film transistor, for each pixel on the first substrate, and photo-alignment film layers, which are formed between the liquid-crystal layer and the first substrate and between the liquid-crystal layer and the second substrate, respectively, in which the liquid-crystal composition has negative dielectric anisotropy, a nematic phase-isotropic liquid transition temperature of equal to or higher than 60° C., and an absolute value of the dielectric anisotropy of equal to or greater than 2, and contains at least one compound selected from the group consisting of compounds represented by the following General Formula (I).

[Chem. 1]

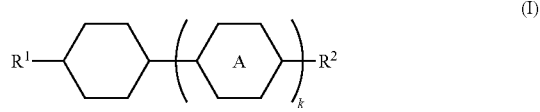

(I)

In the formula, each of $R^1$ and $R^2$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2, and in a case where k is 2, two A's may be the same as or different from each other.

Advantageous Effects of Invention

In the liquid-crystal display element of the present invention, since a photo-alignment film is used, the liquid-crystal display element has excellent high speed response, a feature in which generation of display defects is low, and excellent display characteristics. The liquid-crystal display element of the present invention is useful for a display element of a liquid-crystal TV, a monitor, or the like. In the liquid-crystal display element of the present invention, since a photo-alignment film is used, it is possible to provide a liquid-crystal display element having excellent transmittance characteristics.

DESCRIPTION OF EMBODIMENTS

Figure 1:
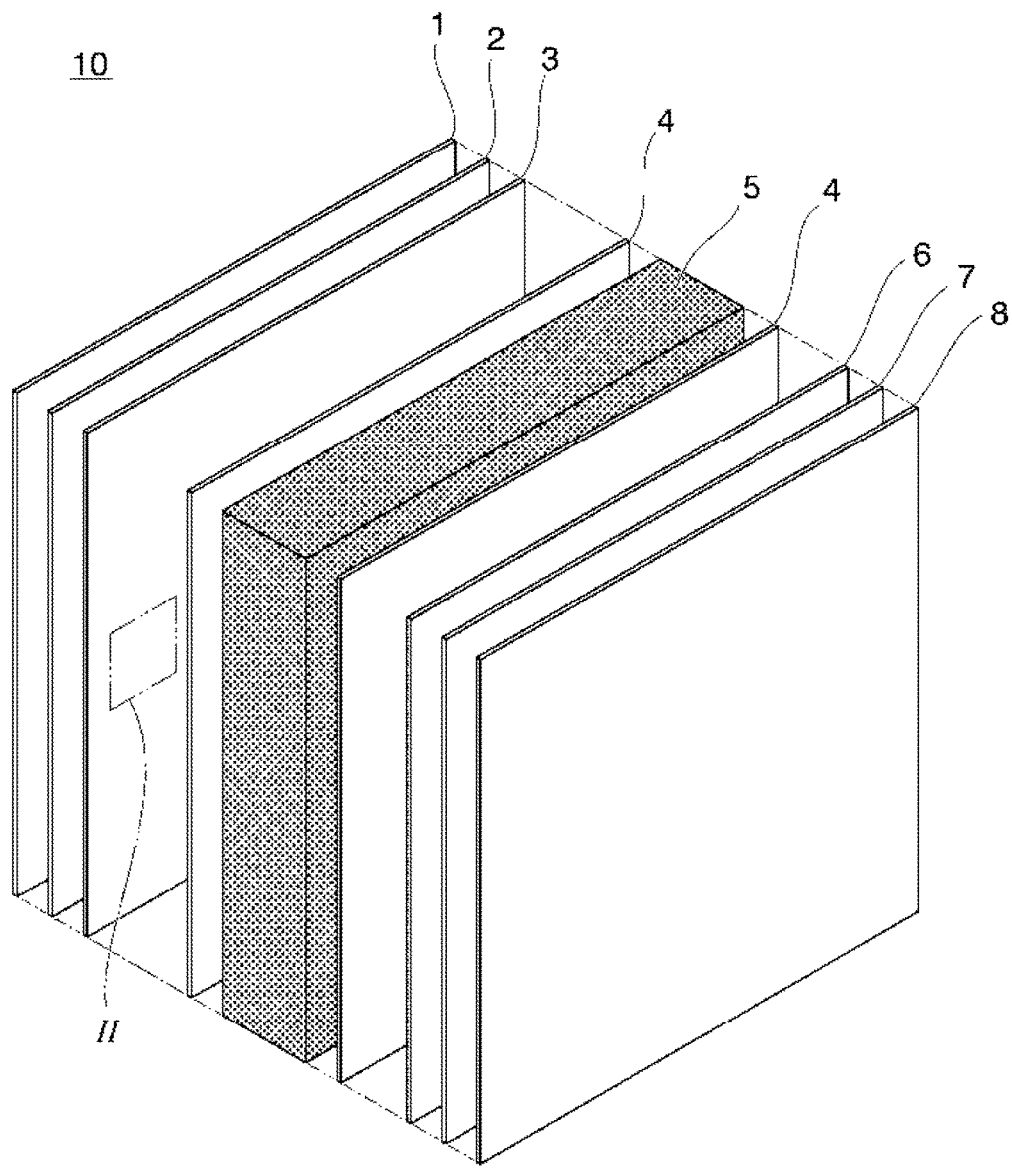
FIG. 1 is a view schematically showing one example of a configuration of a liquid-crystal display element of the present invention.

As described above, the present invention provides an n-type liquid-crystal composition optimal for a liquid-crystal display element provided with a photo-alignment film. A first embodiment of the present invention provides a liquid-crystal display element having a first substrate and a second substrate disposed to face each other, a liquid-crystal layer containing a liquid-crystal composition with which the gap between the first substrate and the second substrate is filled, an electrode layer including a common electrode including a transparent conductive material, a plurality of gate bus lines and data bus lines disposed in a matrix shape, a thin film transistor provided at the intersection at which the gate bus lines and the data bus lines intersect each other, and a pixel electrode including a transparent conductive material and forming an electric field between the common electrode and the pixel electrode by being driven by the thin film transistor, for each pixel on the first substrate, and photo-alignment film layers which are formed between the liquid-crystal layer and the first substrate and between the liquid-crystal layer and the second substrate, respectively, in which the liquid-crystal composition contains at least one type of compound selected from the compound group represented by the following General Formula (I), which has negative dielectric anisotropy, a nematic phase-isotropic liquid transition temperature of equal to or higher than 60° C., and an absolute value of the dielectric anisotropy of equal to or greater than 2.

[Chem. 2]

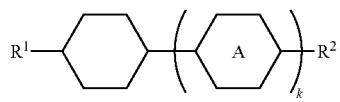

(I)

In the formula, each of $R^1$ and $R^2$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2, and in a case where k is 2, two A's may be the same as or different from each other.

In the present invention, by the alignment film being a photo-alignment film, it is possible to reduce the decrease in alignment properties with respect to the liquid-crystal molecules due to rubbing irregularity, and it is possible to provide a liquid-crystal display element having excellent transmittance characteristics. Since scratches are not generated on the surface of the alignment film, by performing alignment processing in a non-contact manner by a photo-alignment method, it is possible to achieve a clear black display in which there is no light leakage and the contrast is high. In addition, since light leakage can be reduced even in a case of the VA mode liquid-crystal display element having large viewing angle dependence, by using a photo-alignment film, it is possible to reduce the problems of the viewing angle dependence.

As the configuration elements of the liquid-crystal display element according to the present invention, a pair of substrates, an electrode layer, a liquid-crystal layer, and a photo-alignment film layer are essential elements. Hereinafter, respective configuration elements will be described in detail.

(Liquid-Crystal Layer)

One embodiment of the liquid-crystal composition of the present invention will be described below. The liquid-crystal composition of the present invention is preferably applied to a horizontal electric field type liquid-crystal display element of an IFS mode or an FFS mode or a vertical electric field type liquid-crystal display element of a VA mode. In addition, the liquid-crystal layer according to the present invention is a layer including a liquid-crystal composition, and the average thickness of the liquid-crystal layer is preferably 2 to 10 μm, and more preferably 2.5 to 6.0 μm.

As described above, the liquid-crystal composition of the present invention necessarily includes the compound represented by General Formula (I). As a first component, one type or two or more types of compounds represented by General Formula (I) are contained. In addition, as described below, the liquid-crystal composition of the present invention may further contain at least one type of compound selected from the group consisting of the compounds represented by General Formula (II) and the compounds represented by General Formula (IV).

[Chem. 3]

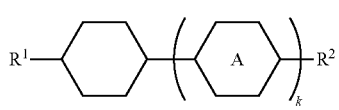

(I)

In General Formula (I), each of $R^1$ and $R^2$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2, and in a case where k is 2, two A's may be the same as or different from each other.

The lower limit value of the total content of the compound represented by General Formula (I) is preferably 5% by mass, more preferably 10% by mass, still more preferably 15% by mass, particularly preferably 20% by mass, and most preferably 25% by mass, and the upper limit value thereof is preferably 65% by mass, more preferably 55% by mass, still more preferably 50% by mass, particularly preferably 47% by mass, and most preferably 45% by mass, with respect to the content of the entirety of compositions.

Specific examples of the compounds represented by General Formula (I) include compounds represented by the compound group represented by each of the following General Formulas (I-a) to (I-e).

[Chem. 4]

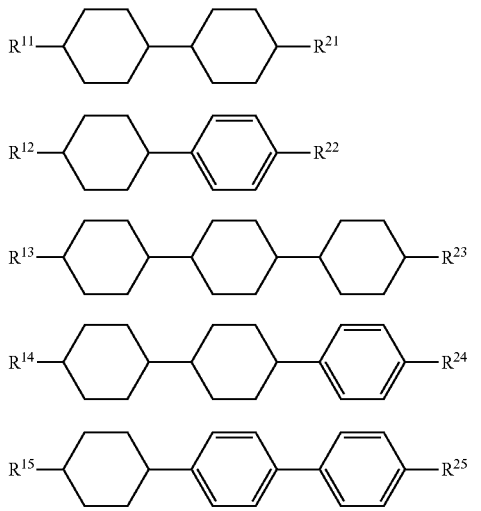

In General Formulas (I-a) to (I-e), each of $R^{11}$ to $R^{15}$ and $R^{21}$ to $R^{25}$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

In a case where the compounds selected from the compound group represented by each of General Formulas (I-a) to (I-e) are contained, one to ten types thereof are preferably contained, one to eight types thereof are particularly preferably contained, one to five types thereof are particularly preferably contained, and two or more types thereof are also preferably contained.

Each of $R^{11}$ to $R^{15}$ and $R^{21}$ to $R^{25}$ independently represents preferably an alkyl group having 1 to 8 carbon atoms, an alkenyl group having 2 to 8 carbon atoms, or an alkoxy group having 2 to 8 carbon atoms, and more preferably an alkyl group having 1 to 5 carbon atoms, an alkenyl group having 2 to 5 carbon atoms, or an alkoxy group having 2 to 5 carbon atoms, and in the case of representing an alkenyl group, the structures represented by each of the following Formulas (i) to (iv) are preferable.

[Chem. 5]

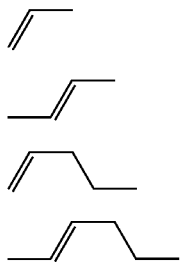

In the formulas, the right terminal is bonded to the ring structure.

$R^{11}$ and $R^{21}$, $R^{12}$ and $R^{22}$, $R^{13}$ and $R^{23}$, $R^{14}$ and $R^{24}$, and $R^{15}$ and $R^{25}$ may be the same as or different from each other, but it is preferable to represent different substituents.

From these points of view, for example, as the compound represented by General Formula (I), at least one type of compound selected from the compound group represented by the following General Formula (III) is preferably contained.

[Chem. 6]

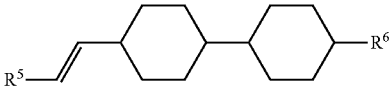

In the formula, $R^5$ represents a hydrogen atom or a methyl group, and $R^6$ represents an alkyl group having 1 to 5 carbon atoms, an alkenyl group having 2 to 5 carbon atoms, or an alkoxy group having 1 to 4 carbon atoms.

As the compound represented by General Formula (III) according to the present invention, more specifically, the compounds described below are preferable.

[Chem. 7]

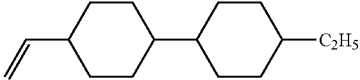

(III-a1)

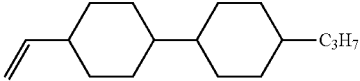

(III-a2)

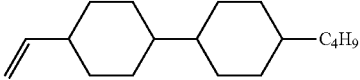

(III-a3)

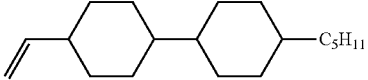

(III-a4)

[Chem. 8]

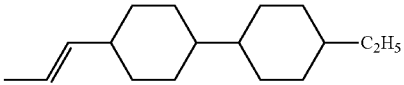

(III-b1)

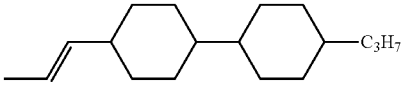

(III-b2)

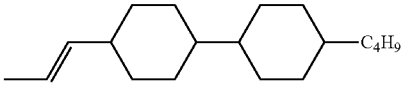

(III-b3)

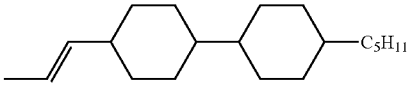

(III-b4)

In a case where the compound represented by General Formula (III) according to the present invention is contained, the lower limit value of the content of the compound represented by General Formula (III) in the liquid-crystal composition is preferably 5% by mass, more preferably 15% by mass, still more preferably 20% by mass, particularly preferably 23% by mass, and most preferably 25% by mass, and the upper limit value thereof is preferably 70% by mass, more preferably 60% by mass, still more preferably 55% by mass, particularly preferably 52% by mass, and most preferably 50% by mass. More specifically, in a case where the response speed is regarded as important, the lower limit value thereof is preferably 20% by mass, more preferably 30% by mass, still more preferably 35% by mass, particularly preferably 38% by mass, and most preferably 35% by mass, and the upper limit value thereof is preferably 70% by mass, more preferably 60% by mass, still more preferably 60% by mass, particularly preferably 52% by mass, and most preferably 50% by mass, and in a case where the driving voltage further is regarded as important, the lower limit value thereof is preferably 5% by mass, more preferably 15% by mass, still more preferably 20% by mass, particularly preferably 23% by mass, and most preferably 25% by mass, and the upper limit value thereof is preferably 60% by mass, more preferably 50% by mass, still more preferably 45% by mass, particularly preferably 42% by mass, and most preferably 40% by mass. Regarding the proportion of the compound represented by General Formula (III), the lower limit value of the content of the compound represented by General Formula (III) is preferably 60% by mass, more preferably 70% by mass, still more preferably 75% by mass, particularly preferably 78% by mass, and most preferably 80% by mass, and the upper limit value thereof is preferably 90% by mass, more preferably 95% by mass, still more preferably 97% by mass, particularly preferably 99% by mass, and preferably 100% by mass, with respect to the total content of the compound represented by General Formula (I) in the liquid-crystal composition.

In addition, as the compounds represented by each of General Formulas (I-a) to (I-e) other than the compounds represented by General Formula (III), more specifically, the compounds described below are preferable.

[Chem. 9]

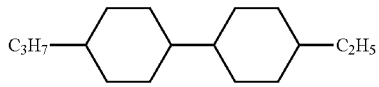
(I-a1)

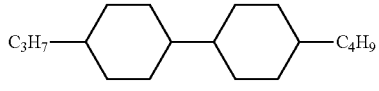
(I-a2)

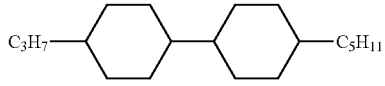
(I-a3)

[Chem. 10]

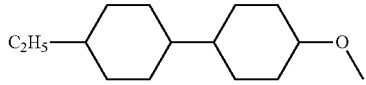
(I-a4)

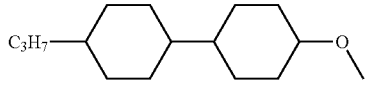
(I-a5)

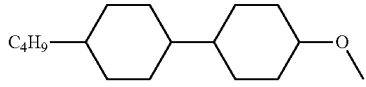
(I-a6)

-continued

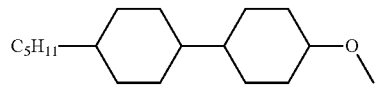
(I-a7)

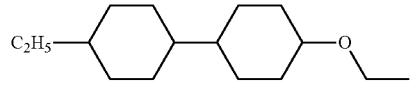
(I-a8)

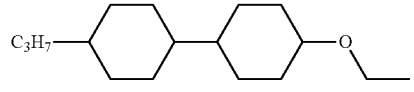
(I-a9)

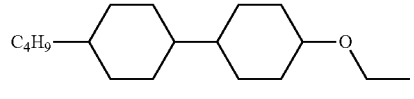
(I-a10)

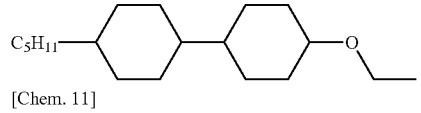
(I-a11)

[Chem. 11]

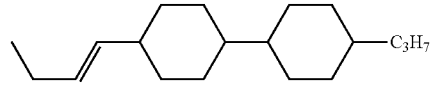
(I-a12)

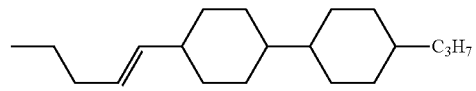
(I-a13)

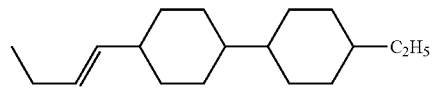
(I-a14)

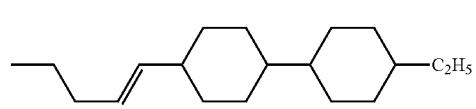
(I-a15)

[Chem. 12]

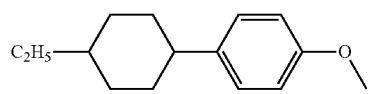
(I-b1)

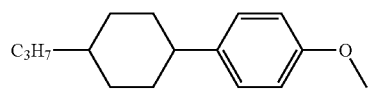
(I-b2)

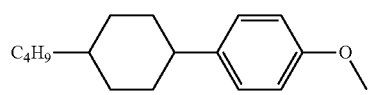
(I-b3)

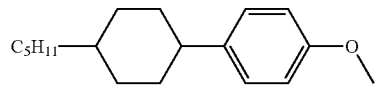
(I-b4)

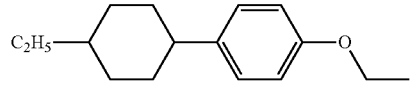
(I-b5)

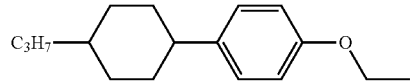
(I-b6)

-continued (I-b7)
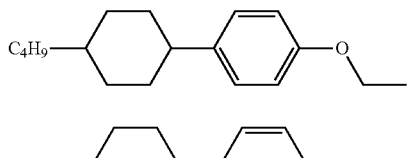

(I-b8)

[Chem. 13]

(I-c1)
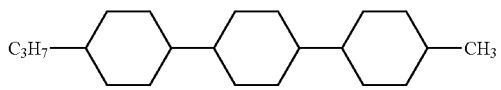

(I-c2)

[Chem. 14]

(I-d1)

(I-d2)

(I-d3)
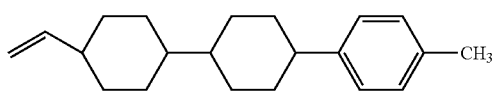

[Chem. 15]

(I-e1)
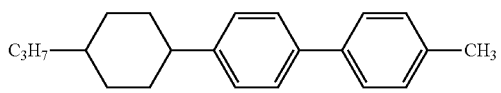

(I-e2)

Among these, the compounds represented by each of Formulas (III-a2), (III-b2), (I-a1) to (I-a6), (I-b2), (I-b6), (I-d1), (I-d2), (I-d), and (I-e2) are preferable.

The liquid-crystal composition of the present invention may further include the compound represented by General Formula (II). As a second component, one type or two or more types of compounds represented by General Formula (II) may be contained, and more preferably, the liquid-crystal composition of the present invention may further include at least one type of compound selected from the group consisting of the compounds represented by General Formula (II) and the compounds represented by General Formula (IV).

[Chem. 16]

(II)
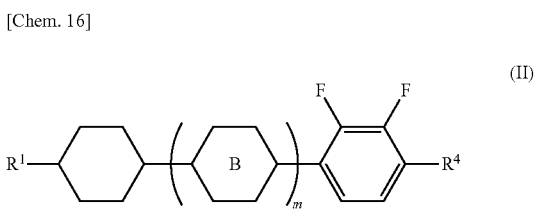

In General Formula (II), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, B represents a 1,4-phenylene group or a trans-1,4-cyclohexylene group, m represents 0, 1, or 2, and in a case where m is 2, two B's may be the same as or different from each other.

The lower limit value of the content of the compound represented by General Formula (II) in the liquid-crystal composition is preferably 10% by mass, more preferably 20% by mass, still more preferably 25% by mass, particularly preferably 28% by mass, and most preferably 30% by mass, and the upper limit value thereof is preferably 85% by mass, more preferably 75% by mass, still more preferably 70% by mass, particularly preferably 67% by mass, and most preferably 65% by mass.

As the compound represented by General Formula (II), at least one or more types are preferably selected, and two or more types are more preferably selected, from among the compound group represented by each of the following General Formulas (IIa) to (IIc).

[Chem. 17]

(IIa)
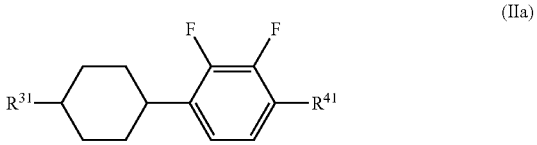

(IIb)
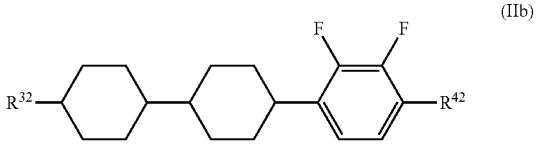

(IIc)
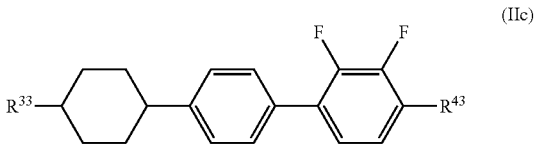

In the formulas, each of $R^{31}$ to $R^{33}$ has the same meaning as $R^3$ in General Formula (II) and each of $R^{41}$ to $R^{43}$ has the same meaning as $R^4$ in General Formula (II).

Specifically, the compounds represented by General Formula (IIa) are preferably the compounds represented by each of the following Formulas (IIa-1) to (IIa-8).

[Chem. 18]

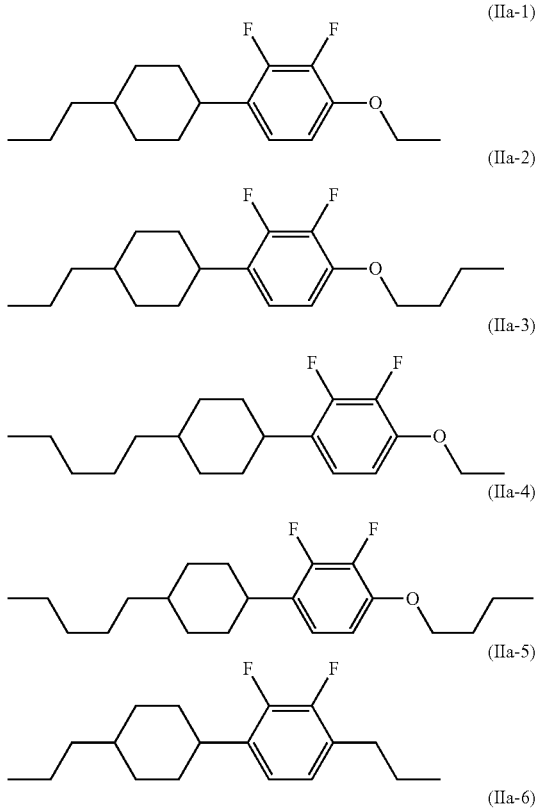

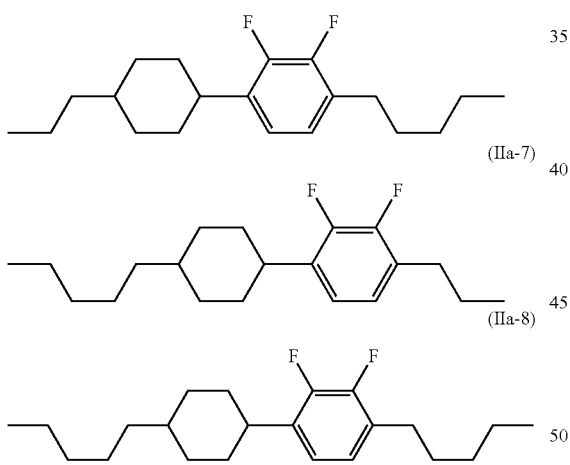

The compounds represented by each of Formulas (IIa-1) to (IIa-4) are more preferable, and the compounds represented by Formula (IIa-1) or (IIa-3) are still more preferable.

The lower limit value of the compound represented by General Formula (IIa) is preferably 2% by mass and more preferably 3% by mass, and the upper limit value thereof is preferably 45% by mass, more preferably 35% by mass, still more preferably 30% by mass, particularly preferably 27% by mass, and most preferably 25% by mass.

In a case where four or more types of compounds represented by General Formula (IIa) are used, the compounds represented by each of Formulas (IIa-1) to (IIa-4) are preferably used in combination, and the content of the compounds represented by each of Formulas (IIa-1) to (IIa-4) is preferably equal to or greater than 50% by mass, more preferably equal to or greater than 70% by mass, and still more preferably equal to or greater than 80% by mass, with respect to the compounds represented by General Formula (IIa).

In a case where three types of compounds represented by General Formula (IIa) are used, the compounds represented by Formula (IIa-1), (IIa-2), or (IIa-3) are preferably used in combination, and the content of the compounds represented by Formula (IIa-1), (IIa-2), or (IIa-3) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IIa).

In a case where two types of compounds represented by General Formula (IIa) are used, the compounds represented by Formula (IIa-1) or (IIa-3) are preferably used in combination, and the content of the compounds represented by Formula (IIa-1) or (IIa-3) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IIa).

Specifically, the compounds represented by General Formula (IIb) are preferably the compounds represented by each of the following Formulas (IIb-1) to (IIb-6).

[Chem. 19]

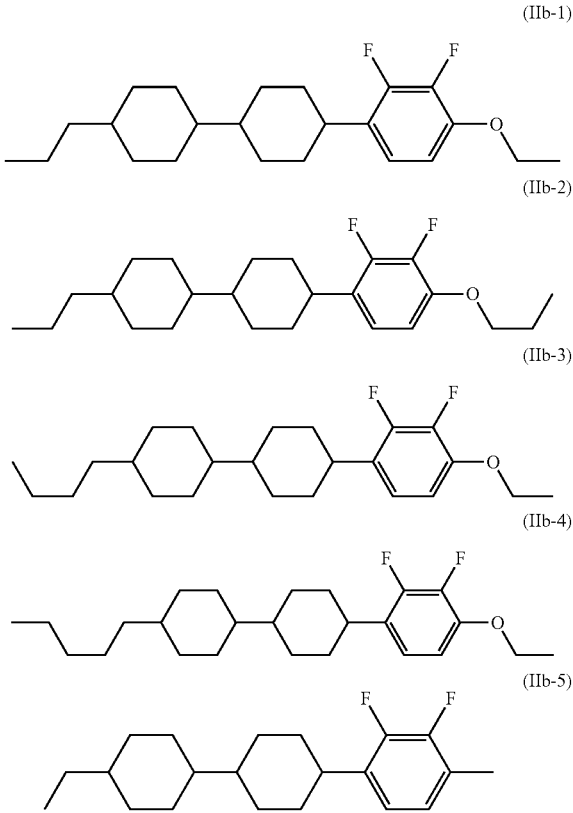

(IIb-6)

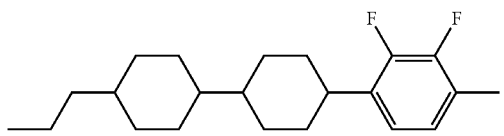

The compounds represented by each of Formulas (IIb-1) to (IIb-4) are more preferable, the compounds represented by each of Formulas (IIb-1) to (IIb-3) are Formula (IIb-1) or (IIb-3) are particularly preferable.

In a case where four or more types of compounds represented by General Formula (IIb) are used, the compounds represented by each of Formulas (IIb-1) to (IIb-4) are preferably used in combination, and the content of the compounds represented by each of Formulas (IIb-1) to (IIb-4) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IIb).

In a case where three types of compounds represented by General Formula (IIb) are used, the compounds represented by each of Formulas (IIb-1) to (IIb-3) are preferably used in combination, and the content of the compounds represented by each of Formulas (IIb-1) to (IIb-3) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IIb).

In a case where two types of compounds represented by General Formula (IIb) are used, the compounds represented by Formula (IIb-1) or (IIb-3) are preferably used in combination, and the content of the compounds represented by Formula (IIb-1) or (IIb-3) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IIb).

Specifically, the compounds represented by General Formula (IIc) are preferably the compounds represented by each of the following Formulas (IIc-1) to (IIc-4).

[Chem. 20]

(IIc-1)

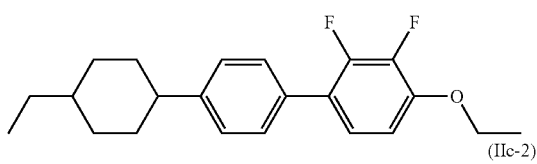

(IIc-2)

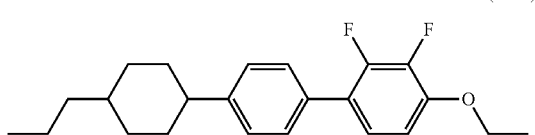

(IIc-3)

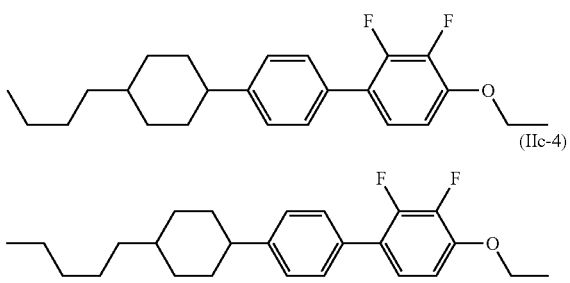

(IIc-4)

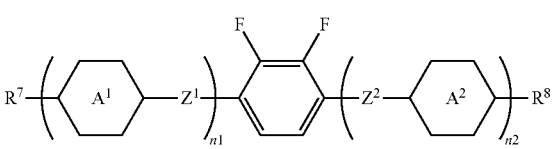

Furthermore, the compounds represented by Formula (IIc-1) or (IIc-2) are preferable.

In a case where two or more types of compounds represented by General Formula (IIc) are used, the compounds represented by Formula (IIc-1) or (IIc-2) are preferably used in combination, and the content of the compounds represented by Formula (IIc-1) or (IIc-2) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IIc).

The liquid-crystal composition of the present invention may further include the compound represented by General Formula (IV). As a third component, one type or two or more types of compounds represented by General Formula (IV) may be contained, and more preferably, the liquid-crystal composition of the present invention may further include at least one type of compound selected from the group consisting of the compounds represented by General Formula (II) and the compounds represented by General Formula (IV). Here, the compound represented by General Formula (II) is not included in the compound represented by General Formula (IV).

[Chem. 21]

(IV)

$$R^7 \left( A^1 \right) Z^1 \underset{n1}{\left( \underset{F}{\underset{|}{\bigcirc}} \underset{F}{\underset{|}{\bigcirc}} \right)} Z^2 \left( A^2 \right) \underset{n2}{\phantom{|}} R^8$$

In the formula, each of $R^7$ and $R^8$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, any methylene group in the alkyl group, the alkenyl group, the alkoxy group, or the alkenyloxy group may be substituted with an oxygen atom as long as the oxygen atom is not continuously bonded to another oxygen atom or may be substituted with a carbonyl group as long as the carbonyl group is not continuously bonded to another carbonyl group, each of $A^1$ and $A^2$ independently represents a 1,4-cyclohexylene group, a 1,4-phenylene group, or a tetrahydropyran-2,5-diyl group, in a case where $A^1$ or/and $A^2$ represent a 1,4-phenylene group, one or more hydrogen atoms in the 1,4-phenylene group may be substituted with a fluorine atom, each of $Z^1$ and $Z^2$ independently represents a single bond, —OCH$_2$—, —OCF$_2$—, —CHO—, or CF$_2$O—, each of $n^1$ and $n^2$ independently represents 0, 1, 2, or 3, $n^1$+$n^2$ is 1 to 3, and in a case where a plurality of $A^1$'s, $A^2$'s, $Z^1$'s, and/or $Z^2$'s are present, these may be the same as or different from each other, with the proviso that a compound in which $n^1$ is 1 or 2, $n^2$ is 0, at least one of $A^1$'s is a 1,4-cyclohexylene group, and all $Z^1$'s are single bonds is excluded.

The lower limit value of the content of the compound represented by General Formula (IV) in the liquid-crystal composition is preferably 2% by mass, more preferably 3% by mass, still more preferably 4% by mass, and particularly preferably 5% by mass, and the upper limit value thereof is preferably 45% by mass, more preferably 35% by mass, still more preferably 30% by mass, particularly preferably 27% by mass, and most preferably 25% by mass.

In General Formula (IV), when the bonding ring structure is cyclohexane or tetrahydropyran, each of $R^7$ and $R^8$ is preferably an alkyl group or an alkenyl group, and when the bonding ring structure is benzene, each of $R^7$ and $R^8$ is preferably an alkyl group, an alkoxy group, or an alkenyl group. When the bonding ring structure is cyclohexane or tetrahydropyran, each of $R^7$ and $R^8$ preferably represents an alkyl group having 1 to 8 carbon atoms or an alkenyl group having 2 to 8 carbon atoms, more preferably represents an alkyl group having 1 to 8 carbon atoms, more preferably represents an alkyl group having 3 to 5 carbon atoms, and still more preferably represents an alkyl group having 3 or 5 carbon atoms, and is preferably linear. In addition, in General formula (IV), when the bonding ring structure is benzene, each of $R^7$ and $R^8$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represents an alkyl group having 1 to 8 carbon atoms or an alkoxy group having 1 to 8 carbon atoms, more preferably represents an alkyl group having 3 to 5 carbon atoms or an alkoxy group having 2 to 4 carbon atoms, more preferably represents an alkyl group having 3 or 5 carbon atoms or an alkoxy group having 2 or 4 carbon atoms, and still more preferably represents an alkoxy group having 2 or 4 carbon atoms, and is preferably linear.

In the present invention, in a case where the improvement of response speed of the liquid-crystal display element is regarded as important, an alkenyl group is preferable, and in a case where the reliability of a voltage holding ratio is regarded as important, an alkyl group is preferable. As the alkenyl group, the structures represented by each of the following Formulas (i) to (iv) are preferable.

[Chem. 22]

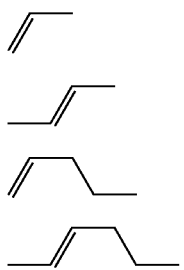

(i)

(ii)

(iii)

(iv)

In the formulas, the right terminal is bonded to the ring structure.

Each of $A^1$ and $A^2$ is independently preferably a 1,4-cyclohexylene group, a 1,4-phenylene group, or a tetrahydropyran-2,5-diyl group.

In a case where the reduction of viscosity is regarded as important, each of $Z^1$ and $Z^2$ is independently preferably a single bond, and in a case where the increase in the absolute value of Δε is regarded as important, —OCH$_2$—, —OCF$_2$—, —CH$_2$O—, or —CF$_2$O— is preferable, and the oxygen atom is preferably disposed so as to be connected to 2,3-difluorobenzene-1,4-diyl group.

$n^1$+$n^2$ is preferably equal to or less than 2, and in a case where the reduction of viscosity is regarded as important, $n^1$+$n^2$ is preferably 1, and in a case where $T_{Ni}$ is regarded as important or the increase in Δn is regarded as important, $n^1$+$n^2$ is preferably 2.

The compound represented by General Formula (IV) is preferably selected from the compound group represented by each of the following General Formulas (IVa1) and (IVa2).

[Chem. 23]

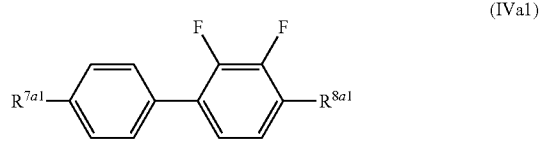

(IVa1)

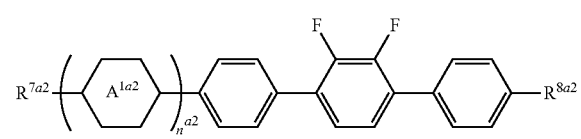

(IVa2)

In the formulas, each of $R^{7a1}$, $R^{7a2}$, $R^{8a1}$, and $R^{8a2}$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, any methylene group in the alkyl group, the alkenyl group, the alkoxy group, or the alkenyloxy group may be substituted with an oxygen atom as long as the oxygen atom is not continuously bonded to another oxygen atom or may be substituted with a carbonyl group as long as the carbonyl group is not continuously bonded to another carbonyl group, $n^{a2}$ represents 0 or 1, $A^{1a2}$ represents a 1,4-cyclohexylene group, a 1,4-phenylene group, or a tetrahydropyran-2,5-diyl group, and one or more hydrogen atoms in the 1,4-phenylene group of General Formulas (IVa1) and (IVa2) may be substituted with a fluorine atom.

Specifically, the compounds represented by General Formula (IVa1) are preferably the compounds represented by each of the following Formulas (IVa1-1) to (IVa1-8).

[Chem. 24]

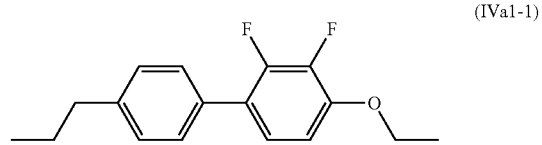

(IVa1-1)

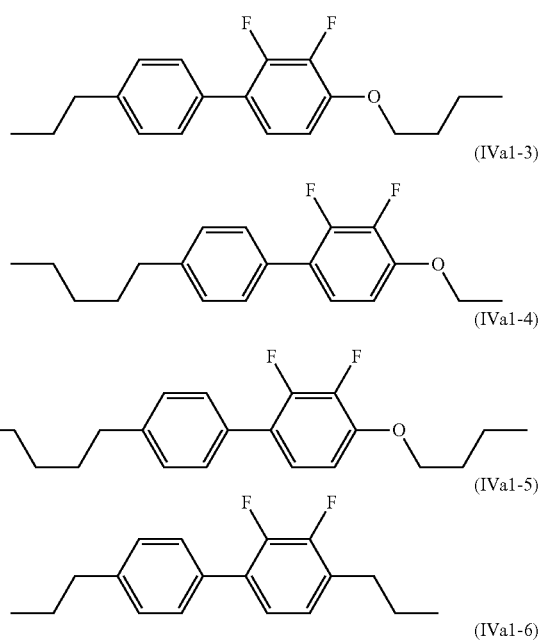

The compounds represented by each of Formulas (IVa1-1) to (IVa1-4) are more preferable, the compounds represented by each of Formulas (IVa1-1) to (IVa1-3) are still more preferable, and the compounds represented by Formula (IVa1-1) are particularly preferable.

In a case where four or more types of compounds represented by General Formula (IVa1) are used, the compounds represented by each of Formulas (IVa1-1) to (IVa1-4) are preferably used in combination, and the content of the compounds represented by each of Formulas (IVa1-1) to (IVa1-4) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IVa1).

In a case where three types of compounds represented by General Formula (IVa1) are used, the compounds represented by each of Formulas (IVa1-1) to (IVa1-3) are preferably used in combination, and the content of the compounds represented by each of Formulas (IVa1-1) to (IVa1-3) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IVa1).

In a case where two types of compounds represented by General Formula (IVa1) are used, the compounds represented by Formula (IVa1-1) or (IVa1-3) are preferably used in combination, and the content of the compounds represented by Formula (IVa1-1) or (IVa1-3) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compounds represented by General Formula (IVa1).

Specifically, the compounds represented by General Formula (IVa2) are preferably the compounds represented by each of the following General Formulas (IVa2-1) to (IVa2-9).

[Chem. 25]

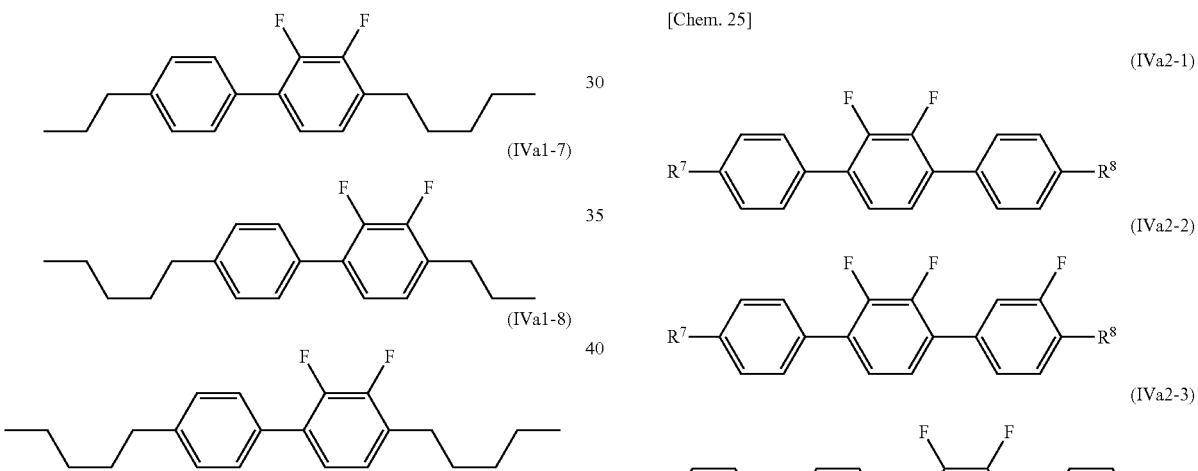

-continued

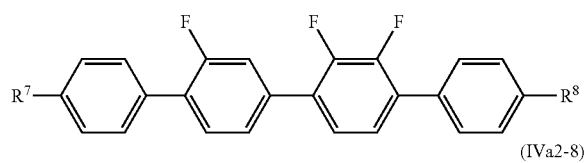
(IVa2-7)

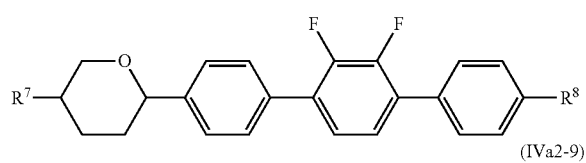
(IVa2-8)

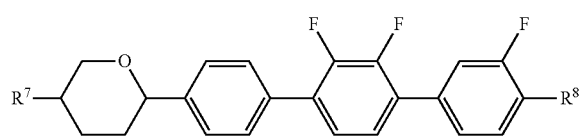
(IVa2-9)

In the formulas, $R^7$ has the same meaning as $R^7$ in General Formula (IV), and $R^8$ has the same meaning as $R^8$ in General Formula (IV).

In a case where the compound represented by General Formula (IVa2) is used, the compound represented by Formula (IVa2-1) is preferably used, and the content of the compound represented by Formula (IVa2-1) is preferably equal to or greater than 50% by mass, more preferably equal to or greater than 70% by mass, still more preferably equal to or greater than 80% by mass, particularly preferably equal to or greater than 85% by mass, and most preferably equal to or greater than 90% by mass, with respect to the compound represented by General Formula (IVa2).

In General formula (IVa2), each of $R^7$ and $R^8$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represents an alkyl group having 1 to 8 carbon atoms or an alkenyl group having 2 to 8 carbon atoms, more preferably represents an alkyl group having 2 to 5 carbon atoms or an alkenyl group having 2 to 5 carbon atoms, and still more preferably represents an alkyl group having 2 to 5 carbon atoms, and is preferably linear. In a case where both $R^7$ and $R^8$ are alkyl groups, the numbers of carbon atoms of the alkyl groups are preferably different.

In more detail, compounds in which $R^7$ represents a propyl group and $R^8$ represents an ethyl group, or compounds in which $R^7$ represents a butyl group and $R^8$ represents an ethyl group are preferable.

In the application, a 1,4-cyclohexyl group is preferably a trans-1,4-cyclohexyl group.

In a case where the liquid-crystal composition of the present invention include the compound represented by General Formula (I) or (II), the liquid-crystal composition can further contain the compound represented by General Formula (IV) (here, the compound represented by General Formula (II) is exclude). The total content of the compounds represented by General Formula (I), (II), or (IV) contained in the liquid-crystal composition is preferably 80% to 100% by mass, more preferably 85% to 100% by mass, still preferably 90% to 100% by mass, particularly preferably 95% to 100% by mass, and most preferably 97% to 100% by mass, The lower limit value of the total content of the compounds represented by General Formula (I) or (II) contained in the liquid-crystal composition of the present application is preferably 55% by mass, more preferably 65% by mass, still more preferably 70% by mass, particularly preferably 73% by mass, and most preferably 75% by mass, and the upper limit value thereof is preferably 85% by ass, more preferably 90% by mass, still more preferably 92% by mass, particularly preferably 94% by mass, and most preferably 95% by mass.

In a case where the liquid-crystal composition of the present invention includes the compound represented by General Formula (I) or (IV), the liquid-crystal composition can further contain the compound represented by General Formula (II) (here, the compound represented by General Formula (IV) is exclude). The total content of the compounds represented by General Formula (I), (II), or (IV) contained in the liquid-crystal composition is preferably 80% to 100% by mass, more preferably 85% to 100% by mass, still more preferably 90% to 100% by mass, particularly preferably 95% to 100% by mass, and most preferably 97% to 100% by mass, The lower limit value of the total content of the compounds represented by General Formula (I) or (IV) contained in the liquid-crystal composition of the present application is preferably 55% by mass, more preferably 65% by mass, still more preferably 70% by mass, particularly preferably 73% by mass, and most preferably 75% by mass, and the upper limit value thereof is preferably 85% by mass, more preferably 90% by mass, still more preferably 92% by mass, particularly preferably 94% by mass, and most preferably 95% by mass.

The liquid-crystal composition of the present invention preferably does not contain a compound having a structure in which oxygen atoms in the peracid (—CO—OO—) structure or the like in a molecule are bonded to each other.

In a case where the reliability or the long-term stability of the liquid-crystal composition is regarded as important, the content of a compound having a carbonyl group is preferably equal to or less than 5% by mass, more preferably equal to or less than 3% by mass, and still more preferably equal to or less than 1% by mass, with respect to the total mass of the composition, and it is preferred that the compound having a carbonyl group is not contained substantially.

The content of a compound in which all the ring structures in the molecule are 6-membered rings is preferably increased, and the content of the compound in which all the ring structures in the molecule are 6-membered rings is preferably equal to or greater than 80% by mass, more preferably equal to or greater than 90% by mass, and still more preferably equal to or greater than 95% by mass, with respect to the total mass of the composition, and it is most preferable that the liquid-crystal composition is substantially constituted of only the compound in which all the ring structures in the molecule are 6-membered rings.

To suppress the deterioration due to oxidation of the liquid-crystal composition, the content of a compound having a cyclohexenylene group as a ring structure is preferably decreased, and the content of the compound having a cyclohexenylene group is preferably equal to or less than 10% by mass and more preferably equal to or less than 5% by mass with respect to the total mass of the composition, and it is still more preferred that the compound having a cyclohexenylene group is not contained substantially.

To suppress the deterioration due to oxidation of the liquid-crystal composition, the content of a compound having —CH=CH— as a connecting group is preferably decreased, and the content of the compound is preferably equal to or less than 10% by mass and more preferably equal to or less than 5% by mass with respect to the total mass of the composition, and, it is still more preferred that the compound is not contained substantially.

In a case where the improvement of viscosity or $T_{NI}$ is regarded as important, the content of a compound having a 2-methylbenzene-1,4-diyl group in which a hydrogen atom may be substituted with halogen in the molecule is preferably decreased, and the content of the compound having a 2-methylbenzene-1,4-diyl group in the molecule is preferably equal to or less than 10% by mass and more preferably equal to or less than 5% by mass with respect to the total mass of the composition, and it is still more preferred that the compound having a 2-methylbenzene-1,4-diyl group is not contained substantially.

In a case where the compound contained in the composition of the present invention has an alkenyl group as a side chain, and in a case where the alkenyl group is bonded to cyclohexane, the number of carbon atoms in the alkenyl group is preferably 2 to 5, and in a case where the alkenyl group is bonded to benzene, the number of carbon atoms in the alkenyl group is preferably 4 or 5, and it is preferable that the unsaturated bond of the alkenyl group and benzene are not directly bonded. In addition, in a case where the stability of the liquid-crystal composition is regarded as important, the content of a compound having an alkenyl group as a side chain and a 2,3-difluorobenzene-1,4-diyl group is preferably decreased, and the content of the compound is preferably equal to or less than 10% by mass and more preferably equal to or less than 5% by mass with respect to the total mass of the composition, and it is still more preferred that the compound is not contained substantially.

The value of the dielectric anisotropy Δε of the liquid-crystal composition of the present invention is negative dielectric anisotropy, and the absolute value of the dielectric anisotropy is equal to or greater than 2. The value of the dielectric anisotropy Δε at 25° C. is preferably −2.0 to −6.0, more preferably −2.5 to −5.0, and particularly preferably −2.5 to −4.0, and in more detail, in a case where the response speed is regarded as important, the value is preferably −2.5 to −3.4, and in a case where the driving voltage is regarded as important, the value is preferably −3.4 to −4.0.

In addition, in the liquid-crystal composition according to the present invention, the compound represented by General Formula (I) may be referred to as a nonpolar component, and the compounds represented by each of General Formulas (II) and (IV) may be referred to as a polar component.

In addition, a preferable composition of the liquid-crystal composition according to the present invention includes the compound represented by General Formula (I), and the compound represented by General Formula (II) and/or the compound represented by General Formula (IV).

The value of the refractive index anisotropy Δn at 25° C. of the liquid-crystal composition of the present invention is preferably 0.08 to 0.13, and more preferably 0.09 to 0.12. In more detail, in the case of corresponding to a thin cell gap, 0.10 to 0.12 is preferable, and in the case of corresponding to a thick cell gap, 0.08 to 0.10 is preferable.

A rotational viscosity ($\gamma_1$) of the liquid-crystal composition of the present invention preferably is equal to or less than 150, more preferably equal to or less than 130, and particularly preferably equal to or less than 120.

In the liquid-crystal composition of the present invention, Z which is a function of the rotational viscosity and the refractive index anisotropy preferably shows specific values.

$$Z=\gamma 1/\Delta n^2 \quad \text{[Equation 1]}$$

In the equation, $\gamma_1$ represents the rotational viscosity, and Δn represents the refractive index anisotropy.

Z is preferably equal to or less than 13,000, more preferably equal to or less than 12,000, and particularly preferably equal to or less than 11,000.

The nematic phase-isotropic liquid phase transition temperature ($T_{Ni}$) of the liquid-crystal composition of the present invention is equal to or higher than 60° C., preferably equal to or higher than 75° C., more preferably equal to or higher than 80° C., and still more preferably equal to or higher than 90° C.

The liquid-crystal composition of the present invention is required to have specific resistance of equal to or greater than $10^{12}$ (Ω·m), and preferably $10^{13}$ (Ω·m), and more preferably equal to or greater than $10^{14}$ (Ω·m).

The liquid-crystal composition of the present invention may contain typical nematic liquid-crystal smectic liquid-crystal, cholesteric liquid-crystal, an antioxidant, an ultraviolet absorber, or the like other than the compounds described above according to the application, in a case where the chemical stability of the liquid-crystal composition is required, the compound preferably does not have a chlorine atom in the molecule thereof, and in a case where the stability of the liquid-crystal composition to light such as ultraviolet rays is required, the compound desirably does not have a condensed ring or the like in which the conjugation length is long and the absorption peaks are present in the ultraviolet region in the molecule thereof, represented by a naphthalene ring or the like.

(Alignment Layer)

The alignment layer according to the present invention is preferably a photo-alignment film including a photoresponsive polymer of which the chemical structure changes in response to light.

Therefore, in the liquid-crystal display element using an n-type material, it is necessary to arrange the liquid-crystal molecules perpendicular to the longitudinal direction of a strip shape electrode, and if rubbing is performed perpendicularly to the longitudinal direction of the electrode, rubbing irregularity is inevitably increased due to unevenness of the electrode, thereby significantly reducing an alignment restricting force with respect to the liquid-crystal molecules. The present invention can solve such a problem.

In general, there are various types in the photo-alignment film, and examples thereof include a type utilizing photoisomerization to be caused by irradiating a compound having an azo group (for example, an azobenzene compound), a Schiff's base, an unsaturated bond portion such as a carbon-carbon double bond or the like with light, a type utilizing photodimerization of a cinnamic acid derivative or the like, and a type utilizing photofragmentation (photolysis) of a σ bond of coumarin, chalcone, or the polymer itself (for example, photodecomposable polyimide or the like).

In more detail, the photoresponsive polymer is preferably at least one selected from the group consisting of a photoresponsive decomposition type polymer, a photoresponsive dimerization type polymer, and a photoresponsive isomerization type polymer, and a photoresponsive decomposition type polymer is particularly preferable.

As the photoresponsive decomposition type polymer according to the present invention, it is preferable to utilize photofragmentation (photolysis) of a σ bond of the polymer itself. In more detail, in any case, the photoresponsive decomposition type polymer according to the present invention preferably has polysiloxane, polyimide, or a polyamic acid derivative structure as a main chain, and more preferably has polyimide or a polyamic acid derivative structure. The polyamic acid derivative is preferably an ester having an alkyl group having 1 to 5 carbon atoms or a salt of an alkyl ammonium having 1 to 18 carbon atoms.

The photoresponsive decomposition type polymer according to the present invention preferably contains at least one type of polymer selected from the group consisting of polyamic acid and polyimide obtained by reacting tetracarboxylic dianhydride and a diamine compound.

Examples of the tetracarboxylic dianhydride which is a raw material of polyimide and a polyamic acid derivative include the following.

[Chem. 26]

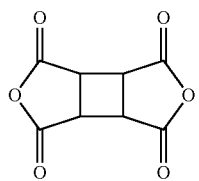
(TCA-1)

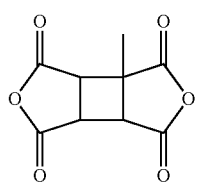
(TCA-2)

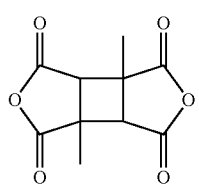
(TCA-3)

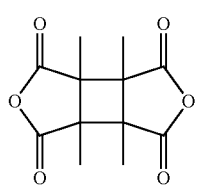
(TCA-4)

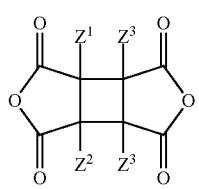
(TCA-5)

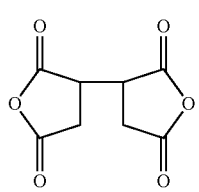
(TCA-6)

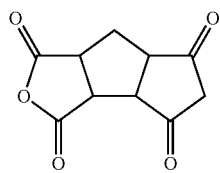
(TCA-7)

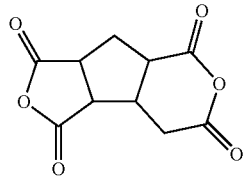
(TCA-8)

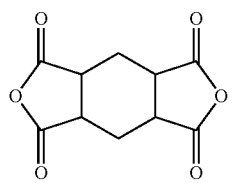
(TCA-9)

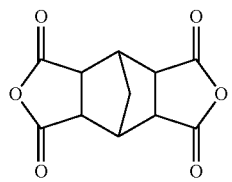
(TCA-10)

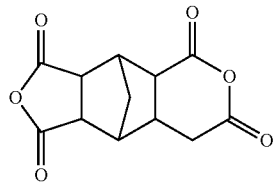
(TCA-11)

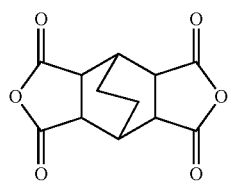
(TCA-12)

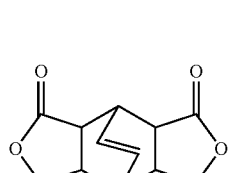
(TCA-13)

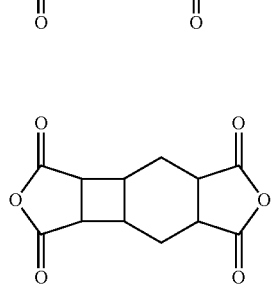
(TCA-14)

(TCA-15) 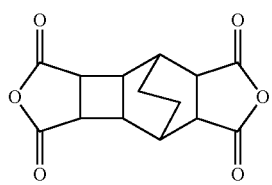

(TCA-16) 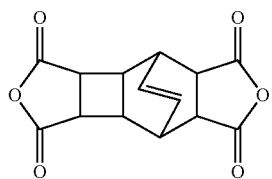

(TCA-17) 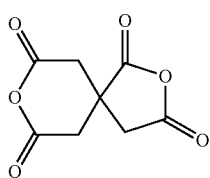

(TCA-18) 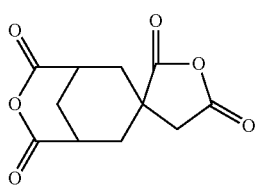

(TCA-19) 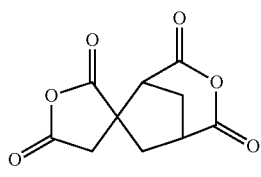

(TCA-20) 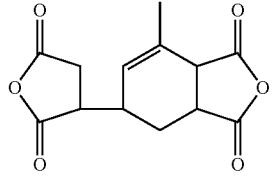

(TCA-21) 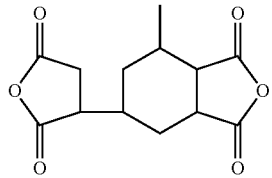

(TCA-21) 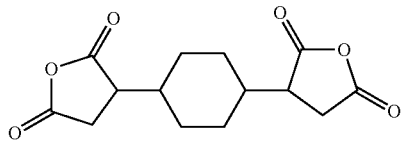

(TCA-22) 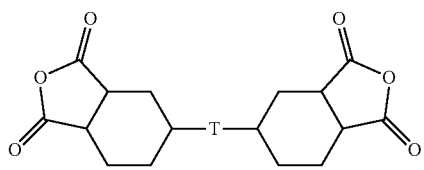

(TCA-23) 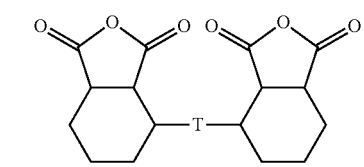

In the formulas, each of $Z^1$, $Z^2$, $Z^3$, and $Z^4$ independently represents a hydrogen atom, an alkyl group having 1 to 5 carbon atoms, a chlorine atom, a fluorine atom, —NR$_2$, —SR, —OH, —CH$_2$COOR, —CH$_2$CH$_2$COOR, —COR, —NO$_2$, or —CN, and, here, at least one of $Z^1$, $Z^2$, $Z^3$, and $Z^4$ is not a hydrogen atom or a methyl group. R represents an alkyl group having 1 to 5 carbon atoms, and T represents a single bond, —CH$_2$—, —O—, —S—, —C(CH$_3$)$_2$—, —C(CF$_3$)$_2$—, —CO—, or —SO—.

[Chem. 27]

(TCA-24) 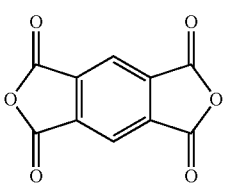

(TCA-25) 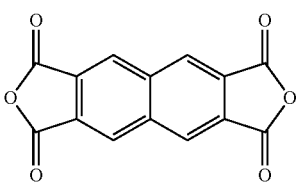

(TCA-26) 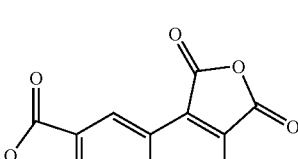

(TCA-27) 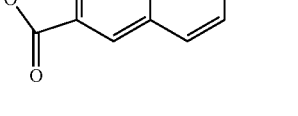

(TCA-27) 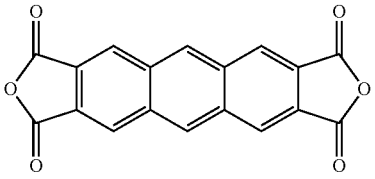

(TCA-28) 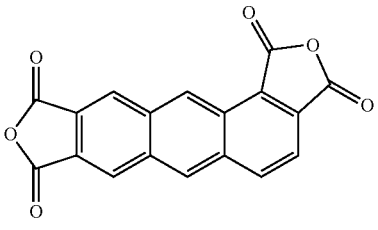

(TCA-29) 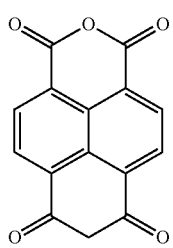

(TCA-30) 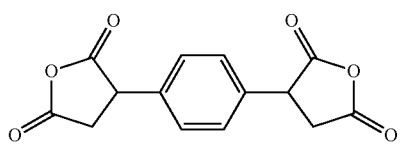

(TCA-31) 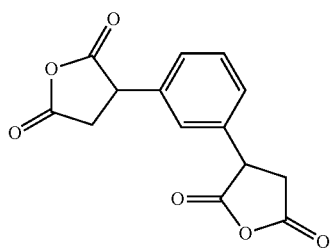

(TCA-32) 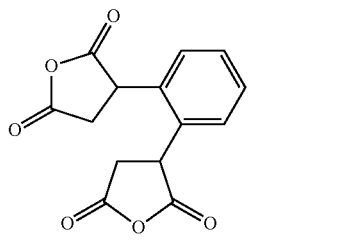

(TCA-33) 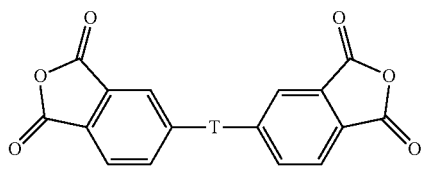

(TCA-34) 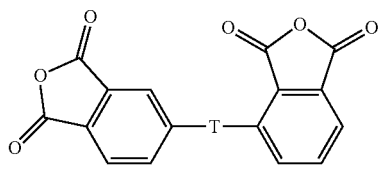

(TCA-35) 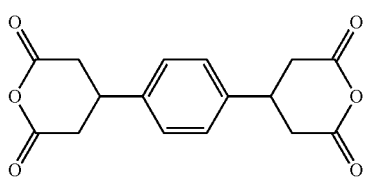

(TCA-36) 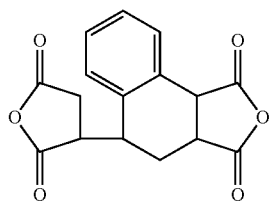

(TCA-37) 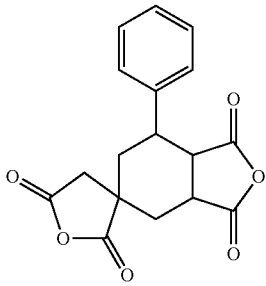

T in the above formulas represents a single bond, —CH$_2$—, —O—, —S—, —C(CH$_3$)$_2$—, —C(CF$_3$)$_2$—, —CO—, or —SO—.

Among the above compounds, Formula (TCA-1), (TCA-2), (TCA-3), (TCA-4), (TCA-5), (TCA-8), or (TCA-10) is preferable, and Formula (TCA-1) or (TCA-8) is particularly preferable.

Examples of the diamine compound which is a raw material of polyimide and a polyamic acid derivative include the following.

[Chem. 28]

(DA-1) 

(DA-2) 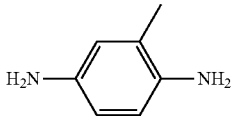

(DA-3) 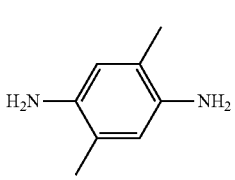

(DA-4) 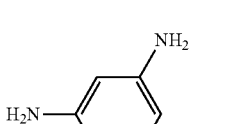

(DA-5) 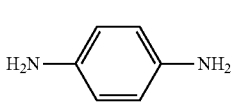

(DA-6) 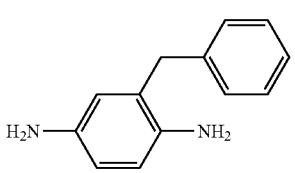

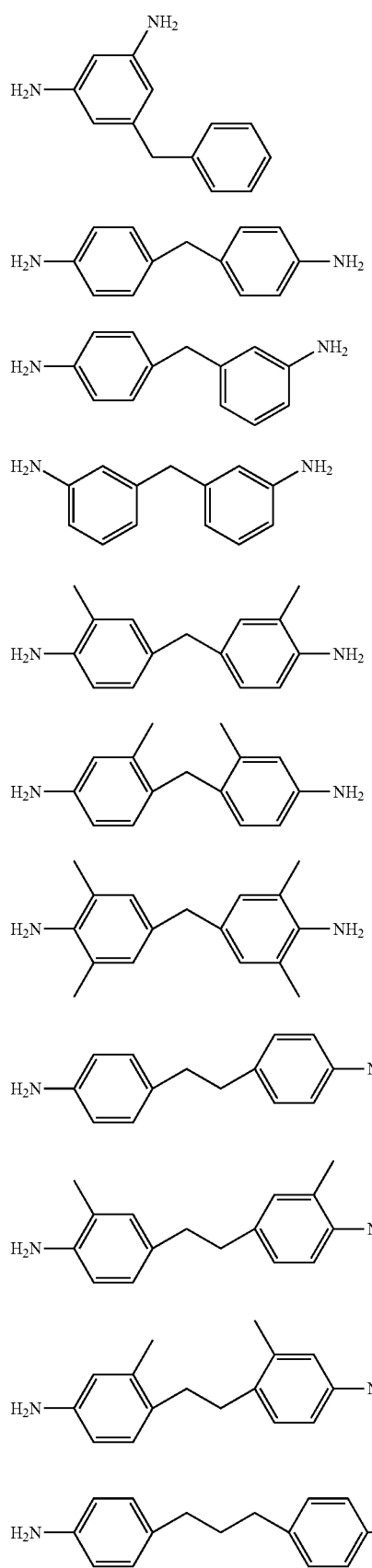
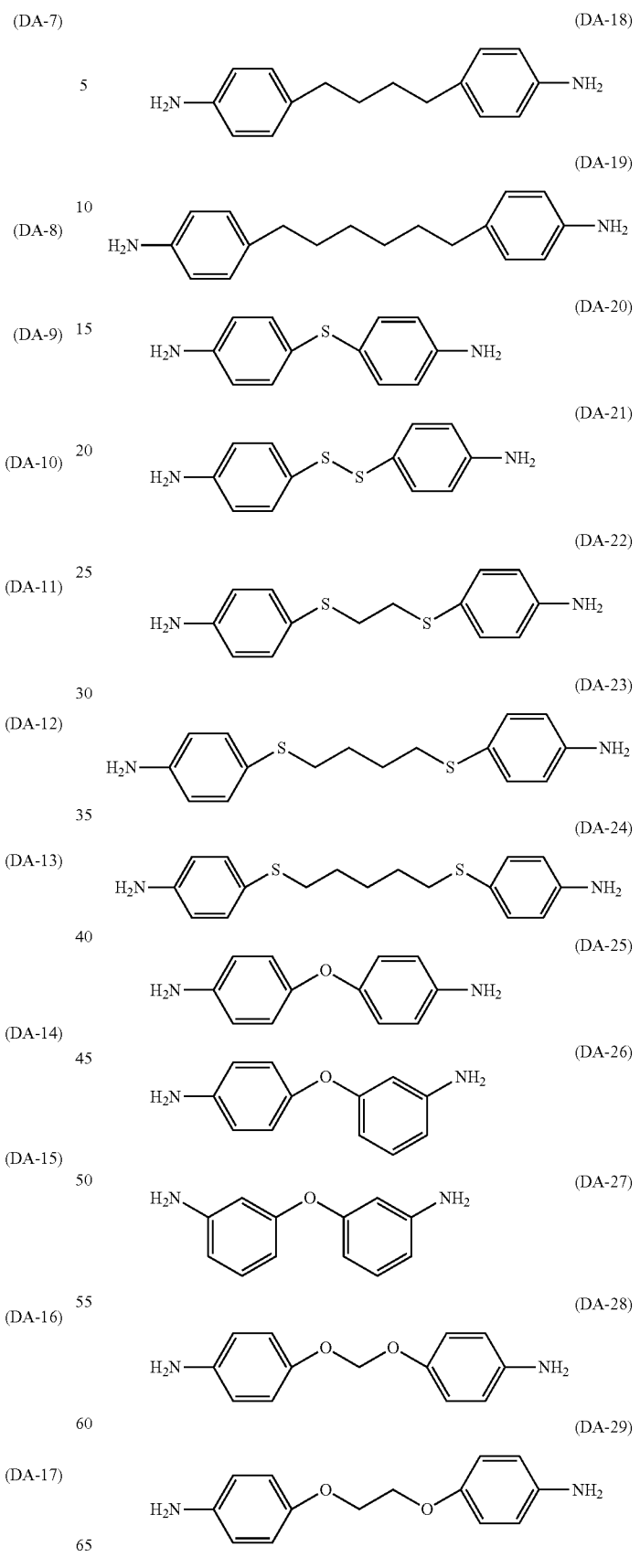

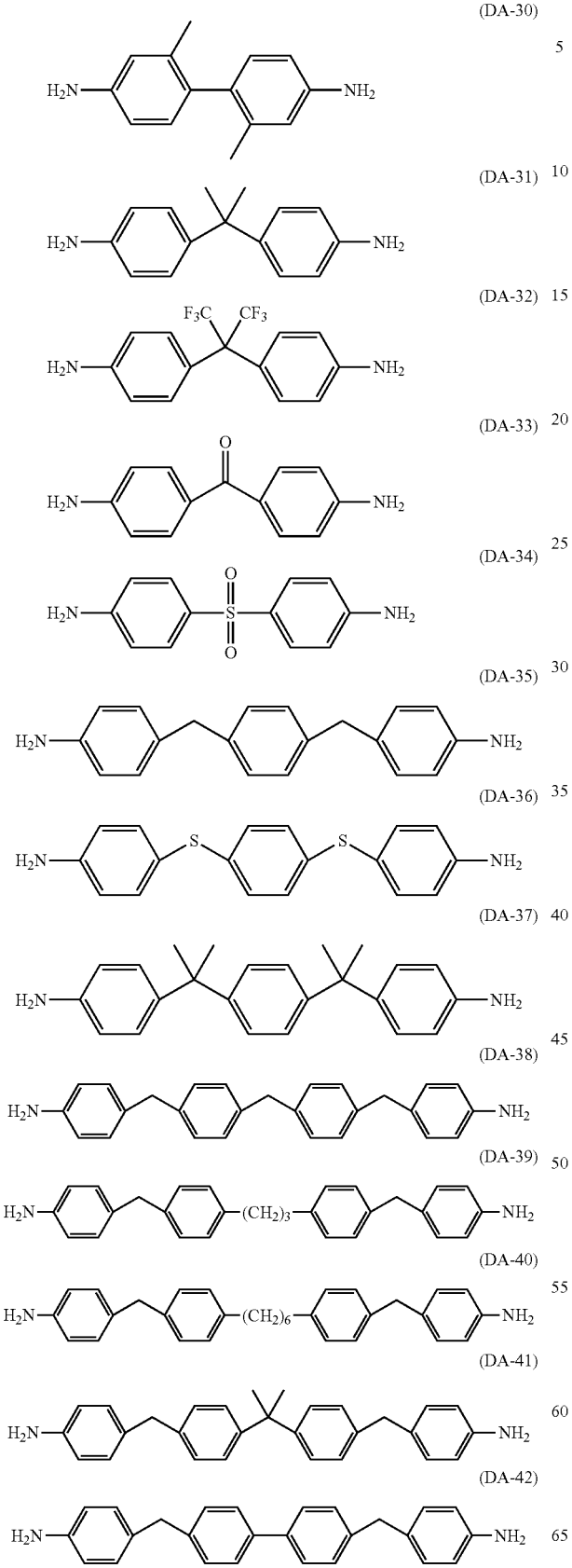
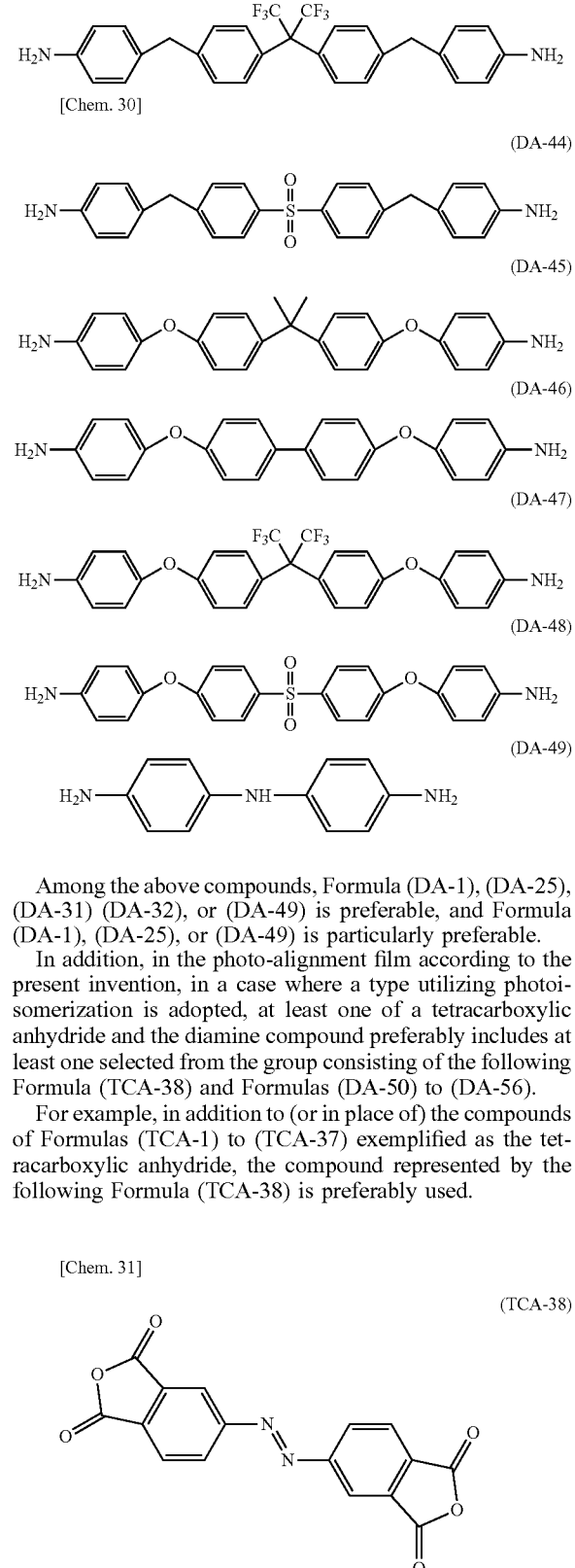

Among the above compounds, Formula (DA-1), (DA-25), (DA-31) (DA-32), or (DA-49) is preferable, and Formula (DA-1), (DA-25), or (DA-49) is particularly preferable.

In addition, in the photo-alignment film according to the present invention, in a case where a type utilizing photoisomerization is adopted, at least one of a tetracarboxylic anhydride and the diamine compound preferably includes at least one selected from the group consisting of the following Formula (TCA-38) and Formulas (DA-50) to (DA-56).

For example, in addition to (or in place of) the compounds of Formulas (TCA-1) to (TCA-37) exemplified as the tetracarboxylic anhydride, the compound represented by the following Formula (TCA-38) is preferably used.

[Chem. 31]

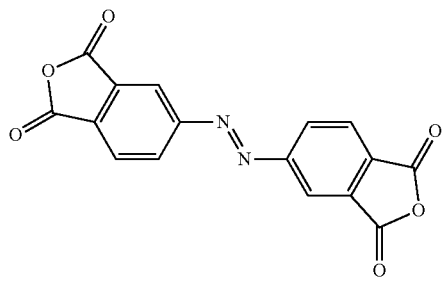

(TCA-38)

For example, in addition to (or in place of) the compounds of Formulas (DA-1) to (DA-49), the use of the compound represented by each of the following Formulas (DA-50) to (DA-56) as the diamine compound:

[Chem. 32]

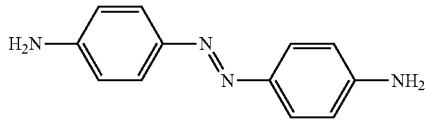
(DA-50)

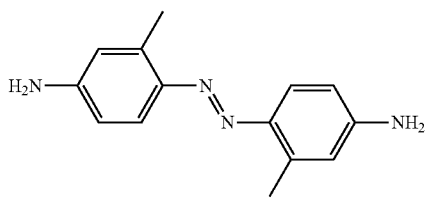
(DA-51)

(DA-52)

(DA-53)

(DA-54)

(DA-55)

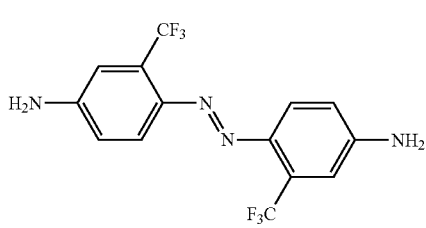

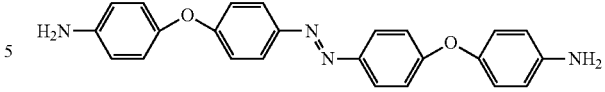
(DA-56)

is preferred.

In addition, in the photo-alignment film according to the present invention, in a case where a type utilizing photodimerization is adopted, at least one of the hydrogen atoms in a diamine compound represented by each of Formulas (DA-1) to (DA-49) is preferably has the following Formula (V), and more preferably includes at least one selected from the group consisting of Formulas (DA-50) to (DA-53).

That is, in addition to (or in place of) the compounds of Formulas (DA-1) to (DA-49), as the diamine compound, a compound obtained by substituting the hydrogen atom in each of compounds of Formulas (DA-1) to (DA-49) with General Formula (V) is preferably used.

[Chem. 33]

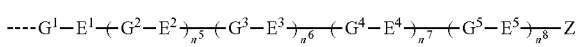
(V)

In the formula, the broken line represents a bond to the atom to which the hydrogen atom of (DA-1) to (DA-49) is bonded, each of $G^1$, $G^2$, $G^3$, $G^4$, and $G^5$ independently represents a single bond, an alkylene group having 2 to 12 carbon atoms (one —$CH_2$— group or two or more non-adjacent —$CH_2$— groups may be substituted with —O—, —CO—, —COO—, —OCO—, —NR—, —NRCO—, —CONR—, —NRCOO—, —OCONR—, —NRCONR—, —CH=CH—, —CC—, or —OCOO—. R represents a hydrogen atom or an alkyl group having 1 to 20 carbon atoms.), —$OCH_2$—, —$CH_2O$—, —COO—, —OCO—, —CH=CH—, —CF=CF—, —$CF_2O$—, —$OCF$—, —$CF_2CF_2$—, —CC—, —CH=CHCOO—, or —OCOCH=CH—. Here, any one or more of $G^1$, $G^2$, $G^3$, $G^4$ and $G^5$ represent —CH=CHCOO— or —OCOCH=CH—. Each of $n^5$, $n^6$, $n^7$, and $n^8$ represents 0 or 1, each of $E^1$, $E^2$, $E^3$, $E^4$, and $E^5$ independently represents trans-1,4-cyclohexylene, trans-1,4-dioxane-2,5-diyl, 1,4-naphthylene, 2,6-naphthylene, a pyridine-2,5-diyl group, a pyrimidine-2,5-diyl group, a 2,5-thiophenylene group, a 2,5-furanylene group, or a 1,4-phenylene group, these may be unsubstituted or one or more hydrogen atoms therein may be substituted with a fluorine atom, a chlorine atom, a methyl group, or a methoxy group, and Z represents a hydrogen atom, a fluorine atom, an alkyl group having 1 to 12 carbon atoms (one —$CH_2$— group or two or more non-adjacent —$CH_2$— groups may be substituted with —O—, —CO—, —COO—, —OCO—, —NR—, —NRCO—, —CONR—, —NRCOO—, —OCONR—, —NRCONR—, —CH=CH—, —CC—, or —OCOO—. R represents a hydrogen atom or an alkyl group having 1 to 20 carbon atoms), a cyano group, a nitro group, a hydroxyl group, or a carboxyl group.

Specific examples of the diamine compound include the following Formulas (DA-60) to (DA-63).

[Chem. 34]

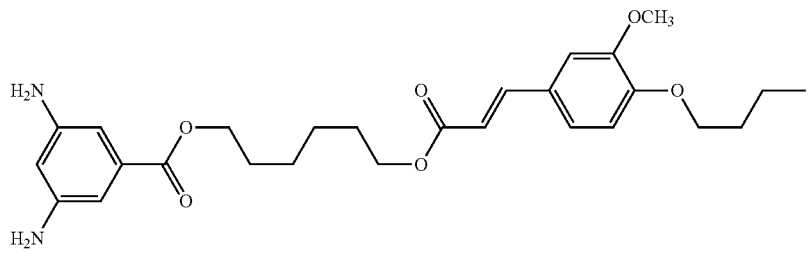
(DA-60)

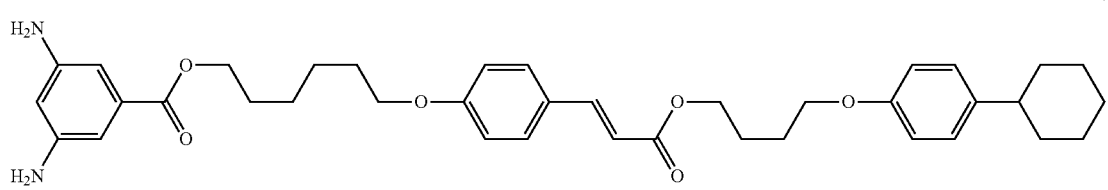
(DA-61)

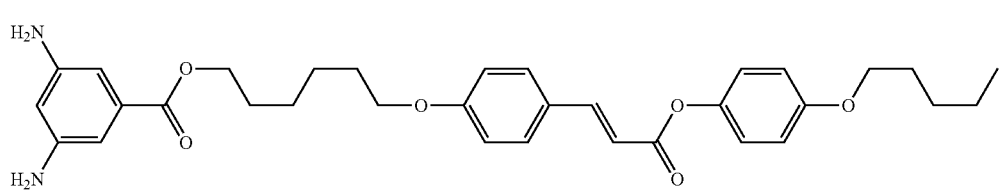
(DA-62)

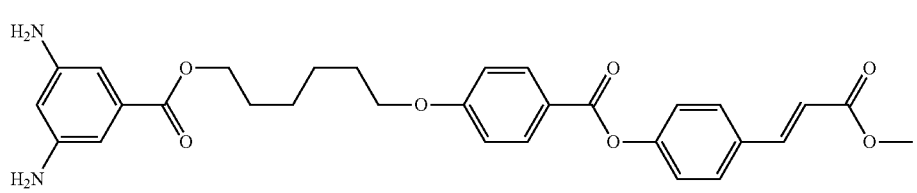
(DA-63)

For the photodecomposition type photo-alignment film according to the present invention, from the viewpoint of being capable of exhibiting good liquid-crystal alignment properties, the tetracarboxylic anhydride is more preferably Formula (TCA-1), (TCA-2), (TA-3), (TCA-4), (TCA-5), (TCA-33) (in Formula (TCA-33), T is particularly preferably —CO—), or TCA-34 (in Formula (TCA-34), T is preferably —CO—), and particularly preferably Formula (TCA-1), (TCA-2), (TCA-3), (TCA-4), or (TCA-5). In addition, for the photodecomposition type photo-alignment film according to the present invention, from the viewpoint of being capable of exhibiting good liquid-crystal alignment properties, the diamine compound is particularly preferably Formula (DA-1), (DA-25), or (DA-49).

Each of the tetracarboxylic anhydride and the diamine compound exemplified above may be used singly or in combination of two or more types thereof depending on required characteristics.

With respect to a preferable polyamic acid of the photo-responsive decomposition type polymer according to the present invention, as the mixing proportion between the tetracarboxylic dianhydride described above and the diamine compound described above, a proportion at which the acid anhydride group of the tetracarboxylic dianhydride becomes 0.2 to 2 equivalents is preferable and a proportion at which the acid anhydride group of the tetracarboxylic dianhydride becomes 0.3 to 1.2 equivalents is more preferable, with respect to one equivalent of the amino group of the diamine.

In addition, in the photo-alignment film according to the present invention, the synthesis reaction of polyamic acid by condensation of tetracarboxylic anhydride and a diamine compound is preferably performed in an organic solvent. The reaction temperature is preferably −20° C. to 150° C., and more preferably 0° C. to 100° C. In addition, the reaction time is preferably 0.1 to 24 hours, and more preferably 0.5 to 12 hours.

Examples of the organic solvent include an alcohol, a ketone, an ester, an ether, an aprotic polar solvent, a phenol and a phenol-derivative-based solvent, a halogenated hydrocarbon-based solvent, and a hydrocarbon-based solvent.

As the alcohol, for example, methyl alcohol, ethyl alcohol, isopropyl alcohol, cyclohexanol, ethylene glycol, propylene glycol, 1,4-butanediol, triethylene glycol, or ethylene glycol monomethyl ether is preferable.

As the ketone, for example, acetone, methyl ethyl ketone, methyl isobutyl ketone, or cyclohexanone is preferable.

Examples of the ester include ethyl lactate, butyl lactate, methyl acetate, ethyl acetate, butyl acetate, methyl methoxypropionate, ethyl ethoxypropionate, diethyl oxalate, and diethyl malonate.

Examples of the ether include diethyl ether, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, and tetrahydrofuran.

As specific examples of the aprotic polar solvent, for example, N-methyl-2-pyrrolidone, N,N-dimethylacetamide, N,N-dimethylformamide, dimethyl sulfoxide, γ-butyrolactone, tetramethylurea, or hexamethylphosphortriamide is preferable.

As the phenol and a derivative thereof, for example, m-cresol, xylenol, or halogenated phenol is preferable.

Examples of the halogenated hydrocarbon-based solvent include dichloromethane, 1,2-dichloroethane, 1,4-dichlorobutane, trichloroethane, chlorobenzene, and o-dichlorobenzene.

Examples of the hydrocarbon-based solvent include hexane, heptane, octane, benzene, toluene, xylene, isoamylpropionate, isoamylisobutyrate, and diisopentyl ether.

The total amount of tetracarboxylic dianhydride and diamine compound with respect to the organic solvent is preferably 0.1% to 50% by weight with respect to the total amount of the reaction solution.

If tetracarboxylic dianhydride and a diamine compound are reacted in the conditions described above, a reaction solution including polyamic acid is obtained. The obtained reaction solution as it is may be supplied for preparation of an alignment film, after the polyamic acid included in the reaction solution is isolated, the polyamic acid may be supplied for preparation of an alignment film, or after the isolated polyamic acid is purified, the purified polyamic acid may be supplied for preparation of an alignment film.

In addition, in a case where polyimide is obtained by dehydrating and ring-closing the polyamic acid obtained above, the above-described reaction solution as it is may be subjected to a dehydration and ring-closing reaction, after the polyamic acid included in the reaction solution is isolated, the polyamic acid may be subjected to a dehydration and ring-closing reaction, or after the isolated polyamic acid is purified, the purified polyamic acid may be subjected to a dehydration and ring-closing reaction. Isolation and purification of the polyamic acid can be performed according to known methods.

As a method of obtaining polyimide by imidizing the polyamic acid obtained by the above reaction, polyimide can be obtained by imidization by dehydrating and ring-closing polyamic acid. Specifically, the imidization is performed by a method of heating the polyamic acid or a method of dissolving the polyamic acid in an organic solvent, adding a dehydrating agent and a dehydration and ring-closing catalyst to the solution, and heating if necessary.

As the organic solvent used in the dehydration and ring-closing reaction, organic solvents exemplified as those used in synthesis of polyamic acid can be exemplified, and thus, the description thereof will not be repeated here.

Polyimide as the alignment film according to the present invention may be a completely imidized product obtained by dehydrating and ring-closing all the amic acid structures of the polyamic acid which is a precursor of the polyimide, or may be a partially imidized product in which an amic acid structure and an imide ring structure coexist obtained by dehydrating and ring-closing only a part of the amic acid structures. The imidization ratio of the polyimide according to the present invention is preferably equal to or greater than 30%, more preferably 40% to 99%, and still more preferably 45% to 98%. The imidization ratio indicates a proportion of the number of imide ring structures with respect to the total of the number of amic acid structures and the number of imide ring structures of the polyimide, as a percentage. Here, a part of the imide rings may be isoimide rings.

Moreover, in the present invention, in the measurement method of the imidization ratio of polyimide, the proton derived from the structure which does not change before and after the imidization is determined as a reference proton, and by using the peak integration value of the proton and the proton peak integration value derived from the NH group of amic acid appearing in the vicinity of 9.5 to 10.0 ppm, the imidization ratio is calculated.

In the present invention, the temperature in a case where polyamic acid is thermally imidized in a solution is preferably 100° C. to 400° C., and more preferably 120° C. to 250° C. In this case, a method of performing the imidization while removing the water generated by the imidization reaction from the system is preferable.

In the present invention, in a case where polyamic acid is imidized by a catalyst, polyimide is obtained by adding a basic catalyst and an acid anhydride to the solution of polyamic acid obtained above, followed by stirring preferably at −20° C. to 250° C., and more preferably at 0° C. to 180° C. In addition, in this case, the amount of basic catalyst is 0.5 to 30 mol times the amount of amido acid group, and preferably 2 to 20 mol times, and the amount of acid anhydride is 1 to 50 mol times the amount of amido acid group, and preferably 3 to 30 mol times.

Examples of the basic catalyst include pyridine, collidine, lutidine, triethylamine, trimethylamine, tributylamine, and trioctylamine. In addition, examples of the acid anhydride include acetic anhydride, trimellitic anhydride, and pyromellitic anhydride.

Moreover, the imidization ratio by catalyst imidization can be controlled by adjusting the amount of catalyst, the reaction temperature, and the reaction time.

In the present invention, in a case where the generated polyamic acid or polyimide is recovered from the reaction solution of polyamic acid or polyimide, precipitation may be performed by putting the reaction solution into a poor solvent. Examples of the poor solvent used in precipitation include methanol, acetone, hexane, butyl cellosolve, heptane, methyl ethyl ketone, methyl isobutyl ketone, ethanol, toluene, benzene, and water. After the polymer precipitated by putting into the poor solvent is recovered by filtration, the polymer can be dried at ordinary temperature or by heating under ordinary pressure or reduced pressure.

With respect to a solution having a concentration of the polyamic acid and the polyimide according to the present invention of 10% by weight, the solution preferably has a viscosity of 10 to 800 mPa·s, and more preferably has a viscosity of 15 to 500 mPa·s. Moreover, the solution viscosity of the polymer (mPa·s) is a value measured with respect to a polymer solution having a concentration of 10% by weight prepared by using a good solvent (for example, γ-butyrolactone or N-methyl-2-pyrrolidone) relative to the polymer at 25° C. by using an E-type rotational viscometer.

As the photoresponsive decomposition type polymer according to the present invention, the photoresponsive dimerization type polymer represented by the following General Formula (1A) or (1B) ether than the above-described formulas, a hydrolyzate thereof, or a condensate of the hydrolyzate is preferable.

[Chem. 35]

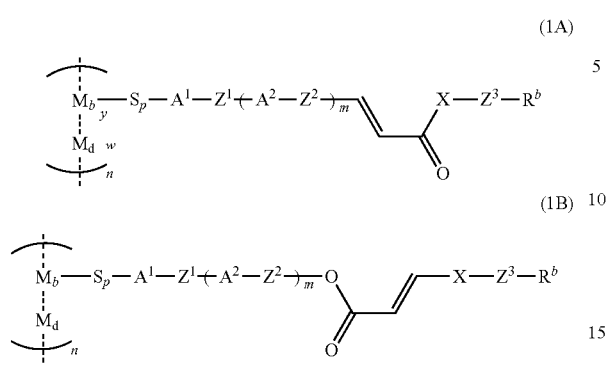

[Chem. 36]

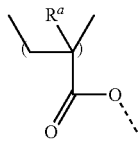 (U-1)

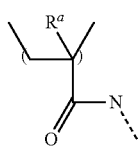 (U-2)

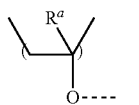 (U-3)

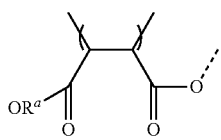 (U-4)

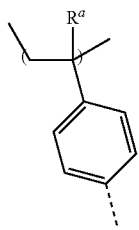 (U-5)

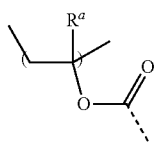 (U-6)

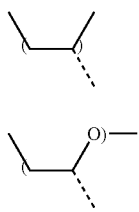 (U-7)

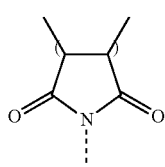 (U-8)

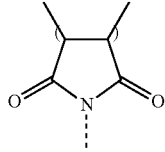 (U-9)

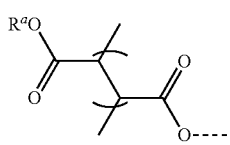 (U-10)

In General Formula (1), Sp is a single bond or at least one type of divalent connecting group selected from the group consisting of —(CH$_2$)$_u$— in the formula, u represents 1 to 20), —OCH$_2$—, —CH$_2$O—, —COO—, —OCO—, —CH=CH—, —CF=CF—, —CF$_2$O—, —OCF$_2$—, —CF$_2$CF$_2$—, and —C≡C—, one or more non-adjacent CH$_2$ groups in these substituents can be independently substituted with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NH—CO—NR—, —CH=CH—, —C≡C—, or —O—CO— (in the formulas, R independently represents hydrogen or an alkyl group having 1 to 5 carbon atoms), each of A$^1$ and A$^2$ independently represents a group selected from the group consisting of:
(a) a trans-1,4-cyclohexylene group (one methylene group or two or more non-adjacent methylene groups present in the group may be substituted with —O—, —NH—, or —S—),
(b) a 1,4-phenylene group (one or two or more —CH= present in the group may be substituted with —N=), and
(c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, each of the above-described groups (a), (b), and (c) may be unsubstituted or one or more hydrogen atoms therein may be substituted with a fluorine atom, a chlorine atom, a cyano group, a methyl group, or a methoxy group, each of Z$^1$, Z$^2$, and Z$^3$ independently represents a single bond, —(CH$_2$)$_u$— (in the formula, u represents 1 to 20), —OCH$_2$—, —CH$_2$O—, —COO—, —OCO—, —CH=CH—, —CF=CF—, —CF$_2$O—, —OCF$_2$—, —CF$_2$CF$_2$—, or —C≡C—, one or more non-adjacent CH$_2$ groups in these substituents can be independently substituted with —O—, —C—, —CO—O—, —O—CO—, —Si(CH$_3$)$_2$—O—Si(CH$_3$)$_2$—, —NR—, —NR—CO—, —CO—NR—, —NR—CO—C—, —O—CO—NR—, —NR—CO—NR—, —CH=CH—, —C≡C—, or —O—CO—O— (in the formulas, R independently represents hydrogen or an alkyl group having 1 to 5 carbon atoms), X is —O—, a single bond, —NR—, or a phenylene group, R$^b$ is a polymeric group, an alkoxy group, a cyano group, or a fluorinated alkyl group having 1 to 12 carbon atoms,
m is 0, 1, or 2, and
each of M$_b$ and M$_d$ may be the same as or different from each other, and independently represents any one type of the monomer units of the following General Formula (U-1) to (U-13).

-continued

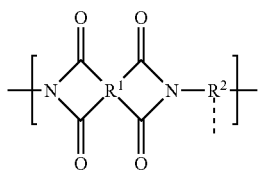
(U-11)

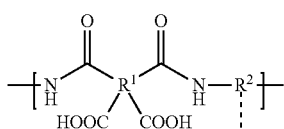
(U-12)

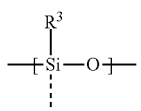
(U-13)

In General Formulas (U-1) to (U-10), the broken line represents a bond to Sp, $R^a$ independently represents a hydrogen atom, an alkyl group having 1 to 5 carbon atoms, a phenyl group, or a halogen atom, an arbitrary hydrogen atom in each structure may be substituted with a fluorine atom, a chlorine atom, a methyl group, a phenyl group, or a methoxy group, in General Formulas (U-11) to (U-13), the broken line represents a bond to Sp, $R^1$ represents a tetravalent ring structure, $R^2$ represents a trivalent organic group, and $R^3$ represents a hydrogen atom, a hydroxyl group, an alkyl group having 1 to 15 carbon atoms, or an alkoxy group having 1 to 15 carbon atoms.

Each of y and w represents the molar fraction of a copolymer, y is greater than 0 and equal to or less than 1, w is equal to or greater than 0 and less than 1, n represents 4 to 100,000, and each of monomer units of $M_b$ and $M_d$ may be independently formed of one type of unit or two or more types of different units.

In addition, as a preferable aspect of the photoresponsive polymer represented by General Formula (1) according to the present invention, a photoresponsive dimerization type polymer in which Z is a single bond is preferable.

Another photoresponsive dimerization type polymer according to the present invention is preferably a photoresponsive dimerization type polymer represented by the following General Formula (2).

[Chem. 37]

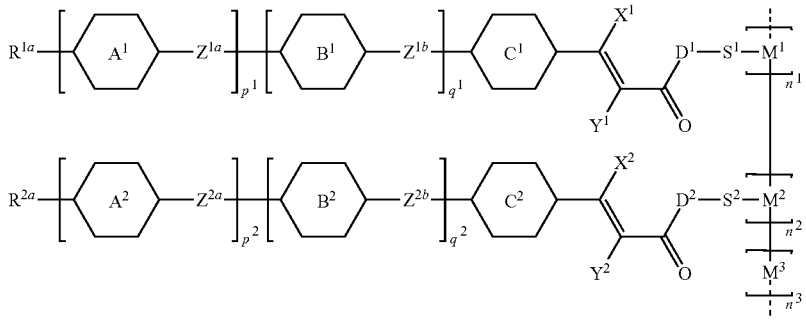

In General Formula (2), each of $M^1$ and $M^2$ is independently at least one type of repeating unit selected from the group consisting of acrylate, methacrylate, 2-chloroacrylate, 2-phenylacryate, acrylamide which may be N-substituted with a lower alkyl group, methacrylamide, 2-chloroacrylamide, 2-phenylacrylamid, vinyl ethers, vinyl esters, styrene derivatives, and siloxanes, $M^3$ is independently at least one type of repeating unit selected from the group consisting of acrylate, methacrylate, 2-chloroacrylate, 2-phenlacrylate, acrylramide which may be N-substituted with lower alkyl, methacrylamide, 2-chloroacrylamide, 2-phenylacrylamide, vinyl ethers, vinyl esters, linear or branched alkyl esters of acrylic acid or methacrylic acid, allyl esters of acrylic acid or methacrylic acid, alkyl vinyl ethers or alkyl vinyl esters, phenoxyalkyl acrylates, phenoxyalkyl methacrylates, hydroxyalkyl acrylates, hydroxyalkyl methacrylates, phenylalkyl acrylates, phenylalkyl methacrylates, acrylonitrile, methacrylonitrile, styrene, 4-methyl styrene, and siloxanes, each of $A^1$, $B^1$, $C^1$, $A^2$, $B^2$, and $C^2$ independently represents a group selected from the group consisting of:

(a) a trans-1,4-cyclohexylene group (one methylene group or two or more non-adjacent methylene groups present in the group may be substituted with —O—, —NH—, or —S—), (b) a 1,4-phenylene group (one or two or more —CH═'s present in the group may be substituted with —N═), and (c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, each of the above-described groups (a), (b), and (c) may be unsubstituted or one or more hydrogen atoms therein may be substituted with a fluorine atom, a chlorine atom, a cyano group, a methyl group, or a methoxy group, each of $S^1$ and $S^2$ is independently a linear or branched alkylene group (—(CH$_2$)$_r$—) or —(CH$_2$)$_r$-L-(CH$_2$)$_s$— which has been substituted with one or more fluorine atoms, chlorine atoms, or cyano groups (in the formula, L means a single bond or —O—, —COO—, —OOC—, —NR$^1$—, —NR$^1$—CO—, —CO—NR$^1$—, —NR$^1$—COO—, —OCO—NR$^1$—, —NR$^1$—CO—NR$^1$—, —CH═H—, or —C≡C—, in this case, $R^1$ means a hydrogen atom or a lower alkyl group, and each of r and s is an integer of 1 to 20 under the conditions of r+s≤24), each of $D^1$ and $D^2$ independently includes —O—, —NR$^2$—, or a group selected from the group consisting of the following (d) to (f):

(d) a trans-1,4-cyclohexylene group (one methylene group or two or more non-adjacent methylene groups present in the group may be substituted with —O—, —NH—, or —S—), (e) a 1,4-phenylene group (one or two or more —CH═'s present in the group may be substituted with —N═), and (f) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, it is meant that each of the above-described groups (d), (e), and (f) may be unsubstituted or one or more hydrogen atoms therein may be substituted with a fluorine atom, a chlorine atom, a cyano group, a methyl group, or a methoxy group, and at this time, $R^2$ is a hydrogen atom or a lower alkyl group, each of $X^1$, $X^2$, $Y^1$ and $Y^2$ independently means a hydrogen atom, a fluorine atom, a chlorine atom, a cyano group, a $CH_2$ group which may be substituted with a fluorine atom in some cases, or an alkyl group having 1 to 12 carbon atoms in which a plurality of non-adjacent $CH_2$ groups may be replaced by —O—, —COO—, —OC—, and/or —CH=CH— in some cases, each of $Z^{1a}$, $Z^{1b}$, $Z^{2a}$, and $Z^{2b}$ independently means a single bond, —(CH$_2$)t-, —O—, —CO—, —CO—O—, —O—OC—, —NR$^4$—, —CO—NR$^4$—, —NR$^4$—CO—, —(CH$_2$)$_u$—O—, —O—(CH$_2$)$_u$—, —(CH$_2$)$_u$—NR$_4$—, or —NR$^4$—(CH$_2$), and at this time, $R^4$ means a hydrogen atom or a lower alkyl group; t means an integer of 1 to 4; and u is an integer of 1 to 3, each of $p^1$, $p^2$, $q^1$, and $q^2$ is independently 0 or 1, each of $R^{1a}$ and $R^{2a}$ independently means a hydrogen atom, a fluorine atom, a chlorine atom, a cyano group, a nitro group, or a linear or branched alkyl group having 1 to 20 carbon atoms, an alkoxy group, an alkyl-COO—, alkyl-CO—NR$^3$, or an alkyl-OCO group, at this time, $R^3$ means a hydrogen atom or a lower alkyl group, one or more hydrogen atoms in the alkyl group or the alkoxy group may be substituted with a fluorine atom, a chlorine atom, a cyano group, or a nitro group, a $CH_2$ group or a plurality of non-adjacent $CH_2$ groups in the alkyl group or the alkoxy group may be substituted with —O—, —CH=CH—, or —C≡C—, and each of $n^1$, $n^2$, and $n^3$ is a comonomer molar fraction of $0<n^1\leq1$, $0\leq n^2<1$, and $0\leq n^3\leq0.5$, respectively.

(Substrate, Electrode Layer)

A pair of substrates and an electrode layer which are configuration elements of the liquid-crystal display element according to the present invention will be described below, and for convenience, the configuration elements will be described in detail together with the description of the liquid-crystal display element according to the present invention. Hereinafter, one embodiment of the liquid-crystal display element according to the present invention will be described with reference to drawings. In FIGS. 1 to 6, a horizontal electric field type liquid-crystal display element is described as a preferable example of the liquid-crystal display element according to present invention, and in FIGS. 7 to 9, a vertical electric field type liquid-crystal display element is described.

Figure 3:
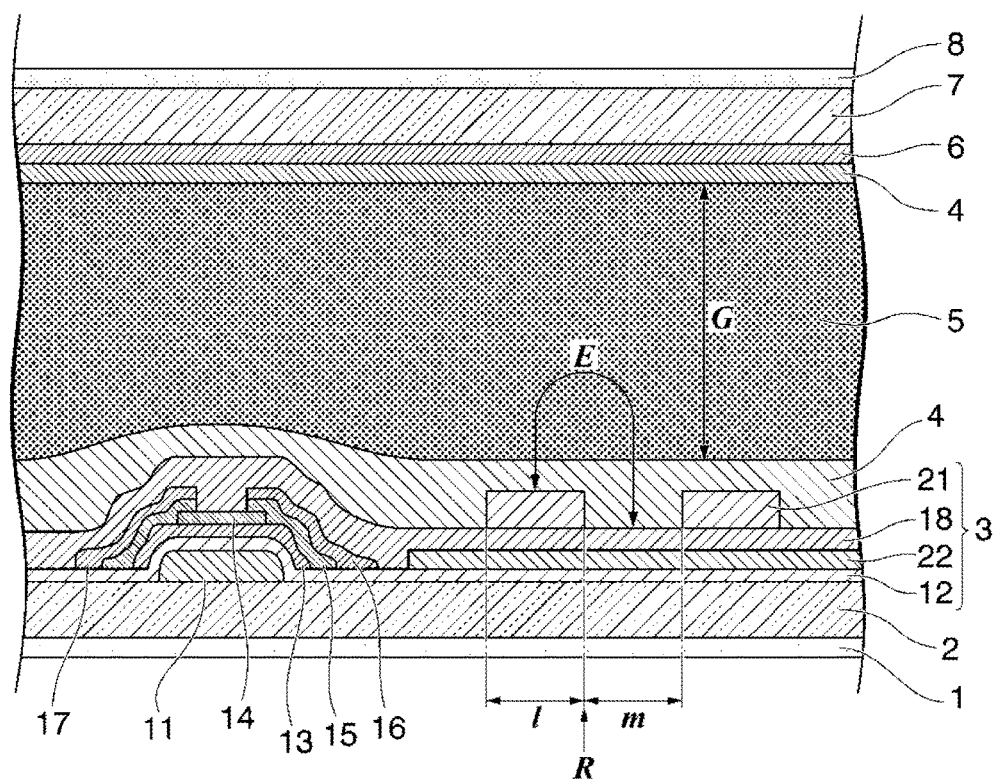
FIG. 3 is a sectional view obtained by cutting the liquid-crystal display element shown in FIG. 1 in a line III-III direction in FIG. 2.

FIG. 1 is a view schematically showing a configuration of a liquid-crystal display element. In FIG. 1, for explanation, respective configuration elements are described in separated state for convenience. As described in FIG. 1, the liquid-crystal display element 10 according to the present invention is an FFS mode liquid-crystal display element having a liquid-crystal composition (or a liquid-crystal layer 5) sandwiched between a first transparent insulating substrate 2 and a second transparent insulating substrate 7 which are disposed to face each other, and has a feature of using the liquid-crystal composition of the present invention as the liquid-crystal composition. In the first transparent insulating substrate 2, an electrode layer 3 is formed on the surface of the liquid-crystal layer 5 side. In addition, the liquid-crystal display element 10 has a pair of photo-alignment films 4 inducing homogeneous alignment in direct contact with the liquid-crystal composition constituting the liquid-crystal layer 5 between the liquid-crystal layer 5 and the first transparent insulating substrate 2 and between the liquid-crystal layer 5 and the second transparent insulating substrate 8, respectively, and the liquid-crystal molecules in the liquid-crystal composition are aligned so as to be substantially parallel to the substrates 2 and 7 when no voltage is applied. As shown in FIGS. 1 and 3, the second substrate 7 and the first substrate 2 may be sandwiched between a pair of polarizing plates 1 and 8. In FIG. 1, a color filter 6 is provided between the second substrate 7 and an alignment film 4. Moreover, the form of the liquid-crystal display element according to the present invention may be a so-called color filter-on-array (COA), and a color filter may be provided between the electrode layer including a thin film transistor and the liquid-crystal layer, or a color filter may be provided between the electrode layer including the thin film transistor and the second substrate.

That is, the liquid-crystal display element 10 according to the present invention has a configuration in which the first polarizing plate 1, the first substrate 2, the electrode layer 3 including a thin film transistor, the alignment film 4, the liquid-crystal layer 5 including a liquid-crystal composition, the alignment film 4, the color filter 6, the second substrate 7, and the second polarizing plate 8 are sequentially stacked.

As the first substrate 2 and the second substrate 7, a transparent material having flexibility such as glass or plastic can be used, and one of substrates may be an opaque material such as silicon. The two substrates 2 and 7 are attached by a sealant or a sealing material such as an epoxy-based thermosetting composition disposed in the peripheral region, and to hold the distance between the substrates, for example, particle shape spacers such as glass particles, plastic particles, or alumina particles or spacer posts formed of a resin formed by photolithography may be disposed therebetween.

Figure 2:
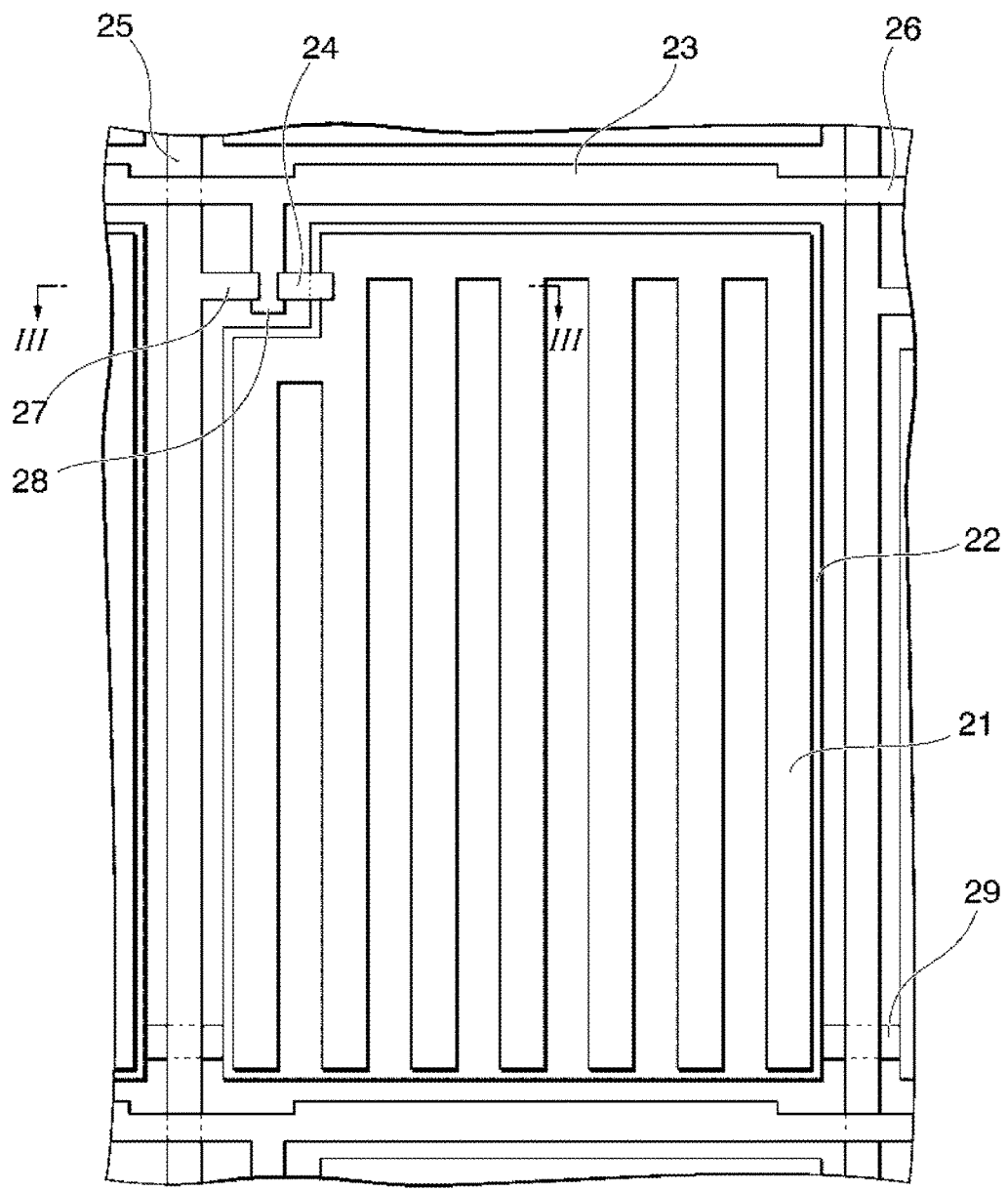
FIG. 2 is an enlarged plan view of a region surrounded by a line II of an electrode layer 3 formed on a substrate 2 in FIG. 1.

FIG. 2 is an enlarged plan view of a region surrounded by a II line of the electrode layer 3 formed on the substrate 2 in FIG. 1. FIG. 3 is a sectional view obtained by cutting the liquid-crystal display element shown in FIG. 1 in a III-III line direction in FIG. 2. As shown in FIG. 2, in the electrode layer 3 including a thin film transistor formed on the surface of the first substrate 2, a plurality of gate bus lines 26 for supplying a scanning signal and a plurality of data bus lines 25 for supplying a display signal are disposed in a matrix shape to intersect each other. Moreover, in FIG. 2, only a pair of gate bus lines 25 and a pair of data bus lines 24 are shown.

By the region surrounded by the plurality of gate bus lines 26 and the plurality of data bus lines 25, a unit pixel of the liquid-crystal display device is formed, and in the unit pixel, a pixel electrode 21 and a common electrode 22 are formed. In the vicinity of the intersection at which the gate bus lines 26 and the data bus lines 25 intersect each other, a thin film transistor including a source electrode 27, a drain electrode 24, and a gate electrode 28 is provided. The thin film transistor is connected to the pixel electrode 21 as a switching element for supplying a display signal to the pixel electrode 21. In addition, a common line 29 is provided in parallel with the gate bus line 26. The common line 29 is connected to the common electrode 22 for supplying a common signal to the common electrode 22.

As shown in FIG. 3, one preferable aspect of the structure of the thin film transistor has, for example, a gate electrode 11 formed on the surface of the substrate 2, a gate insulating layer 12 provided so as to cover the gate electrode 11 and substantially cover the entire surface of the substrate 2, a semiconductor layer 13 formed on the surface of the gate insulating layer 12 so as to face the gate electrode 11, a protective film 14 provided so as to cover a part of the surface of the semiconductor layer 17, a drain electrode 16 provided so as to cover the end portion of one side of each of the protective layer 14 and the semiconductor layer 13 and come into contact with the gate insulating layer 12 formed on the surface of the substrate 2, a source electrode 17 provided so as to cover the end portion of the other side of each of the protective film 14 and the semiconductor layer 13 and come into contact with the gate insulating layer 12 formed on the surface of the substrate 2, and an insulation protecting layer 18 provided so as to cover the drain electrode 16 and the source electrode 17. An anodic oxide film (not shown) may be formed on the surface of the gate electrode 11 to eliminate steps with the gate electrode.

In the semiconductor layer 13, amorphous silicon, polycrystalline polysilicon, or the like can be used, and it is also preferable to use a transparent semiconductor film such as a film of ZnO, IGZO (In—Ga—Zn—O), or ITO from the viewpoint of being capable of suppressing the adverse effect of the photocarrier due to light absorption and increasing the opening ratio of the element.

Furthermore, for the purpose of reducing the width or the height of the Schottky barrier, an ohmic contact layer 15 may be provided between the semiconductor layer 13 and the drain electrode 16 or the source electrode 17. In the ohmic contact layer, a material such as n-type amorphous silicon and n-type polycrystalline polysilicon, obtained by adding impurities such as phosphorus at a high concentration, can be used.

Each of the gate bus line 26, a data bus line 25, and the common line 29 is preferably a metal film, and more preferably Al, Cu, Au, Ag, Cr, Ta, Ti, Mo, W, Ni, or alloys thereof, and a case of using a wire of Al or an alloy thereof is particularly preferable. In addition, the insulation protecting layer 18 is a layer having an insulation function and formed of silicon nitride, silicon dioxide, a silicon oxynitride film, or the like.

In the embodiment shown in FIGS. 2 and 3, the common electrode 22 is a flat plate shape electrode formed on substantially the entire surface of the gate insulating layer 12, and on the other hand, the pixel electrode 21 is a comb shape electrode formed on the insulation protecting layer 18 covering the common electrode 22. That is, the common electrode 22 is disposed at a position closer to the first substrate 2 than the pixel electrode 21, and these electrodes are disposed to overlap each other through the insulation protecting layer 18. Each of the pixel electrode 21 and the common electrode 22 is formed of, for example, a transparent conductive material such as ITO (Indium Tin Oxide), IZO (Indium Zinc Oxide), or IZTO (Indium Zinc Tin Oxide). Since the pixel electrode 21 and the common electrode 22 are formed of transparent conductive materials, the area opened in a unit pixel area becomes large, and both the opening ratio and the transmittance are increased.

In addition, the pixel electrode 21 and the common electrode 22 are formed such that the distance (also referred to as the minimum distance) R between the pixel electrode 21 and the common electrode 22 becomes smaller than the distance G between the first substrate 2 and the second substrate 7 to form a fringe electric field between these electrodes. Here, the distance R between electrodes represents a distance in the horizontal direction on the substrate between the electrodes. In FIG. 3, since the flat plate shape common electrode 22 and the comb shape pixel electrode 21 are overlapped, an example in which the minimum distance (or the distance between electrodes) R becomes 0 is shown, and since the minimum distance R becomes smaller than the distance (that is, a cell gap) G between the first substrate 2 and the second substrate 7, a fringe electric field E is formed. Therefore, in an FFS type liquid-crystal display element, it is possible to use a horizontal electric field formed in the vertical direction with respect to the line forming a comb shape of the pixel electrode 21 and a parabolic electric field. It is preferable that the electrode width l of the comb shape portion of the pixel electrode 21 and the gap width m of the comb shape portion of the pixel electrode 21 are formed in such an extent that all the liquid-crystal molecules in the liquid-crystal layer 5 can be driven by the electric field generated. In addition, the minimum distance R between the pixel electrode and the common electrode can be adjusted as the (average) film thickness of a gate insulating film 12.

The liquid-crystal display element according to the present invention is preferably a vertical electric field mode liquid-crystal display element or a horizontal electric field mode liquid-crystal display element, and more preferably an FFS mode liquid-crystal display element using a fringe electric field or a VA mode liquid-crystal display element. If the shortest distance R between the common electrode 22 and the pixel electrode 21 which are adjacent is shorter than the shortest distance G between alignment layers 4 (the distance between substrates), a fringe electric field is formed between the common electrode and the pixel electrode, and it is possible to efficiently use the alignment of the horizontal direction and the vertical direction of the liquid-crystal molecules. In the case of an FFS mode liquid-crystal display element as a preferable aspect of the present invention, if a voltage is applied to the liquid-crystal molecules of which the long axis direction is disposed so as to be parallel to the alignment direction of the alignment layer, an equipotential line of the parabolic electric field between the pixel electrode 21 and the common electrode 22 is formed to the upper portion of the pixel electrode 21 and the common electrode 22, and the liquid-crystal molecules in the liquid-crystal layer 5 rotate in the liquid-crystal layer 5 along the formed electric field. In particular, since, as the liquid-crystal composition according to the present invention, liquid-crystal molecules having negative dielectric anisotropy are used, the long axis direction of the liquid-crystal molecules is rotated so as to be orthogonal to the electric field direction generated. The liquid-crystal molecules positioned near the pixel electrode 21 are likely to be influenced by a fringe electric field, but since in the liquid-crystal molecules having negative dielectric anisotropy, the polarization direction is in the short axis of the molecules, the long axis direction is not rotated in the direction orthogonal to the alignment layer 4, and the long axis direction of all liquid-crystal molecules in the liquid-crystal layer 5 is capable of maintaining the parallel direction with respect to the alignment film 4. Therefore, it is possible to obtain excellent transmittance characteristics compared to a liquid-crystal display element of the FFS mode in which the liquid-crystal molecules having positive dielectric anisotropy are used.

From the viewpoint of preventing the light leakage, for the color filter 6, black matrices (not shown) are preferably formed at the portions corresponding to the thin film transistor and a storage capacitor 23.

A pair of alignment films 4 inducing homogeneous alignment in direct contact with the liquid-crystal composition constituting the liquid-crystal layer 5 are provided on the electrode layer 3 and the color filter 6.

Figure 4:
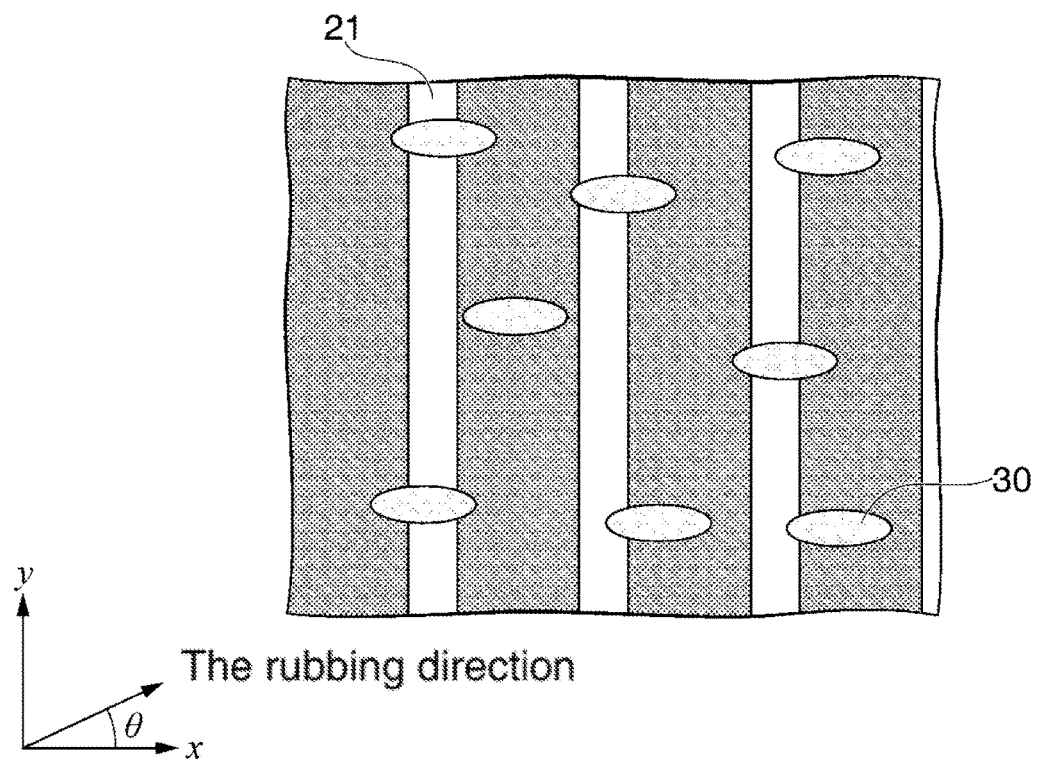
FIG. 4 is a view schematically showing an alignment direction of a liquid-crystal induced by an alignment film 4.

Here, the alignment direction (alignment direction of liquid-crystal molecules) of the alignment film 4 in the present embodiment will be described with reference to FIG. 4. FIG. 4 is a view schematically showing an alignment direction of a liquid-crystal induced by the alignment film 4. In the present invention, a liquid-crystal composition having negative dielectric anisotropy is used. Therefore, when the vertical direction (direction in which a horizontal electric field is formed) with respect to the line forming a comb shape of the pixel electrode 21 is defined as the x axis, the x axis and the liquid-crystal molecule 30 are preferably disposed such that the angle θ between the x axis and the long axis direction of the liquid-crystal molecule 30 becomes about 0° to 45°. In the example shown in FIG. 3, the angle θ between the x axis and the long axis direction of the liquid-crystal molecule 30 is about 0°. To induce the alignment direction of the liquid-crystal in this manner is for increase in the maximum transmittance of the liquid-crystal display device.

By the alignment film being a photo-alignment film, it is possible to reduce the decrease in alignment restricting force with respect to the liquid-crystal molecules due to rubbing irregularity, and it is possible to provide an FFS mode liquid-crystal display element having excellent transmittance characteristics.

In addition, the polarizing plate 1 and the polarizing plate 8 can be adjusted such that the viewing angle or the contrast is improved by adjusting the polarization axis of each polarizing plate, and the polarizing plate 1 and the polarizing plate 8 preferably have transmission axes orthogonal to each other such that these transmission axes are operated in a normally black mode. In particular, any one of the polarizing plate 1 and the polarizing plate 8 is preferably disposed so as to have a transmission axis parallel to the alignment direction of the liquid-crystal molecule 30. In addition, the product of the refractive index anisotropy Δn of the liquid-crystal and the cell thickness d is preferably adjusted such that the contrast is at a maximum. Furthermore, a phase difference film for widening the viewing angle can also be used.

In addition, in the liquid-crystal display element according to the present invention, it is preferable that the common electrode is formed on almost the entire surface of the first substrate and disposed on the first substrate side rather than the pixel electrode. That is, a preferable embodiment of the liquid-crystal display element according to the present invention has a first substrate and a second substrate disposed to face each other, a liquid-crystal layer containing a liquid-crystal composition with which the gap between the first substrate and the second substrate is filled, an electrode layer including a common electrode including a transparent conductive material, a plurality of gate bus lines and data bus lines disposed in a matrix shape, a thin film transistor provided at the intersection at which the gate bus lines and the data bus lines intersect each other, and a pixel electrode including a transparent conductive material and forming a fringe electric field between the common electrode driven and the pixel electrode by being driven by the thin film transistor, for each pixel on the first substrate, and photo-alignment film layers inducing homogeneous alignment, which are formed between the liquid-crystal layer and the first substrate and between the liquid-crystal layer and the second substrate, respectively, in which the distance R between the pixel electrode and the common electrode is smaller than the distance G between the first substrate and the second substrate, and the common electrode is formed on almost the entire surface of the first substrate and disposed on the first substrate side rather than the pixel electrode. Moreover, FIGS. 1 to 4 which are a form of the present invention show a form in which the common electrode is formed on almost the entire surface of the first substrate and disposed on the first substrate side rather than the pixel electrode.

The FFS type liquid-crystal display element described with reference to FIGS. 1 to 4 is simply an example, and the present invention can be performed in other various forms within the scope of the technical idea of the present invention.

Another example of the liquid-crystal display element according to the present invention will be described below with reference to FIGS. 5 and 6.

Figure 5:
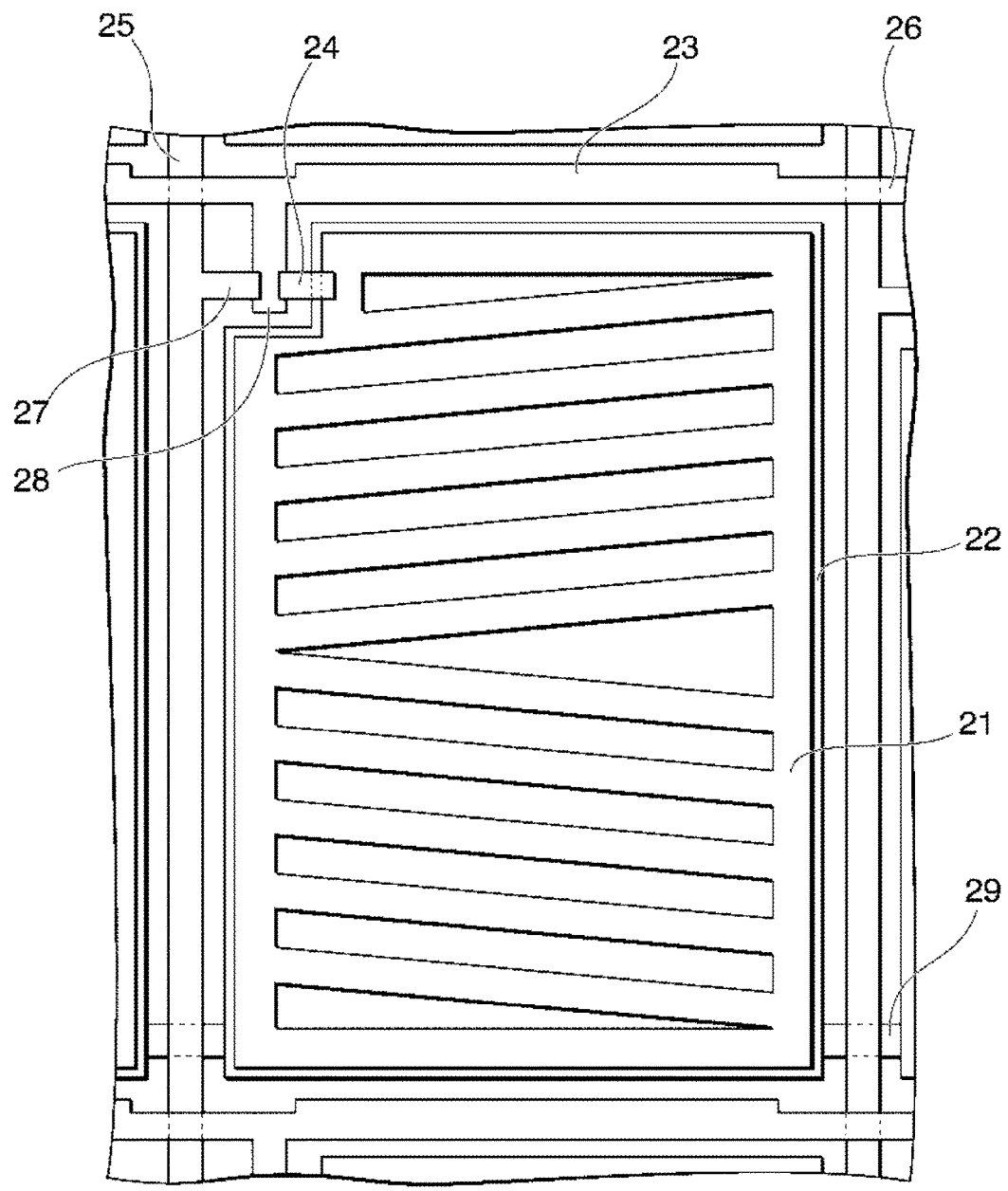
FIG. 5 is an enlarged plan view of another example of the region surrounded by the line II of the electrode layer 3 formed on the substrate 2 in FIG. 1.

For example, FIG. 5 is another embodiment of an enlarged plan view of the region surrounded by the II line of the electrode layer 3 formed on the substrate 2 in FIG. 1. As shown in FIG. 5, the pixel electrode 21 may be configured to have a slit. In addition, the pattern of the slit may be formed so as to have a tilt angle with respect to the gate bus line 26 or the data bus line 25.

The pixel electrode 21 shown in FIG. 5 has a shape in which a substantially rectangular plate electrode is hollowed out in a substantially rectangular frame shape notch portion. In addition, the comb tooth shape common electrode 22 is formed on one surface through the insulating layer 18 (not shown) on the back surface of the pixel electrode 21. The shortest distance R between the common electrode and the pixel electrode which are adjacent is shorter than the shortest distance G between the alignment layers. In addition, the surface of the pixel electrode is preferably covered with a protective insulation film and an alignment film layer. In the region surrounded by the plurality of gate bus lines 20 and the plurality of data bus lines 24, a storage capacitor (not shown) for storing a display signal supplied through the data wire 24 may be provided. Moreover, the shape of the notch portion is not particularly limited, and in addition to the substantially rectangular shape shown in FIG. 5, notch portions having a known shape such as an oval shape, a circular shape, a rectangular shape, a diamond shape, a triangular shape, or a parallelogram shape can be used.

Figure 6:
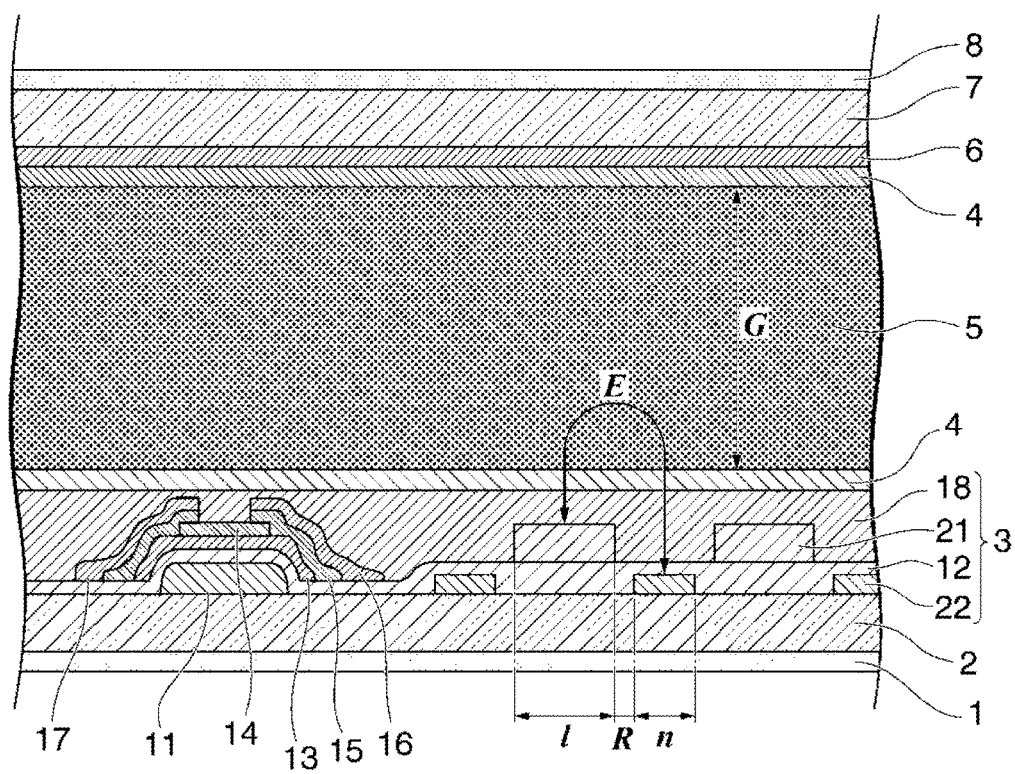
FIG. 6 is a sectional view of another example obtained by cutting the liquid-crystal display element shown in FIG. 1 in the line III-III direction in FIG. 2.
Figure 8:
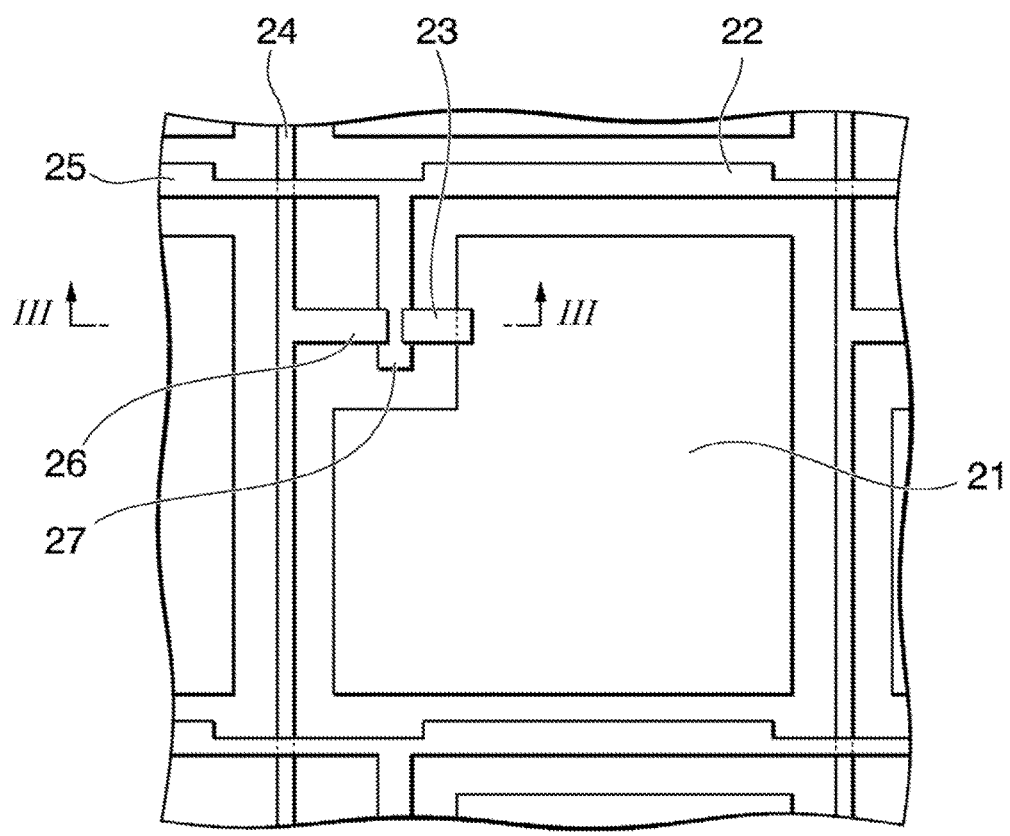
FIG. 8 is an enlarged plan view of a region surrounded by the line II of the electrode layer 3 including a thin film transistor formed on the substrate in FIG. 1.

FIG. 6 is an embodiment different from FIG. 3, and another example of a sectional view obtained by cutting the liquid-crystal display element shown in FIG. 1 in the III-III line direction in FIG. 2. The first substrate 2 in which an alignment layer 4 and the electrode layer 3 including the thin film transistor 20 are formed on the surface and the second substrate 8 in which the alignment layer 4 is formed on the surface are disposed such that the alignment layers face each other with a predetermined space D, and the liquid-crystal layer 5 including a liquid-crystal composition fills this space. The gate insulating film 12, the common electrode 22, the insulating film 18, the pixel electrode 21, and the alignment layer 4 are stacked on a part of the surface of the first substrate 2 in this order. In addition, as also shown in FIG. 8, the pixel electrode 21 has a shape in which the central portion and both ends of a flat plate body are hollowed out in a triangular notch portion and the remaining region is hollowed out in a rectangular notch portion, and the common electrode 22 has a structure in which the comb tooth shape common electrode is disposed on the first substrate side rather than the pixel electrode in substantially parallel to the substantially oval shape notch portion of the pixel electrode 21.

In addition, in the example shown in FIG. 6, the common electrode 22 having a comb shape or a slit is used, and the distance between the pixel electrode 21 and the common electrode 22 becomes R=α. Furthermore, in FIG. 3, an example in which the common electrode 22 is formed on the gate insulating film 12 is shown, but, as shown in FIG. 6, the common electrode 22 is formed on the first substrate 2, and the pixel electrode 21 may be provided through the gate insulating film 12. It is preferable that the electrode width l of the pixel electrode 21, the electrode width n of the common electrode 22, and the distance R between electrodes are suitably adjusted to such an extent that all the liquid-crystal molecules in the liquid-crystal layer 5 can be driven by the electric field generated.

In the FFS mode liquid-crystal display element according to the present invention, since a specific liquid-crystal composition and a specific photo-alignment film are used, it is possible to achieve both high speed response and suppression of display defects.

Figure 7:
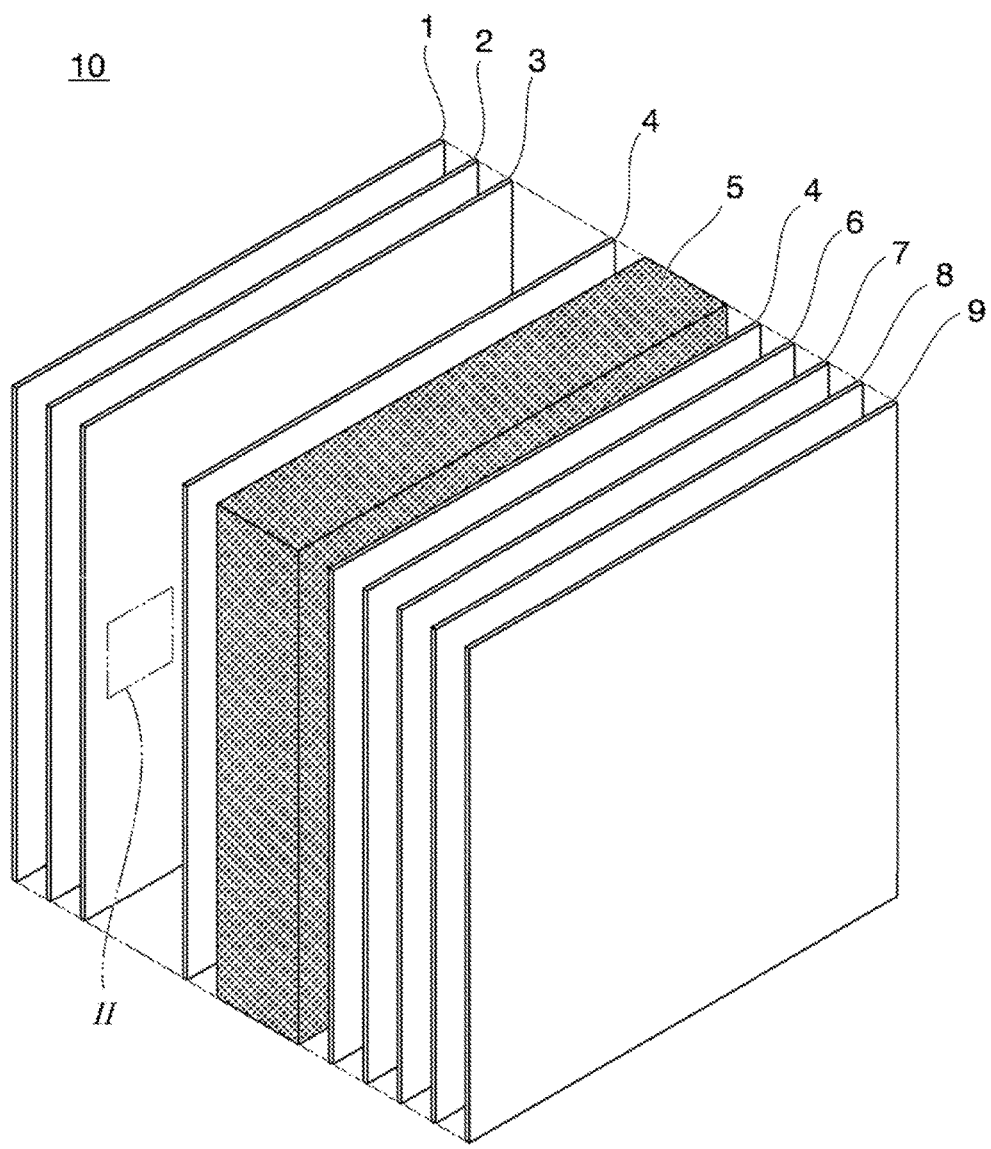
FIG. 7 is a view schematically showing a configuration of a vertical electric field mode liquid-crystal display element.
Figure 9:
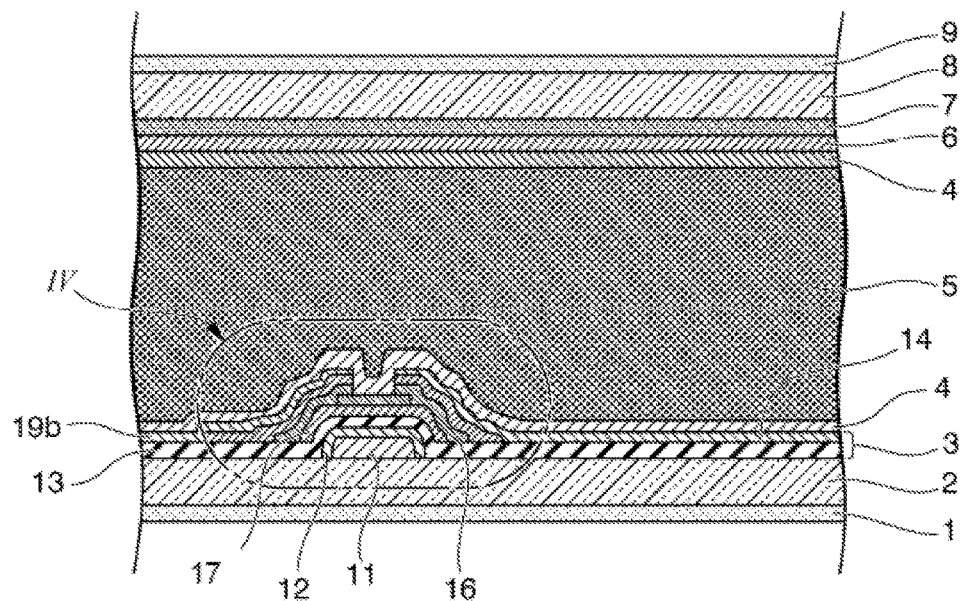
FIG. 9 is a sectional view obtained by cutting the liquid-crystal display element shown in FIG. 1 in a line III-III direction in FIG. 8.

Another preferable embodiment of the present invention is a vertical electric field type liquid-crystal display element using a liquid-crystal composition. FIG. 7 is a view schematically showing a configuration of a vertical electric field type liquid-crystal display element. In addition, in FIG. 7, for explanation, respective configuration elements are described in separated state for convenience. FIG. 8 is an enlarged plan view of a region surrounded by the line II of the electrode layer 3 (or also referred to as the thin film transistor layer 3) including the thin film transistor formed on the substrate in FIG. 7. FIG. 9 is a sectional view obtained by cutting the liquid-crystal display element shown in FIG. 1 in the line III-III direction in FIG. 8. Hereinafter, the vertical electric field type liquid-crystal display element according to the present invention will be described with reference to FIGS. 7 to 9.

The liquid-crystal display element 10 according to the present invention is configured to have a first substrate 80 provided with a transparent electrode (layer) 60 (also referred to as a common electrode 60) formed of a transparent conductive material as described in FIG. 7, a second substrate 20 including a thin film transistor layer 30 in which a thin film transistor which controls the pixel electrode formed of a transparent conductive material and the pixel electrode provided in each pixel, has been formed, and a liquid-crystal composition (or a liquid-crystal layer 50) sandwiched between the first substrate 80 and the second substrate 20, and in the liquid-crystal display element 10, the orientation of the liquid-crystal molecules in the liquid-crystal composition at the time when a voltage is not applied is substantially perpendicular to the substrates 20 and 80, and the liquid-crystal composition of the present invention is used as the liquid-crystal composition. In addition, as shown in FIGS. 7 and 9, the second substrate 20 and the first substrate 80 may be sandwiched between a pair of polarizing plates 10 and 90. In FIG. 7, a color filter 70 is provided between the first substrate 8 and the common electrode 6. Furthermore, a pair of photo-alignment films 40 which are adjacent to the liquid-crystal layer 50 according to the present invention and come into direct contact with the liquid-crystal composition constituting the liquid-crystal layer 50 may be formed on the surfaces of the transparent electrodes (layers) 60 and 140.

That is, the liquid-crystal display element 10 according to the present invention has a configuration in which a second polarizing plate 10, a second substrate 20, the electrode layer (or also referred to as a thin film transistor layer) 30 including a thin film transistor, the photo-alignment film 40, the layer 50 including a liquid-crystal composition, the photo-alignment film 40, the common electrode 60, the color filter 70, the first substrate 80, and the first polarizing plate 90 are sequentially stacked.

In addition, as shown in FIGS. 8 and 9, in the electrode layer 30 including a thin film transistor formed on the surface of the second substrate 20, a gate wire 250 for supplying a scanning signal and a data wire 240 for supplying a display signal are disposed to intersect each other, and in the region surrounded by the plurality of gate wires 250 and the plurality of data wires 240, a pixel electrode 210 is formed in a matrix shape. As a switching element for supplying a display signal to the pixel electrode 210, in the vicinity of the intersection at which the gate wire 250 and the data wire 240 intersect each other, a thin film transistor including a source electrode 260, a drain electrode 230, and a gate electrode 270 is provided in connection with the pixel electrode 210. Furthermore, in the region surrounded by the plurality of gate wires 250 and the plurality of data wires 240, a storage capacitor 220 for storing a display signal supplied through the data wire 240 is provided.

In the present invention, a thin film transistor as described in FIG. 2 can be suitably used in the liquid-crystal display element which is an inverted staggered type, and each of the gate wire 250 and the data wire 240 is preferably a metal film, and the case of using an aluminum wire is particularly preferable. Furthermore, the gate wire 250 and the date wire 240 are disposed to overlap each other through the gate insulating film.

In addition, from the viewpoint of preventing the light leakage, for the color filter 70, black matrices (not shown) are preferably formed at the portions corresponding to the thin film transistor and the storage capacitor 22.

A preferable aspect of the structure of the thin film transistor of the liquid-crystal display element according to the present invention is as described above.

In the process of manufacturing a liquid-crystal display element as described above, the generation of the drip marks is significantly influenced by a liquid-crystal material which is injected, and is also inevitably influenced by the configuration of the liquid-crystal display element, and as shown in FIG. 9, and since only the thin photo-alignment film 40 and the transparent electrodes 60 and 140 are members in direct contact with the liquid-crystal composition, for example, by a combination of a chemical structure of the polymer used in the photo-alignment film 40 and a liquid-crystal compound having a specific chemical structure, the generation of drip marks is influenced.

In addition, in the FFS mode liquid-crystal display element, when the liquid-crystal layer 5 is injected between the first substrate 2 and the second substrate 7, for example, a method such as a vacuum injection method or a drop injection (ODF: One Drop Fill) method is performed, but, in the present invention, in the ODF method, it is possible to suppress generation of drip marks when the liquid-crystal composition is dropped on a substrate. Moreover, the drip mark is defined as a phenomenon in which, in the case of a black display, white mark formed by dropping of the liquid-crystal composition comes up to the surface.

The generation of the drip marks is significantly influenced by a liquid-crystal material which is injected, and is also inevitably influenced by the configuration of the display element. In the FFS mode liquid-crystal display element, the thin film transistor formed in the display element and the pixel electrode 21 having a comb shape or a slit do not have a member which separates the liquid-crystal composition other than the thin alignment film 4 or a thin alignment film 4 and the thin insulation protecting layer 18, and thus, the possibility that the ionic materials cannot be blocked is high, and it is impossible to avoid generation of the drip marks due to the interaction between a metal material configuring the electrode and the liquid-crystal composition, but, by using the liquid-crystal composition and the photo-alignment film of the present invention in an FFS type liquid-crystal display element in combination, the generation of the drip marks is effectively suppressed.

In addition, in the manufacturing process of a liquid-crystal display element according to the ODF method, it is necessary to drop an optimal liquid-crystal injection amount according to the size of the liquid-crystal display element, but, for the liquid-crystal composition of the present invention, for example, effects with respect to a rapid pressure change or impact in a dropping apparatus which occurs when the liquid-crystal is dropped are small, and continuously stably dropping a liquid-crystal over a long period of time is possible, and thus, it is also possible to maintain a high yield of the liquid-crystal display element. In particular, in a small-sized liquid-crystal display element which is frequently used in smartphones in vogue recently, it is difficult to control deviation from the optimal value to be within a certain range since the optimal liquid-crystal injection amount is small, but by using the liquid-crystal composition of the present invention, it is possible to realize the stable discharging amount of liquid-crystal material even in the case of a small-sized liquid-crystal display element.

Hereinafter, the manufacture method of the liquid-crystal display element of the present invention will be descried. For example, the liquid-crystal display element of the present invention is preferably manufactured by the following steps (1) to (3).

In the manufacture method of the liquid-crystal display element according to the present invention, it is preferable that after the photo-alignment film precursor solution according to the present invention is applied onto a substrate, by heating the solution-applied surface, a coating film is formed on the substrate (step (1)). In more detail, for example, the photo-alignment film precursor solution of the present invention is applied onto a conductive film formed surface of the substrate provided with a transparent conductive film which has been patterned in a comb tooth shape and one surface of the counter substrate not provided with a conductive film, respectively, and then, by heating each coated surface, a coating film is formed.

The photo-alignment film precursor solution according to the present invention is preferably a solution including the photoresponsive polymer described above. The photoresponsive polymer preferably contains at least one type of polymer selected from the group consisting of polyamic acid and polyimide obtained by reacting tetracarboxylic dianhydride and a diamine compound, and an organic solvent.

The photo-alignment film precursor solution of the present invention is preferably respectively applied by a offset printing method, a spin coating method, a roll coating method, or an ink jet printing method. As the substrate, for example, a transparent substrate formed of glass such as float glass or soda glass; or plastic such as polyethylene terephthalate, polybutylene terephthalate, polyether sulfone, polycarbonate, or poly(alicyclic olefin) can be used. As the transparent conductive film provided on one surface of (a first) substrate, a NESA film formed of tin oxide ($SnO_2$), an ITO film formed of indium oxide-tin oxide ($In_2O_3$—$SnO_2$), or the like may be used. Furthermore, to obtain a transparent conductive film patterned, for example, a method of forming a pattern by photo etching after forming a transparent conductive film without a pattern, a method of using a mask having a desired pattern when forming a transparent conductive film, or the like can be adopted. When application of the photo-alignment film precursor solution is performed, to further improve the adhesion between the substrate surface or the transparent conductive film and the coating film, the substrate surface may be subjected to a surface treatment in advance by a known method such as a functional silane compound, functional titanium compound, or the like.

After the photo-alignment film precursor solution is applied, pre-baking may be performed if necessary, and the pre-baking temperature in this case is preferably 30° C. to 200° C. In addition, the pre-baking time is preferably 0.25 to 10 minutes. Thereafter, the solvent is completely removed, and for the purpose of thermal imidization of the amic acid structure present in the polymer, a firing step is preferably performed, if necessary. The firing temperature at this time is preferably 80° C. to 300° C. The firing time is preferably 5 to 200 minutes. In this manner, the film thickness of the film formed is preferably 0.001 to 1 µm.

In addition, in a case where the polymer included in the photo-alignment film precursor solution of the present invention is an imidized polymer having polyamic acid or an imide ring structure and an amic acid structure, by proceeding a dehydration and ring-closing reaction by further heating after coating film formation, a further imidized coating film may be formed.

In the manufacture method of the liquid-crystal display element according to the present invention, the coating film including polyamic acid or polyimide formed on the substrate is preferably irradiated with light (step (2)). In addition, the step (2) may be performed after a step (3) described below. As the light with which the coating film is irradiated, ultraviolet rays or visible rays including light having a wavelength of 150 to 800 nm can be used, and ultraviolet rays including light having a wavelength of 300 to 400 nm are preferable.

As the light source of irradiation light, a low pressure mercury lamp, a high pressure mercury lamp, a deuterium lamp, a metal halide lamp, an argon resonance lamp, a xenon lamp, or excimer laser can be used. Moreover, ultraviolet rays in the above-described preferable wavelength region can be obtained by means using a light source in combination with, for example, a filter, a diffraction grating, or the like. The irradiation amount of light is preferably equal to or greater than 1,000 $J/m^2$ and equal to or less than 100,000 $J/m^2$.

In the manufacture method of the liquid-crystal display element according to the present invention, it is preferable that a pair of substrates on which a photo-alignment film or a coating film has been formed are disposed to face each other through a gap (cell gap), and the gap is filled with the liquid-crystal composition according to the present invention (step (3)).

Examples of the method of filling with the liquid-crystal composition include (1) a vacuum injection method (a method of configuring liquid-crystal cells by disposing a pair of substrates on which a photo-alignment film or a coating film has been formed to face each other through a gap (cell gap) such that the alignment directions of the films on two substrates become orthogonal, by attaching the peripheral portions of the two substrates with a sealing agent, by filling the cell gap with a liquid-crystal by injecting the liquid-crystal into the cell gap partitioned by the substrate surface and the sealing agent, and by sealing the injection hole) and (2) an ODF method. In the method of introducing a liquid-crystal composition by the vacuum injection method, drip marks are less likely to be generated, but with the increase in a substrate size, there is a problem in the manufacturing time, cost, or the like. However, in the present invention, the display element which is manufactured in combination of a photo-alignment film and a liquid-crystal composition by the ODF method can be more suitably used.

In addition, since, in the FFS mode as in the present invention, the electrode layer 3 (a surface covered with a photo-alignment film) such as TFT is formed on the surface of the same substrate (in FIG. 3, the first substrate), a large number of unevenness are present on the surface, and an environment in which generation of drip marks is likely to be promoted is formed, but by combining a photo-alignment film and a liquid-crystal composition, this problem is thought to be alleviated.

EXAMPLES

Hereinafter, the present invention will be described in more detail with examples, and the present invention is not limited to the examples. In addition, "%" in the compositions of the following examples and comparative examples means "% by mass".

In the examples, the measured characteristics are as follows.

$T_{NI}$: nematic phase-isotropic liquid phase transition temperature (° C.)

Δn: refractive index anisotropy at 25° C.

Δε: dielectric anisotropy at 25° C.

η: viscosity (mPa·s) at 20° C.

$γ_1$: rotational viscosity (mPa·s) at 25° C.

VHR: voltage holding ratio (%) at 60° C. under the conditions of a frequency of 60 Hz and an applied voltage of 1 V.

Burn-in:

After displaying a predetermined fixed pattern in the display area for 1,000 hours, by visually inspecting the residual image level of the fixed pattern at the time when full screen was uniformly displayed, the evaluation of the burn-in on a liquid-crystal display element was performed on a scale of four stages described below.

A: Residual image was not observed

B: Residual image was very slightly observed, however it was an acceptable level C: Residual image was observed, and it was an unacceptable level D: Residual image was observed, and it was a very severe level Drip Marks:

By visually observing drip marks appeared in white when the entire screen was displayed in black, the evaluation of the drip marks on a liquid-crystal display device was performed on a scale of four stages described below.

A: Residual image was not observed

B: Residual image was very slightly observed, however it was an acceptable level C: Residual image was observed, and it was an unacceptable level D: Residual image was observed, and it was a very severe level Process Adaptability:

in ODF process, dropping the liquid-crystal by 50 pL at one time was performed 100,000 times using a constant volume measuring pump, and the change in amount of liquid-crystal dropped by each 100 times of the following "0 to 100 times, 101 to 200 times, 201 to 300 times, . . . , 99,901 to 100,000 times" was evaluated on a scale of four stages described below.

A: Change was extremely small (liquid-crystal display element could be stably manufactured)

B: Change was slightly observed, but it was an acceptable level

C: Change was observed, and it was an unacceptable level (yield was deteriorated by generation of spots)

D: Change was observed, and it was a very severe level (liquid-crystal leakage or vacuum bubbles were generated)

Solubility at Low Temperatures:

After preparing a liquid-crystal composition, 1 g of the liquid-crystal composition was weighed and placed in a sample bottle of 2 mL, the temperature change having one cycle of "−20° C. (maintained for 1 hour)→heating (0.1° C./min)→0° C. (maintained for 1 hour)→heating (0.1° C./min)→20° C. (maintained for 1 hour)→cooling (−0.1° C./min)→0° C. (maintained for 1 hour)→cooling (−0.1° C./min)→−20° C." was continuously given thereto in a temperature controlled test chamber, the generation of precipitates from the liquid-crystal composition was visually observed, and the solubility evaluation at low temperatures was performed on a scale of four stages described below.

A: Precipitates were not observed for equal to or longer than 600 hours.

B: Precipitates were not observed for equal to or longer than 300 hours.

C: Precipitates were observed within 150 hours.

D: Precipitates were observed within 75 hours.

Moreover, in the examples the following abbreviations were used for describing the compounds.

(Side Chain)

n —CnH2n+1 a linear alkyl group having n carbon atoms

On —OCnH2n+1 a linear alkoxy group having n carbon atoms

V —C=CH2 a vinyl group

Vn —C=C—CnH2n+1 1-alkene having (n+1) carbon atoms (Ring Structure)

[Chem. 38]

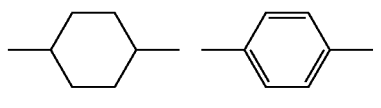

Cy          Ph

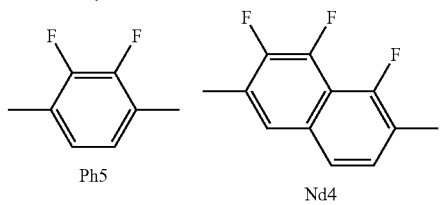

Ph5         Nd4

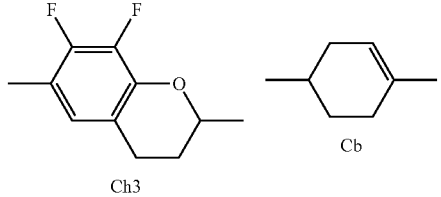

Ch3         Cb

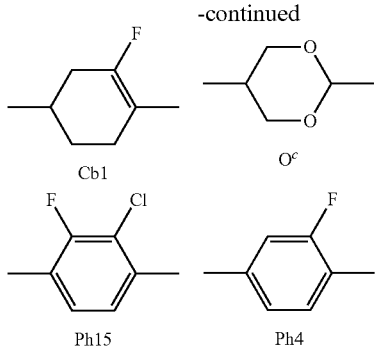

Example 1 (Liquid-Crystal Composition 1)

The liquid-crystal composition (liquid-crystal composition 1) having the compositional ratio described below was prepared, and the physical properties thereof were measured. The results are shown in the following Table.

Using the liquid-crystal composition of the present invention, an FFS mode or VA mode liquid-crystal display element having a cell thickness of 3.0 μm which is general for a TV was prepared, and an alignment film was prepared in the following manner.

<Photodecomposition Type Photo-Alignment Film>
"Photo-Alignment Film 1"

1.0 mol % of p-phenylenediamine was dissolved in N-methyl-2-pyrrolidone, and 1 mol % of cyclobutane tetracarboxylic dianhydride was added thereto, and the resultant was allowed to react at 20° C. for 12 hours, whereby polyamic acid varnish having a standard polystyrene conversion weight average molecular weight of about 100,000 and a weight average molecular weight/number average molecular weight (Mv/Mn) of about 1.6 was obtained. Next, after this polyamic acid varnish was diluted to a concentration of 6%, 0.3% by weight of γ-aminopropyltriethoxysilane as a solid content was added thereto, and the resultant was printed on a first thin film laminate and a second-thin film laminate, followed by heating at 210° C. for 30 minutes, whereby a photodecomposition type insulating film (polyimide film) was formed.

Thereafter, the photodecomposition type polyimide film was subjected to, for example, alignment processing of irradiating with light (ultraviolet rays) from a polarized UV lamp having an emission line in a wavelength range of 240 nm to 400 nm. In this alignment processing, for example, irradiation was performed at an irradiation energy of about 4 J/cm$^2$ with linearly polarized light having a polarization ratio of about 20:1, which was obtained from ultraviolet rays from a high pressure mercury lamp using a pile polarizer obtained by stacking quartz substrates.

Photo-Alignment Film 2

(Synthesis of Polyamic Acid A)

1.0 mol % of 4,4'-diaminodiphenyl ether was dissolved in N-methyl-2-pyrrolidone, and 1 mol % of cyclobutane tetracarboxylic dianhydride was added thereto, and the resultant was allowed to react at 20° C. for 12 hours, whereby a solution of a polyamic acid A having a standard polystyrene conversion weight average molecular weight of about 50,000 and a weight average molecular weight/number average molecular weight (Mv/Mn) of about 1.6 was obtained.

(Synthesis of Polyamic Acid B)

1.0 mol % of 4,4'-diaminodiphenylamine was dissolved in N-methyl-2-pyrrolidone, and 1 mol % of cyclobutane tetracarboxylic dianhydride was added thereto, and the resultant was allowed to react at 20° C. for 6 hours, whereby a solution of a polyamic acid B having a standard polystyrene conversion weight average molecular weight of about 55,000 and a weight average molecular weight/number average molecular weight (Mv/Mn) of about 1.9 was obtained.

(Preparation of Mixture)

The polyamic acid A solution and the polyamic acid B solution were mixed such that the solid content mass ratio became 1:1, and the resultant was diluted with a mixed solvent of N-methyl-2-pyrrolidone and 2-butoxyethanol having a mass ratio of 1:1, whereby a polyamic acid solution was obtained.

The polyamic acid solution was printed on the first thin film laminate and the second thin film laminate, and heated to 230° C. for 30 minutes, whereby a photodecomposition type insulating film (polyimide film) was formed. Thereafter, irradiation was performed on the photodecomposition type polyimide film at an irradiation energy of about 0.5 J/cm$^2$ with Linearly polarized light having an extinction ratio of about 100:1 which was obtained from light (ultraviolet rays) from a high pressure ultraviolet lamp using a wire-grid polarizer.

"Photo-Alignment Film 3"

(Preparation of Solution for Photo-Alignment Film)

32.40 g of N-methyl-2-pyrrolidone was added to 3.24 g of 1,4-phenylenediamine, and the resultant was stirred to be dissolved while blowing nitrogen thereto. While stirring this diamine solution, 7.81 g of cyclobutane tetracarboxylic dianhydride was added thereto, then, 78.03 g of N-methyl-2-pyrrolidone was further added thereto, and the resultant was stirred at 30° C. for 18 hours in a nitrogen atmosphere to perform the reaction. Furthermore, 62.68 g of a mixed solvent of N-methyl-2-pyrrolidone and 2-butoxyethanol having a mass ratio of 1:1 was added thereto at ordinary temperature for dilution, and the resultant was stirred, whereby a solution for a photo-alignment film was obtained.

(Formation of Liquid-Crystal Alignment Film)
(Formation of Photodecomposition Type Resin Film)

The solution for a photo-alignment film was applied onto a comb shape transparent electrode formed on a first substrate by a spin coating method, whereby a resin film having a dry film thickness of 0.1 μm was formed. An alignment film was formed on a second substrate also in the same manner.

The substrate on which the resin film had been formed was heated at 230° C. for 30 minutes to perform the reaction, whereby a photodecomposition type resin film (polyimide film) was formed.

(Alignment Processing)

Thereafter, ultraviolet rays having a wavelength of 256 nm were taken out from a high pressure mercury lamp using a band pass filter, then, linearly polarized light having an extinction ratio of about 100:1 was obtained using a wire-grid polarizer, and photo-alignment processing was performed on the photodecomposition type resin film by irradiation with an irradiation energy of about 1.0 J/cm$^2$. Thereafter, firing was performed at 230° C. for 30 minutes to remove the impurities produced by decomposition, and the polyimide film was washed with pure water and dried, whereby a glass substrate on which a photodecomposition type alignment film had been formed was obtained.

<Photodimerization Type Photo-Alignment Film>
Photo-Alignment Film 4
(Synthesis of Monomer)
Synthesis Example 1
By the method shown in the following scheme, a target monomer (I-1-1) was synthesized through intermediates of compounds 1 to 6.
[Chem 39]
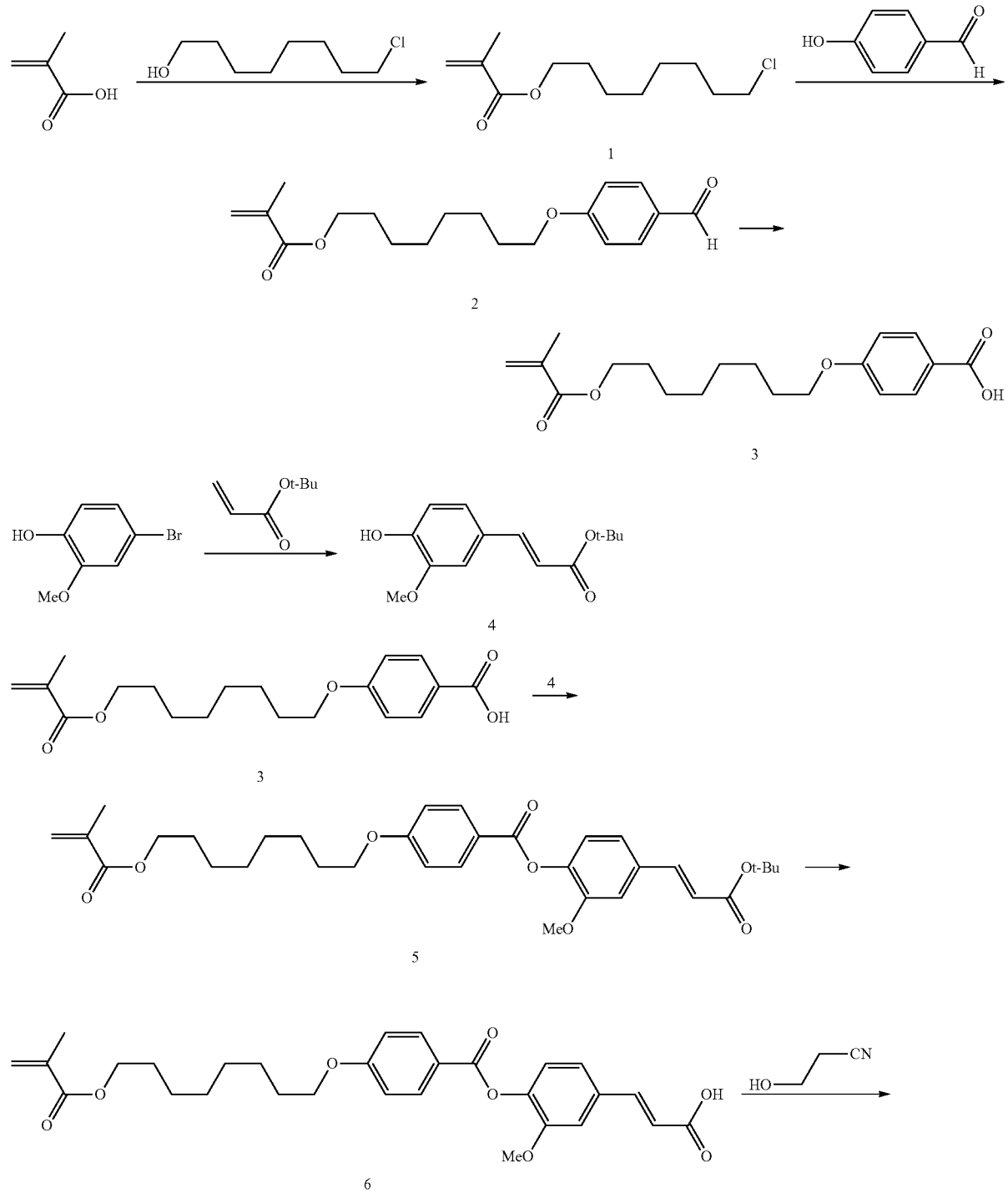

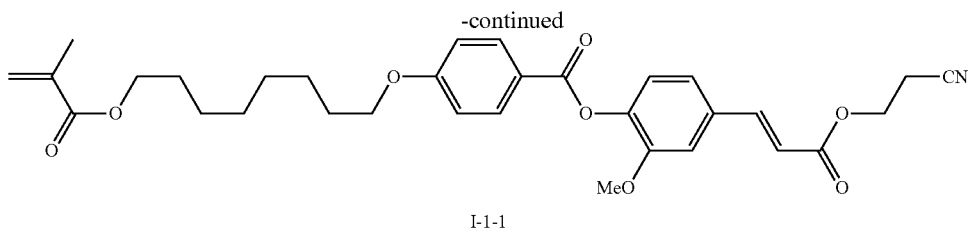

I-1-1

(Synthesis of Compound 1)

[Chem. 40]

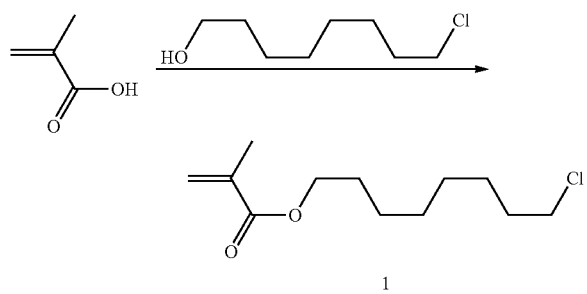

199 g (1.21 of 8-chlorooctanol, 158.3 g (1.84 mol) of methyl methacrylate, 1.5 g of 4-methoxyphenol, and 2.8 g (0.12 mol) of p-toluenesulfonic acid were dissolved in 450 mL of cyclohexane, and the resultant was heated to reflux for 6 hours. After the reaction solution was cooled to room temperature, the solution was washed three times with water, three times with a saturated sodium hydrogen carbonate aqueous solution, and two times with a saturated saline solution. The solution was dried over anhydrous sodium sulfate, and the solvent was distilled off, whereby 258 g of a compound 1 (8-chlorooctyl methacrylate) was obtained as colorless and transparent liquid. Purity of 99% (GC). EI-MS: 232[M+]

(Synthesis of Compound 2)

[Chem 41]

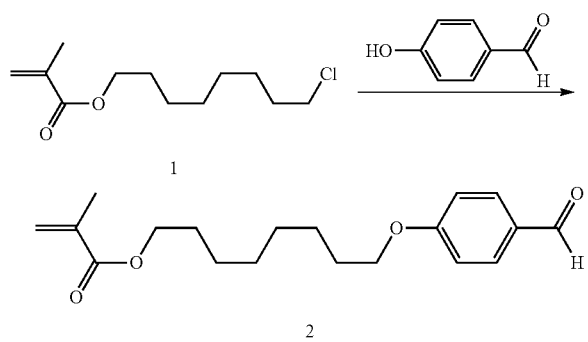

34.6 g (0.284 mol) of 4-hydroxybenzaldehyde, 49 g (0.341 mol) of potassium carbonate, and 0.1 g of 18-crown-6 were dissolved in 500 mL of dimethylformamide, and 58 g (0.284 mol) of 8-chlorooctyl methacrylate was added thereto at room temperature in a nitrogen atmosphere. The reaction solution was heated to 90° C. and stirred for 6 hours, it was confirmed using GC that the reaction ended, and the reaction solution was cooled to room temperature and filtered. 200 mL of ethyl acetate and 200 mL of water were added thereto, and the resultant was filtered again. The organic layer and the aqueous layer were separated, then, ethyl acetate was added to the aqueous layer, and extraction was performed three times. All the organic layers were collected, and washed three times with a saturated saline solution. To dry the organic layer, anhydrous sodium sulfate was added thereto, and the solvent was distilled off, whereby a crude compound 2 was obtained. The obtained compound 2 was used in the next reaction without specific purification.

EI-MS: 318[M$^+$]

(Synthesis of Compound 3)

[Chem. 42]

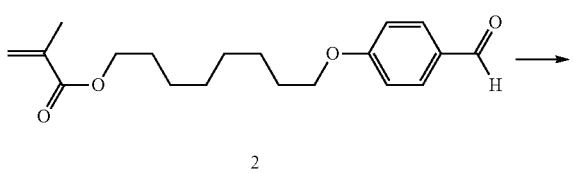

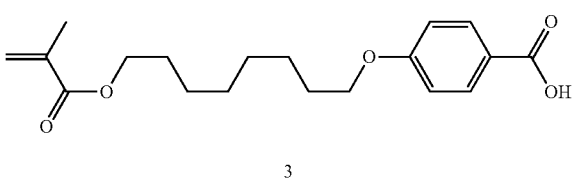

50 g (a bout 0.14 mol) of the compound 2, 4.43 g (0.029 mol) of sodium dihydrogen phosphate, and 16 g of 30% hydrogen peroxide water were dissolved in a mixture of 60 mL of water and 350 mL of acetonitrile, and the resultant was cooled with ice. Then, a solution obtained by diluting 23 g of 78% sodium chlorite with 200 mL of water was added dropwise to the reaction solution, and the reaction solution was stirred at room temperature overnight. It was confirmed using HPLC that the reaction ended. 10% hydrochloric acid was added to the reaction solution until the pH became 1, and the precipitated white solid was separated by filtration. The obtained solid was washed three times with water. The obtained solid was dissolved in dichloromethane, and anhydrous sodium sulfate was added thereto to dry the resultant. Heptane was added to the solution, then, the dichloromethane was distilled off under reduced pressure, and the precipitated solid was separated by filtration, whereby 30 g of a target compound 3 was obtained. Purity of 99% (HPLC).

(Synthesis of Compound 4)

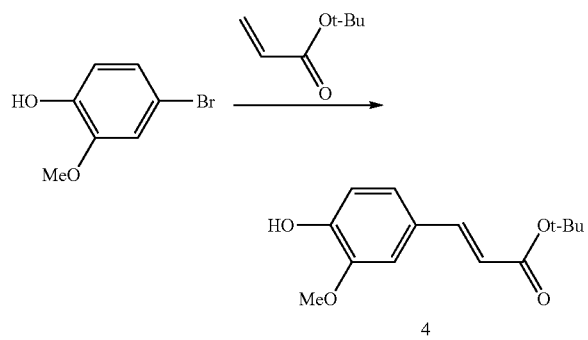

50 g (0.246 mol) of 4-bromo-2-methoxyphenol, 47.2 g (0.369 mol) of t-butyl acrylate, and 50.9 g (0.369 mol) of potassium carbonate were dissolved in 700 mL of N-methylpyrrolidone, and the system was purged with nitrogen. 0.055 g (0.246 mmol) of palladium acetate was added to the reaction solution, and the system was purged with nitrogen again and stirred at 130° C. for 6 hours. It was confirmed using HPLC that the reaction ended. After the reaction solution was cooled to room temperature, 300 mL of ethyl acetate and 300 mL of 5% hydrochloric acid were added to this. The organic layer and the aqueous layer were separated, then, ethyl acetate was added to the aqueous layer, and extraction was performed. All the organic layers were collected, then, washed three times with a saturated saline solution, and dried over anhydrous sodium sulfate. The solvent was distilled off, and 80 g of silica gel was added thereto to form slurry. A column of 100 g of alumina/300 g of silica gel was filled with this and elution was performed with an ethyl acetate/heptane mixed solution. The solvent was distilled off, and the obtained crude crystal was recrystallized from heptane, whereby 43.2 g of a compound 4 was obtained as a white solid. Purity of 99% (HPLC). EI-MS: 250 [M+]

(Synthesis of Compound 5)

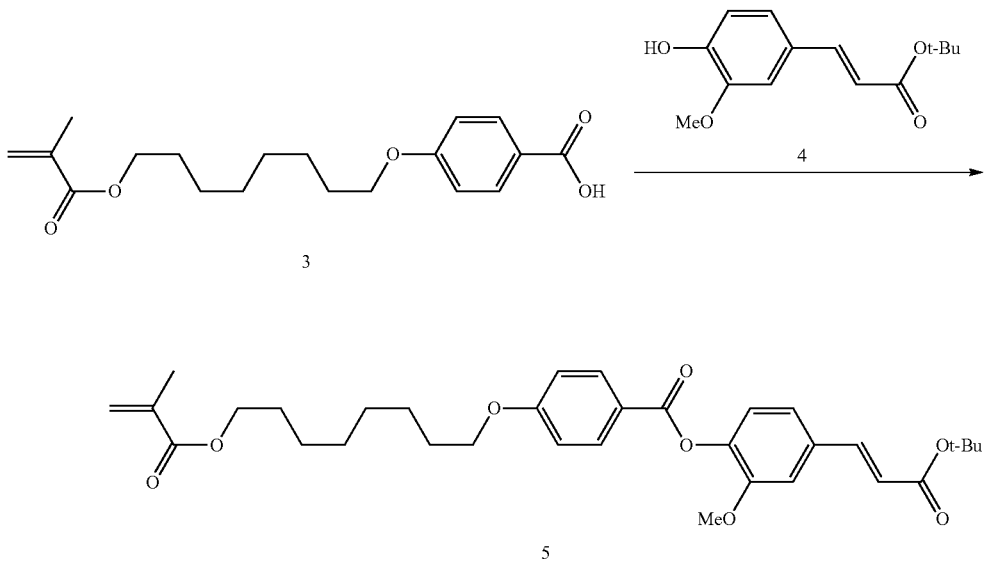

22.3 g (0.06676 mol) of the compound 3, 16.7 g (0.06677 mol) of the compound 4, and 1.22 g (10 mmol) of 4-dimethylaminopyridine were dissolved in 400 mL of dichloromethane, and the system was purged with nitrogen and cooled with ice. Then, a solution obtained by dissolving 12.6 g (0.1 mol) of N,N-diisopropylcarbodiimide in 100 mL of dichloromethane was added dropwise to the reaction solution, and the resultant was stirred at room temperature overnight. The reaction solution was filtered, washed with 200 mL of 10% hydrochloric acid, washed three times with 200 mL of a saturated saline solution, and dried over anhydrous magnesium sulfate. After the solvent was distilled off to some extent, 70 g of silica gel was added thereto to form slurry, and a column of 100 g of alumina/200 g of silica gel was filled with this slurry and elution was performed with dichloromethane. The solvent was distilled off, and the resultant was recrystallized from a mixed solvent of ethyl acetate/heptane, whereby 31.8 g of a target compound 5 was obtained as a white solid. Purity of 99% (HPLC).
EI-MS: 566[M+]

(Synthesis of Compound 6)

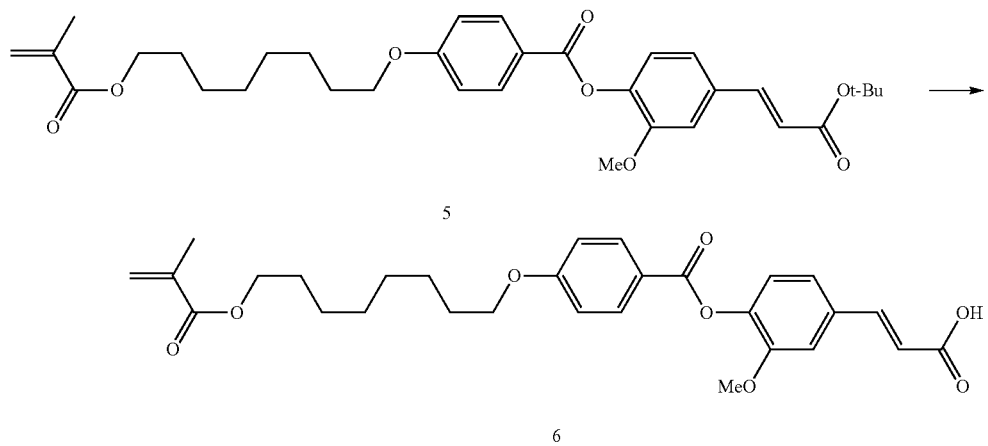

31.8 g (0.0562 mol) of the compound 5 was dissolved in 200 mL of dichloromethane, and the system was purged with nitrogen and cooled with ice. 32 g (0.280 mol) of trifloroacetic acid was added dropwise to the system, followed by stirring at room temperature overnight. It was confirmed using HPLC that the reaction ended. 300 mL of heptane was added to the reaction solution, then, a solid was precipitated by distilling the solvent off, and the solid was separated by filtration. The obtained solid was washed with water and heptane, whereby 26 g of a target compound 6 was obtained as a colorless crystal. Purity of 99% (HPLC).

(Synthesis of Monomer (I-1-1))

sium sulfate. Purification was performed by using a column of 30 g of alumina/300 g of silica gel and a mixed solution of ethyl acetate/dichloromethane. The solid obtained by distilling the solvent off was recrystallized from methanol, whereby 16.4 g of a target monomer (I-1-1) was obtained as a white solid. Purity of 99.5% (HPLC).

EI-MS: 563[M+]

(Synthesis of Polymer (PA-1))

10 parts of the monomer (I-1-1) was dissolved in 45 parts of tetrahydrofuran (THF), then, 0.03 parts of azobisisobutyronitrile (AIBN) was added thereto, and the obtained solution was heated to reflux for 8 hours in a nitrogen atmosphere to perform the reaction. Next, after the solution

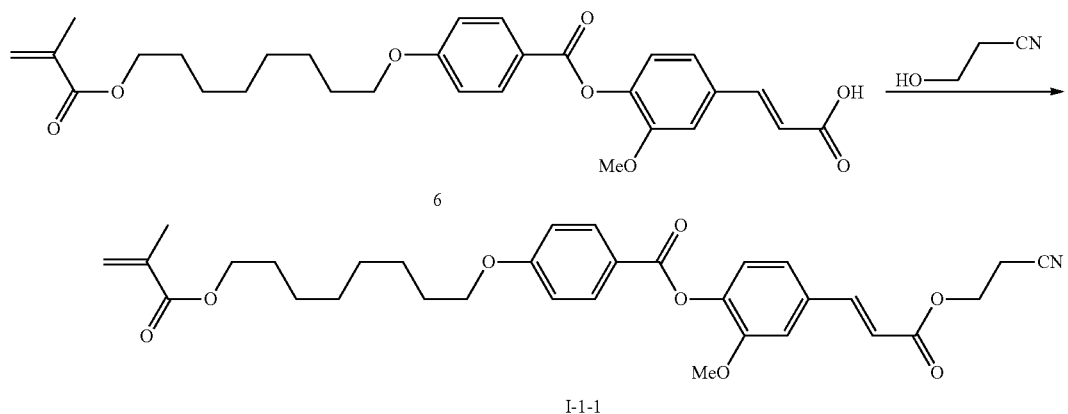

22.9 g (45 mmol) of the compound 6, 4.9 g (0.04 mol) of 3-hydroxypropionitrile, and 0.70 g (5.6 mmol) of 4-dimethyl aminopyridine were dissolved in 200 mL of dichloromethane, and the system was purged with nitrogen and cooled with ice. Then, a solution obtained by dissolving 7.87 g (64 mmol) of N,N'-diisopropylcarbodiimide in 50 mL of dichloromethane was added dropwise to the reaction solution, and the resultant was stirred at room temperature overnight. The reaction solution was filtered, washed with 100 mL of 10% hydrochloric acid, washed three times with 100 mL of a saturated saline solution, and dried over anhydrous magneafter the reaction was added dropwise to 600 parts of methanol, followed by stirring, the precipitate was collected and dissolved in 50 parts of THF, then, the resultant was added dropwise to 1,200 parts of ice-cooled haxane, followed by stirring, and the precipitated solid was collected. The obtained solid was dissolved in 50 parts of THF, then, the resultant was added dropwise to 1,200 parts of ice-cooled methanol, followed by stirring, and the precipitated solid was collected, dissolved in THF, and vacuum-dried, whereby a polymer (PA-1) was obtained. The weight average molecular weight (Mw) of the obtained poly er (PA-1) was 383,000, and the molecular weight distribution (Mw/Mn) was 2.75.

[Chem. 47]

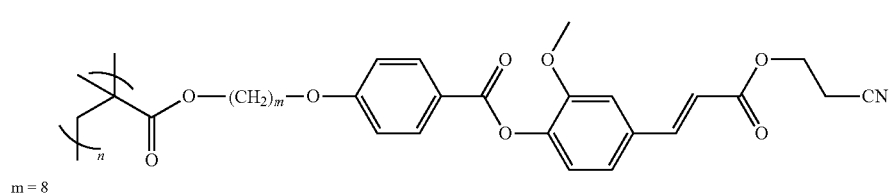

(PA-1)

m = 8

Moreover, adjustment of the molecular weight of the polymer was performed by adjusting the heating and refluxing time in a nitrogen atmosphere and measuring the weight average molecular weight (Mw).

(Measurement of Molecular Weight)

Mw and Mn were measured by GPC (Gel Permeation Chromatography) under the following measurement conditions.

As the measuring apparatus, GPC apparatus HLC-8220GPC manufactured by Tosoh Corporation was used, as the analytical column, four columns, that is, TSKgel GMHXL×2, TSKgel G2000XL×1, and TSKgel G100XL×1 were used in a state of being connected in series, as the detector, a differential refractive index (RI) detector was used, and as the standard sample for creating a calibration curve, polystyrene standard sample STANDARD SM-105 (molecular weight range of 1,300 to 3,800,000) manufactured by Showa Denko K.K. was used. The obtained polymer was dissolved in THF to be a concentration of 1 μg/mL, and measurement was performed on the resultant under the conditions of a mobile phase of THF, a feed rate of 1 mL/min, a column temperature of 40° C., and a sample injection volume of 300 μL.

(Measurement of Glass Transition Temperature)

The glass transition temperature was measured using a differential scanning calorimeter (DSC). As the measuring apparatus, DSC equipment DSC6220 manufactured by Seiko Instruments Inc. was used. About 4 mg of a polymer sample was put into an aluminum pan and sealed, and when the temperature was raised from −20° C. to 180° C. at a rate of 10°/min, the baseline shift due to glass transition was observed. The transition starting point was read from the intersection point of tangential lines, and the point was taken as the glass transition temperature (Tg).

(Formation of Liquid-Crystal Alignment Film)

(Preparation of Photodimerization Type Resin Film)

A mixture of 5 parts of the polymer (PA-1), 47.5 parts of N-methylpyrrolidone, and 47.5 parts of 2 butoxyethanol was stirred at room temperature for 10 minutes to be homogeneously dissolved. Next, the solution was applied onto a glass substrate using a spin coater and dried at 100° C. for 3 minutes, whereby a film was formed on the glass substrate. When the formed film was visually observed, it was confirmed that a smooth film was formed.

(Photo-Alignment Processing)

Next, the formed film was irradiated (amount of light irradiation of 100 mJ/cm$^2$) with linearly polarized light (illuminance: 10 mW/cm$^2$) of ultraviolet light (wavelength of 313 nm for 10 seconds from the vertical direction using a polarized light irradiating apparatus provided with an ultra high pressure mercury lamp, a wavelength cut filter, a band pass filter, and a polarizing filter, whereby a photo-alignment film was obtained. A firing treatment and a washing treatment were not required. The dry film thickness of the resin film was 0.1 μm.

<Photoisomerization Type Photo-Alignment Film>

Photo-Alignment Film 5

Synthesis Example 1 (Synthesis of Dichroic Compound (a))

230 ml of 2% hydrochloric acid was added to 8.6 g (25 mmol) of 2,2'-benzidinedisulfonic acid, then, an aqueous solution of 3.5 g (51 mmol) of sodium nitrite was added dropwise thereto little by little while maintaining the temperature at 0° C. to 5° C., and the resultant was allowed to react for 2 hours, whereby a diazonium salt was prepared. Next, 6.9 g (50 mmol) of salicylic acid was dissolved in 300 ml of a 5% sodium carbonate aqueous solution, and the above diazonium salt mixture was slowly added dropwise thereto. After the resultant was allowed to react for 1 hour, a 20% saline solution was added thereto, whereby precipitate was obtained. This precipitate was recrystallized from a mixed solvent of ethanol and water, whereby 4.8 g of the azo compound represented by Formula (a) was obtained.

[Chem. 48]

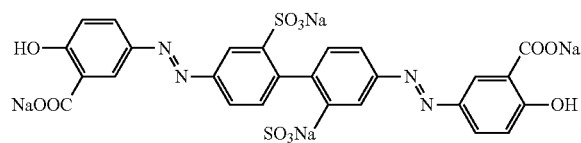

(Composition for Examples: Preparation of Composition (1) for Photo-Alignment Film)

2 parts of the compound represented by Formula (a) was dissolved in 98 parts of N-methyl-2-pyrrolidone (NMP) (solution A). 98 parts of 2-butoxyethanol (BC) was added to 2 parts of methylated melamine, Sumimal M-100C (hereinafter, M-100C) (manufactured by Chang Chun Plastics Co., LTD., a hexamethoxymethylated melamine monomer having a molecular weight of 390 and an average degree of polymerization of 1.3 to 1.7), whereby a homogeneous solution was obtained (solution B). 100 parts of the solution A, 23 parts of the solution B, and 77 parts of BC were mixed, whereby a solution having a solid content ratio of 1.0% was prepared. The obtained solution was filtered through a membrane filter having a pore size of 0.45 μm, whereby a composition (1) for a photo-alignment film was obtained.

(Formation of Liquid-Crystal Alignment Film)
(Preparation of Photoisomerization Type Resin Film)

The composition (1) for a photo-alignment film was applied onto a glass substrate using a spin coater and dried at 100° C. for 1 minute.

(Photo-Alignment Processing)

The surface of the obtained coating film was irradiated with linearly polarized light and parallel light of ultraviolet light (irradiation intensity: 10 mW/cm$^2$) of a wavelength of around 365 nm with irradiation energy of 100 mJ/cm$^2$ from the direction perpendicular to the glass substrate through a wavelength cut filter and a polarizing filter on an ultra high pressure mercury lamp, whereby a photo-alignment film was obtained. A firing treatment and a washing treatment were not required. The dry film thickness of the resin film was 0.1 μm.

<Rubbing Type Alignment Film>
(Rubbing Type Alignment Film)
(Formation of Rubbing Type Polyimide Liquid-Crystal Alignment Film)
(Preparation of Alignment Film Solution)

59.72 g of N-methyl-2-pyrrolidone was added to 5.98 g of 4,4'-diaminodiphenylamine, and the resultant was stirred to be dissolved while blowing nitrogen thereto. While stirring this diamine solution, 6.54 g of pyromellitic dianhydride was added thereto, then, 65.30 g of N-methyl-2-pyrrolidone was further added thereto, and the resultant was stirred at 30° C. for 18 hours in a nitrogen atmosphere to perform the reaction. Furthermore, 71.06 g of a mixed solvent of N-methyl-2-pyrrolidone and 2-butoxyethanol having a mass ratio of 1:1 was added thereto at ordinary temperature for dilution, and the resultant was stirred, whereby a polyamic acid solution was obtained.

(Formation of Liquid-Crystal Alignment Film)
(Preparation of Resin Film)

An alignment film solution was applied onto the first substrate and the second substrate using a spin coater, and the resultant was reacted by being heated at 230° C. for 30 minutes, whereby an insulating film of polyimide was formed.

(Alignment Processing)

The alignment processing was performed by rubbing the surface of the alignment film formed on the substrate in one direction by rotating a roller wound with buff cloth in the direction opposite to the substrate transport direction. The rotation speed of the roller was 600 rpm, the transport speed of the substrate was 5 mm/sec, and the indentation depth with respect to the substrate surface of the buff cloth was 0.3 mm. Thereafter, to remove the scraps of the alignment film or the fiber pieces of the buff cloth ground by rubbing, the polyimide film was washed with pure water and dried.

(Evaluation of Display Quality)

By the alignment film being a photo-alignment film, it is possible to reduce the decrease in alignment properties with respect to the liquid-crystal molecules due to rubbing irregularity, and it is possible to provide a liquid-crystal display element having excellent transmittance characteristics. Since the evaluation of liquid-crystal alignment properties due to various photo-alignment films was performed, the evaluation method thereof will be described below.

A thin film transistor and a transparent electrode layer are formed on the first substrate, and an alignment film is formed thereon. If performing alignment processing by a rubbing method which is a contact method, random scratches are formed on the surface of the alignment film by rubbing. In particular, in the first substrate on which a thin film transistor or a transparent electrode layer pattern has been formed, deeper scratches due to steps due to the thin film transistor or the transparent electrode layer pattern and the diameter (several tens of μm) of the fiber of buff cloth of the rubbing roller are likely to be formed along the steps. Since, at the areas where the scratches have been formed, the liquid-crystal molecules cannot be arrayed in a certain direction at the time of electric field off, light leakage occurs in the liquid-crystal panel at the time of displaying black. As a result, a contrast of equal to or greater than a certain value is less likely to be obtained.

Furthermore, in the resolution mode called 4K recently put into practical use, as the calculation example of a 40-inch panel, 1 pixel size becomes 0.23 mm. In addition, in the resolution mode called 8K recently put into practical use, as the calculation example of a 40-inch panel, 1 pixel size becomes fine to the extent of 0.11 mm. That is, since 1 pixel size is close to the diameter of the fiber of buff cloth of the rubbing roller, there is a concern that, by the scratches formed at the time of being subjected to alignment processing by a rubbing method, in a pixel unit or an intermittent pixel array unit, the areas where the liquid-crystal molecules can not be arrayed in a certain direction at the time of electric field off were generated, and significant decrease in contrast due to a large amount of light leakage at the time of displaying black or a large number of display defects is caused.

Since scratches are not generated on the surface of the alignment film, by performing alignment processing in a non-contact by a photo-alignment method, it is possible to achieve clear black display in which there is no light leakage and the contrast is high.

The alignment film solution was applied to the transparent electrode (in the FFS mode, which has a comb shape) formed on the first substrate by a spin coating method, whereby an alignment film having a dry film thickness of 0.1 μm was formed. An alignment film was formed on the second substrate also in the same manner. In addition, in a VA mode liquid-crystal cell, a common electrode was provided on a glass substrate, and a photo-alignment film was formed on the common electrode.

(Preparation of Liquid-Crystal Cell)

Using a glass substrate provided with the liquid-crystal alignment film, a VA mode liquid-crystal cell and a FFS mode liquid-crystal cell were respectively prepared by a dropping method. More specifically, the first substrate and the second substrate on which alignment films had been formed respectively were prepared such that the respective liquid-crystal alignment films faced each other and the direction in which irradiation with linearly polarized light had been performed or rubbing had been performed became an anti-parallel direction (180°), an ultraviolet ray-curable type sealing agent obtained by mixing resin beads (diameter of 4 μm) for spacer was applied to the peripheral portion of the surface on which the alignment film of the first substrate had been formed, and a preferable amount of liquid-crystal composition described below (liquid-crystal compositions 1 to 9) was dropped onto the surface on which the alignment film of the first substrate had been formed, using a dispenser. Next, by attaching this to the surface on which the alignment film of the second substrate had been formed, in a vacuum apparatus, a liquid-crystal was disposed in a uniform thickness in the gap of the two substrates. Thereafter, by curing the sealing agent by irradiating with ultraviolet rays, a liquid-crystal cell was prepared. A treatment for stabilizing the alignment state of a liquid-crystal was performed on the liquid-crystal cell by temporarily heating to a temperature just exceeding a transparent point and cooling to room temperature. Using the liquid-crystal cells prepared in this manner as elements for evaluation, evaluation of display quality due to static contrast was performed.

(Evaluation Method of Static Contrast)

The static contrast (CRS) was measured by the following method.

The above-described optical film which was a measurement object was disposed between the polarizer and the detector of an optical measuring apparatus (RETS-100, manufactured by Otsuka Electronics Co., Ltd.) provided with a white light source, a spectrometer, a polarizer (incident side polarizing plate), an analyzer (emission side polarizing plate), and a detector. Here, in a state in which the rotation angle of the polarizer and the analyzer is 0 degrees (the polarization direction of the polarizer and the analyzer is a parallel position [parallel Nicol]), while rotating the optical film, the light quantity of the transmitted light was detected using the detector, and the light quantity (the light quantity at the time of on) of the transmitted light at the rotation position (the polarization direction of the polarizer and the molecular long axis direction of the polymerizable liquid-crystal are parallel) of the optical film where the detected light quantity is greatest was taken as Yon. In addition, the light quantity (the light quantity at the time of off) of the transmitted light when the rotation angle of the analyzer with respect to the polarizer is 90 degrees (the polarization directions of the polarizer and the analyzer are orthogonal positions [crossed Nichol]) while fixing the positions of the polarizer and the optical film was taken as Yoff. The contrast CRS was determined by the following equation (Equation 1).

$$CRS = Yon/Yoff \quad \text{(Equation 1)}$$

It shows that as the numerical value of the static contrast CRS of (Equation 1) is larger, the light quantity at the time of off, Yoff, is smaller, that is, since light leakage is small, black display is excellent.

In addition, injection of the liquid-crystal composition was performed by a dropping method, and the burn-in, the drip marks, the process adaptability, and the solubility at low temperature were evaluated.

Moreover, symbols on the left side of the content represent the abbreviations of the above-described compounds.

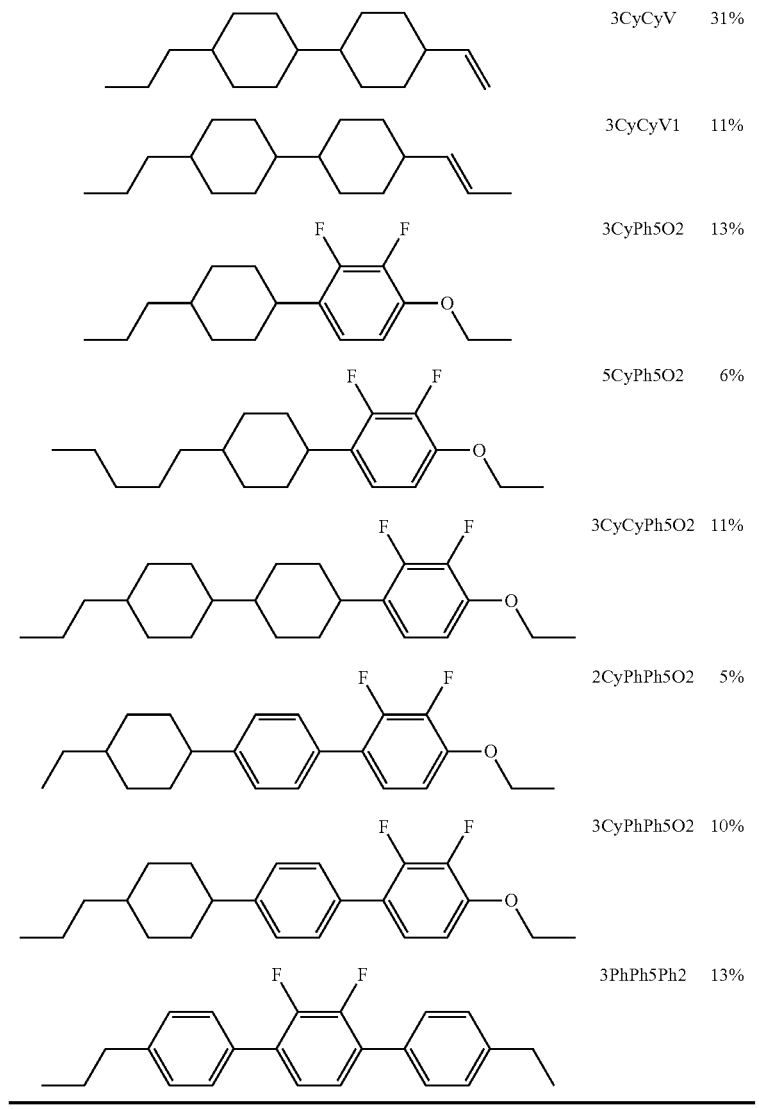

TABLE 1

| | |
|---|---|
| $T_{NI}/°C$ | 75.6 |
| $\Delta n$ | 0.109 |
| $n_o$ | 1.483 |
| $\Delta\varepsilon$ | −3.07 |
| $\varepsilon_\perp$ | 6.62 |
| $\eta/mPa \cdot s$ | 15.2 |
| $\gamma_1/mPa \cdot s$ | 98 |
| $\gamma_1/\Delta n^2 \times 10^{-3}$ | 8.2 |
| $\gamma_1/\Delta n^2/|\Delta\varepsilon|$ | 2.69 |
| Initial voltage holding ratio/% | 99.6 |
| Voltage holding ratio at 150° C. after 1 hour/% | 99.0 |
| Burn-in evaluation | A |
| Drip mark evaluation | A |
| Process adaptability evaluation | A |
| Solubility evaluation at low temperature | A |

It is understood that the liquid-crystal composition 1 has a $T_{NI}$ of 75.6° C. which is practical as a liquid-crystal composition for a TV, a great absolute value of $\Delta\varepsilon$, and a low $\eta$ and an optimal $\Delta n$. Using the liquid-crystal composition 1, an FFS mode liquid-crystal display element was prepared, and when the burn-in, the drip marks, the process adaptability, and the solubility at low temperature were evaluated in the same manner described above, the evaluation results were excellent.

Example 2 (Liquid-Crystal Composition 2)

A liquid-crystal composition (liquid-crystal composition 2) having the compositional ratio described below, which was designed to have the same $T_{NI}$, the same $\Delta n$ value, and the same $\Delta\varepsilon$ value, as those of the liquid-crystal composition 1, was prepared, and the physical properties thereof were measured. The results are shown in the following Table.

Using the liquid-crystal composition 2, an FFS mode liquid-crystal display element was prepared in the same manner as in Example 1, and the burn-in, the drip marks, the process adaptability, and the solubility at low temperature were evaluated, and the results are shown in the same Table.

TABLE 2

| Example 2 | |
|---|---|
| 3CyCyV | 32% |
| 3CyCyV1 | 12% |
| 3CyCyPh1 | 4% |
| 3CyPh5O2 | 7% |
| 3PhPh5O2 | 10% |
| 3CyCyPh5O2 | 10% |
| 4CyCyPh5O2 | 2% |
| 2CyPhPh5O2 | 5% |
| 3CyPhPh5O2 | 8% |
| 3PhPh5Ph2 | 5% |
| 4PhPh5Ph2 | 5% |
| $T_{NI}/°C$ | 76.6 |
| $\Delta n$ | 0.110 |
| $n_o$ | 1.485 |
| $\Delta\varepsilon$ | −3.03 |
| $\varepsilon_\perp$ | 6.36 |
| $\eta/mPa \cdot s$ | 13.6 |
| $\gamma_1/mPa \cdot s$ | 90 |
| $\gamma_1/\Delta n^2 \times 10^{-3}$ | 7.4 |
| $\gamma_1/\Delta n^2/|\Delta\varepsilon|$ | 2.45 |
| Initial voltage holding ratio/% | 99.5 |
| Voltage holding ratio at 150° C. after 1 hour/% | 99.0 |
| Burn-in evaluation | A |
| Drip mark evaluation | A |
| Process adaptability evaluation | A |
| Solubility evaluation at low temperature | A |

It is understood that the liquid-crystal composition 2 has a liquid-crystal phase temperature range which is practical as a liquid-crystal composition for a TV, a great absolute value of the dielectric anisotropy, and a low viscosity and an optimal $\Delta n$. Using the liquid-crystal composition 2, an FFS mode liquid-crystal display element was prepared in the same manner as in Example 1, and when the burn-in, the drip marks, the process adaptability, and the solubility at low temperature were evaluated in the same manner described above, the evaluation results were excellent.

Example 3 (Liquid-Crystal Composition 3)

A liquid-crystal composition (liquid-crystal composition 3) having the compositional ratio described below, which was designed to have the same $T_{NI}$, the same $\Delta n$ value, and the same $\Delta\varepsilon$ value, as those of the liquid-crystal compositions 1 and 2, was prepared, and the physical properties thereof were measured. The results are shown in the following Table.

Using the liquid-crystal composition 3, an FFS mode liquid-crystal display element was prepared in the same manner as in Example 1, and the burn-in, the drip marks, the process adaptability, and the solubility at low temperature were evaluated, and the results are shown in the same Table.

TABLE 3

| Example 3 | |
|---|---|
| 3CyCyV | 35% |
| 3CyCyV1 | 12% |
| 3CyCyPh1 | 2% |
| 3CyPhPh2 | 6% |
| 3CyPh5O2 | 4% |
| 3PhPh5O2 | 10% |
| 5PhPh5O2 | 4% |
| 3CyCyPh5O2 | 3% |
| 2CyPhPh5O2 | 12% |
| 3CyPhPh5O2 | 12% |
| $T_{NI}/°C$ | 76.1 |
| $\Delta n$ | 0.110 |
| $n_o$ | 1.486 |
| $\Delta\varepsilon$ | −3.09 |
| $\varepsilon_\perp$ | 6.45 |
| $\eta/mPa \cdot s$ | 12.2 |
| $\gamma_1/mPa \cdot s$ | 81 |
| $\gamma_1/\Delta n^2 \times 10^{-3}$ | 6.7 |
| $\gamma_1/\Delta n^2/|\Delta\varepsilon|$ | 2.17 |
| Initial voltage holding ratio/% | 99.6 |
| Voltage holding ratio at 150° C. after 1 hour/% | 99.2 |
| Burn-in evaluation | A |
| Drip mark evaluation | A |
| Process adaptability evaluation | A |
| Solubility evaluation at low temperature | A |

It is understood that the liquid-crystal composition 3 has a $T_{NI}$ which is practical as a liquid-crystal composition for a TV, a great absolute value of $\Delta\varepsilon$, and a low $\eta$ and an optimal $\Delta n$. Using the liquid-crystal composition 3, an FFS mode liquid-crystal display element was prepared in the same manner as in Example 1, and when the burn-in, the drip marks, the process adaptability, and the solubility at low temperature were evaluated in the same manner described above, the evaluation results were excellent.

Examples 15 to 17

Using the liquid-crystal compositions 1 to 3, vertical alignment liquid-crystal display elements (VA mode liquid-crystal display elements) having a cell thickness of 3.5 μm which is general for a TV were prepared.

Comparisons of transmittances, contrast ratios, response speeds were performed on the FFS mode liquid-crystal display element prepared in each of Examples 1 to 3 and the VA mode liquid-crystal display element prepared in each of Examples 1 to 3. The results are shown in the following Table 4. Moreover, the transmittance of each of the liquid-crystal display elements in Examples 1 to 3 and Examples 15 to 17 is a value when the transmittance of an element before the liquid-crystal composition in each mode is injected is defined as 100%.

TABLE 4

|  | Example 1 | Example 15 | Example 2 | Example 16 | Example 3 | Example 17 |
|---|---|---|---|---|---|---|
| Display mode | n-FFS | VA | n-FFS | VA | n-FFS | VA |
| Liquid-crystal composition used | Liquid-crystal compsition 1 | | Liquid-crystal composition 2 | | Liquid-crystal composition 3 | |
| Maximum transmittance | 89% | 87% | 90% | 86% | 90% | 87% |
| Contrast ratio | 289 | 280 | 293 | 277 | 302 | 288 |
| Response speed | 4.7 | 8.3 | 4.4 | 7.6 | 3.7 | 6.6 |

The FFS mode display elements prepared using the liquid-crystal compositions 1 to 3 (in all of Examples 1 to 3, the same photo-alignment film 1 was used) exhibited characteristics excellent in the maximum transmittance, the contrast ratio, and the response speed, compared to each of VA mode liquid-crystal display elements (in all of Examples 15 to 17, the same photo-alignment film 1 was used) prepared using the same liquid-crystal composition, respectively. On the other hand, it was confirmed that in the VA type, the viewing angle dependence was reduced.

In the FFS mode liquid-crystal display element in which the liquid-crystal molecules are aligned in parallel to the substrate and a fringe electric field occurs, basic characteristics of a liquid-crystal different from the VA mode liquid-crystal display element in which the liquid-crystal molecules are aligned perpendicularly to the substrate and an electric field occurs perpendicularly are required. By the liquid-crystal compositions 1 to 3 containing General Formula (I), improvement of transmittance which is a significant feature of the FFS mode is achieved without impairing the basic characteristics as a liquid-crystal display element. On the other hand, due to these differences in the FFS mode, effects such as burn-in and drip marks are difficult to be predicted from knowledge in the related art. In the liquid-crystal display element of the present invention, good characteristics are exhibited also in these points.

In addition, comparisons of transmittances, contrast ratios, response speeds were performed on Examples (Example 1B and Examples 21 to 29) and Comparative Examples (Comparative Example 1B and Comparative Example 2B), in which the type of photo-alignment film was changed, in the following Table 5. The results are shown in the following Table 5. In addition, in Comparative Examples 1B and 2B, liquid-crystal cells were prepared in the same manner except that the alignment films in Examples 1B and 21 were replaced with rubbing alignment films, and evaluation was performed on the liquid-crystal cells.

TABLE 5

|  | Example 1B | Example 21 | Example 22 | Example 23 | Example 24 | Example 25 |
|---|---|---|---|---|---|---|
| Display mode | n-FFS | VA | n-FFS | VA | n-FFS | VA |
| Alignment film | Photo-alignment film 3 | | Photo-alignment film 4 | | Photo-alignment film 5 | |
| Liquid-crystal composition used | Liquid-crystal composition 1 | | Liquid-crystal composition 1 | | Liquid-crystal composition 1 | |
| Maximum transmittance | 89% | 87% | 90% | 87% | 91% | 87% |
| Contrast ratio | 289 | 280 | 297 | 281 | 287 | 269 |
| Response speed/ms | 4.7 | 8.3 | 4.4 | 7.4 | 4.5 | 8.1 |

TABLE 6

|  | Example 26 | Example 27 | Example 28 | Example 29 | Comparative Example 1B | Comparative Example 2B |
|---|---|---|---|---|---|---|
| Display mode | n-FFS | VA | n-FFS | VA | n-FFS | VA |
| Alignment film | Photo-alignment film 6 | | Photo-alignment film 2 | | Rubbing alignment film | |
| Liquid-crystal composition used | Liquid-crystal composition 1 | | Liquid-crystal composition 1 | | Liquid-crystal composition 1 | |
| Maximum transmittance | 89% | 85% | 90% | 88% | 90% | 87% |
| Contrast ratio | 288 | 270 | 293 | 282 | 212 | 194 |
| Response speed/ms | 4.4 | 82 | 4,9 | 8.6 | 4.5 | 7.6 |

The liquid-crystal display element (Example) prepared by forming a photo-alignment film exhibited characteristics excellent in contrast compared to the FFS mode liquid-crystal display element and the VA mode liquid-crystal display element (Comparative Examples) prepared by forming a rubbing alignment film using the same liquid-crystal composition, respectively.

Example 4 (Liquid-Crystal Composition 4)

A liquid-crystal composition (liquid-crystal composition 4) having the compositional ratio described below, which was designed to have the same $T_{NI}$, the same Δn value, and the same Δε value, as those of the compositions 1 to 3, was prepared, and the physical properties thereof were measured. The results are shown in the following Table.

TABLE 7

| Example 4 | |
|---|---|
| 3CyCy2 | 25% |
| 3CyCy4 | 8% |
| 3CyCy5 | 5% |

TABLE 7-continued

| Example 4 | |
|---|---|
| 3CyPh5O2 | 10% |
| 5CyPh5O2 | 9% |
| 3CyCyPh5O2 | 11% |
| 2CyPhPh5O2 | 10% |
| 3CyPhPh5O2 | 11% |
| 3PhPh5Ph2 | 5% |
| 4PhPh5Ph2 | 6% |
| $T_{NI}/°C$ | 75.9 |
| $\Delta n$ | 0.104 |
| $n_o$ | 1.483 |
| $\Delta\varepsilon$ | −3.06 |
| $\varepsilon_\perp$ | 6.56 |
| $\eta/mPa \cdot s$ | 19.9 |
| $\gamma_1/mPa \cdot s$ | 137 |
| $\gamma_1/\Delta n^2 \times 10^{-3}$ | 12.7 |
| $\gamma_1/\Delta n^2/|\Delta\varepsilon|$ | 4.14 |

It is understood that the liquid-crystal composition 4 has a $T_{NI}$ which is practical as a liquid-crystal composition for a TV, a great absolute value of $\Delta\varepsilon$, and a low $\eta$ and an optimal $\Delta n$. An FFS mode liquid-crystal display element was prepared using the liquid-crystal composition 4, and this exhibited excellent display characteristics comparable to Examples 1 to 3.

Example 5 (Liquid-Crystal Composition 5)

A liquid-crystal composition (liquid-crystal composition 5) having the compositional ratio described below, which was designed to have the same $T_{NI}$, the same $\Delta n$ value, and the same $\Delta\varepsilon$ value, as those of the liquid-crystal compositions 1 to 4, was prepared, and the physical properties thereof were measured. The results are shown in the following Table.

TABLE 8

| Example 5 | |
|---|---|
| 3CyCy2 | 25% |
| 3CyCy4 | 10% |
| 3CyCy5 | 5% |
| 3CyPh5O2 | 8% |
| 3PhPh5O2 | 9% |
| 3CyCyPh5O2 | 12% |
| 4CyCyPh5O2 | 2% |
| 2CyPhPh5O2 | 9% |
| 3CyPhPh5O2 | 9% |
| 3PhPh5Ph2 | 5% |
| 4PhPh5Ph2 | 6% |
| $T_{NI}/°C$ | 75.8 |
| $\Delta n$ | 0.108 |
| $n_o$ | 1.485 |
| $\Delta\varepsilon$ | −3.17 |
| $\varepsilon_\perp$ | 6.53 |
| $\eta/mPa \cdot s$ | 18.5 |
| $\gamma_1/mPa \cdot s$ | 131 |
| $\gamma_1/\Delta n^2 \times 10^{-3}$ | 11.2 |
| $\gamma_1/\Delta n^2/|\Delta\varepsilon|$ | 3.54 |

It is understood that the liquid-crystal composition 5 has a $T_{NI}$ which is practical as a liquid-crystal composition for a TV, a great absolute value of $\Delta\varepsilon$, and a low $\eta$ and an optimal $\Delta n$. An FFS mode liquid-crystal display element was prepared using the liquid-crystal composition 5, and this exhibited excellent display characteristics comparable to Examples 1 to 3.

Example 6 (Liquid-Crystal Composition 6)

A liquid-crystal composition (liquid-crystal composition 6) having the compositional ratio described below, which was designed to have the same $T_{NI}$, the same $\Delta n$ value, and the same $\Delta\varepsilon$ value, as those of the liquid-crystal compositions 1 to 5, was prepared, and the physical properties thereof were measured. The results are shown in the following Table.

TABLE 9

| Example 6 | |
|---|---|
| 3CyCy2 | 25% |
| 3CyCy4 | 10% |
| 3CyCy5 | 6% |
| 3CyCyPh1 | 10% |
| 3CyPh5O2 | 5% |
| 3PhPh5O2 | 10% |
| 5PhPh5O2 | 4% |
| 3CyCyPh5O2 | 6% |
| 2CyPhPh5O2 | 12% |
| 3CyPhPh5O2 | 12% |
| $T_{NI}/°C$ | 78.1 |
| $\Delta n$ | 0.101 |
| $n_o$ | 1.484 |
| $\Delta\varepsilon$ | −3.00 |
| $\varepsilon_\perp$ | 6.22 |
| $\eta/mPa \cdot s$ | 15.9 |
| $\gamma_1/mPa \cdot s$ | 111 |
| $\gamma_1/\Delta n^2 \times 10^{-3}$ | 10.9 |
| $\gamma_1/\Delta n^2/|\Delta\varepsilon|$ | 3.63 |

It is understood that the liquid-crystal composition 6 has a $T_{NI}$ which is practical as a liquid-crystal composition for a TV, a great absolute value of $\Delta\varepsilon$, and a low $\eta$ and an optimal $\Delta n$. An FFS mode liquid-crystal display element was prepared using the liquid-crystal composition 6, and this exhibited excellent display characteristics comparable to Examples 1 to 3.

Example 7 (Liquid-Crystal Composition 7)

A liquid-crystal composition (liquid-crystal composition 7) having the compositional ratio described below, which was designed to have the same $\Delta n$ value as and a higher $T_{NI}$ and a greater $\Delta\varepsilon$ value than the liquid-crystal compositions 1 to 6 was prepared, and the physical properties thereof were measured. The results are shown in the following Table.

TABLE 10

| Example 7 | |
|---|---|
| 3CyCyV | 24% |
| 3CyCyV1 | 10% |
| 3CyPh5O2 | 12% |
| 5CyPh5O2 | 8% |
| 3CyCyPh5O2 | 10% |
| 3CyCyPh5O3 | 8% |
| 4CyCyPh5O2 | 10% |
| 2CyPhPh5O2 | 5% |
| 3CyPhPh5O2 | 5% |
| 3PhPh5Ph2 | 8% |
| $T_{NI}/°C$ | 86.0 |
| $\Delta n$ | 0.103 |
| $n_o$ | 1.481 |
| $\Delta\varepsilon$ | −3.95 |
| $\varepsilon_\perp$ | 7.76 |
| $\eta/mPa \cdot s$ | 21.8 |
| $\gamma_1/mPa \cdot s$ | 134 |
| $\gamma_1/\Delta n^2 \times 10^{-3}$ | 12.6 |
| $\gamma_1/\Delta n^2/|\Delta\varepsilon|$ | 3.20 |
| Initial voltage holding ratio/% | 99.9 |
| Voltage holding ratio at 150° C. after 1 hour/% | 99.4 |
| Burn-in evaluation | A |
| Drip mark evaluation | A |

TABLE 10-continued

| Example 7 | |
|---|---|
| Process adaptability evaluation | A |
| Solubility evaluation at low temperature | A |

It is understood that the liquid-crystal composition 7 has a $T_{NI}$ which is practical as a liquid-crystal composition for a TV, a great absolute value of $\Delta\varepsilon$, and a low $\eta$ and an optimal $\Delta n$. Using the liquid-crystal composition 7, an FFS mode liquid-crystal display element was prepared in the same manner as in Example 1, and when the burn-in, the drip marks, the process adaptability, and the solubility at low temperature were evaluated in the same manner described above, the evaluation results were excellent.

Example 8 (Liquid-Crystal Composition 8)

A liquid-crystal composition (liquid-crystal composition 8) having the compositional ratio described below, which was designed to have the same $T_{NI}$, the same $\Delta n$ value, and the same $\Delta\varepsilon$ value, as that of the liquid-crystal composition 7, was prepared, and the physical properties thereof were measured. The results are shown in the following Table.

TABLE 11

| Example 8 | |
|---|---|
| 3CyCyV | 20% |
| 3CyCyV1 | 10% |
| 3CyCyPh1 | 7% |
| 3CyPh5O2 | 12% |
| 5CyPh5O2 | 6% |
| 3PhPh5O2 | 5% |
| 3CyCyPh5O2 | 12% |
| 3CyCyPh5O3 | 6% |
| 4CyCyPh5O2 | 10% |
| 2CyPhPh5O2 | 6% |
| 3PhPh5Ph2 | 6% |
| $T_{NI}/°$ C. | 85.6 |
| $\Delta n$ | 0.103 |
| $n_o$ | 1.482 |
| $\Delta\varepsilon$ | −4.05 |
| $\varepsilon_\perp$ | 7.74 |
| $\eta$/mPa · s | 21.2 |
| $\gamma_1$/mPa · s | 128 |
| $\gamma_1/\Delta n^2 \times 10^{-3}$ | 12.1 |
| $\gamma_1/\Delta n^2/|\Delta\varepsilon|$ | 2.98 |
| Initial voltage holding ratio/% | 99.9 |
| Voltage holding ratio at 150° C. after 1 hour/% | 99.5 |
| Burn-in evaluation | A |
| Drip mark evaluation | A |
| Process adaptability evaluation | A |
| Solubility evaluation at low temperature | A |

It is understood that the liquid-crystal composition 8 has a $T_{NI}$ which is practical as a liquid-crystal composition for a TV, a great absolute value of $\Delta\varepsilon$, and a low $\eta$ and an optimal $\Delta n$. Using the liquid-crystal composition 8, an FFS mode liquid-crystal display element was prepared in the same manner as in Example 1, and when the burn-in, the drip marks, the process adaptability, and the solubility at low temperature were evaluated in the same manner described above, the evaluation results were excellent.

Example 9 (Liquid-Crystal Composition 9)

A liquid-crystal composition (liquid-crystal composition 9) having the compositional ratio described below, which was designed to have the same $T_{NI}$, the same $\Delta n$ value, and the same $\Delta\varepsilon$ value, as those of the liquid-crystal compositions 7 and 8, was prepared, and the physical properties thereof were measured. The results are shown in the following Table.

TABLE 12

| Example 9 | |
|---|---|
| 3CyCyV | 23% |
| 3CyCyV1 | 10% |
| 3CyCyPh1 | 10% |
| 3CyPh5O2 | 10% |
| 5CyPh5O2 | 4% |
| 3PhPh5O2 | 8% |
| 3CyCyPh5O2 | 12% |
| 4CyCyPh5O2 | 7% |
| 2CyPhPh5O2 | 8% |
| 3CyPhPh5O2 | 8% |
| $T_{NI}/°$ C. | 86.2 |
| $\Delta n$ | 0.103 |
| $n_o$ | 1.483 |
| $\Delta\varepsilon$ | −3.96 |
| $\varepsilon_\perp$ | 7.56 |
| $\eta$/mPa · s | 18.7 |
| $\gamma_1$/mPa · s | 112 |
| $\gamma_1/\Delta n^2 \times 10^{-3}$ | 10.6 |
| $\gamma_1/\Delta n^2/|\Delta\varepsilon|$ | 2.67 |
| Initial voltage holding ratio/% | 99.8 |
| Voltage holding ratio at 150° C. after 1 hour/% | 99.3 |
| Burn-in evaluation | A |
| Drip mark evaluation | A |
| Process adaptability evaluation | A |
| Solubility evaluation at low temperature | A |

It is understood that the liquid-crystal composition 9 has a $T_{NI}$ which is practical as a liquid-crystal composition for a TV, a great absolute value of $\Delta\varepsilon$, and a low $\eta$ and an optimal $\Delta n$. Using the liquid-crystal composition 9, an FFS mode liquid-crystal display element was prepared in the same manner as in Example 1, and when the burn-in, the drip marks, the process adaptability, and the solubility at low temperature were evaluated in the same manner described above, the evaluation results were excellent.

Examples 18 to 20

Using the liquid-crystal compositions 7 to 9, the same VA mode liquid-crystal display elements as those in Examples 15 to 17 were prepared (the photo-alignment film 1 was used).

Comparisons of transmittances, contrast ratios, response speeds were performed on the FFS mode liquid-crystal display element prepared in each of Examples 7 to 9 and the VA mode liquid-crystal display element prepared in each of Examples 18 to 20. The results are shown below.

TABLE 13

| | Example 7 | Example 18 | Example 8 | Example 19 | Example 9 | Example 20 |
|---|---|---|---|---|---|---|
| Display mode | n-FFS | VA | n-FFS | VA | n-FFS | VA |
| Liquid-crystal composition used | Liquid-crystal composition 7 | | Liquid-crystal composition 8 | | Liquid-crystal composition 9 | |
| Maximum transmittance | 88% | 85% | 88% | 86% | 89% | 87% |
| Contrast ratio | 278 | 268 | 285 | 265 | 294 | 260 |
| Response speed | 7.4 | 13.0 | 7.1 | 12.7 | 6.5 | 10.8 |

The FFS mode display elements prepared using the liquid-crystal compositions 7 to 9 (Examples 7 to 9) exhibit characteristics excellent in the maximum transmittance, the contrast ratio, and the response speed, compared to each of VA mode liquid-crystal display elements (Comparative Examples 4 to 6) prepared using the same liquid-crystal composition, respectively.

Example 10 (Liquid-Crystal Composition 10)

A liquid-crystal composition (liquid-crystal composition 10) having the compositional ratio described below, which was designed to have the same $T_{NI}$, the same Δn value, and the same Δε value, as those of the liquid-crystal compositions 7 to 9, was prepared, and the physical properties thereof were measured. The results are shown in the following Table.

TABLE 14

| Example 10 | |
|---|---|
| 3CyCy2 | 22% |
| 3CyCy4 | 4% |
| 3CyCyPh1 | 4% |
| 3CyPh5O2 | 12% |
| 5CyPh5O2 | 10% |
| 3CyCyPh5O2 | 10% |
| 3CyCyPh5O3 | 6% |
| 4CyCyPh5O2 | 9% |
| 2CyPhPh5O2 | 8% |
| 3CyPhPh5O2 | 8% |
| 3PhPh5Ph2 | 4% |
| 4PhPh5Ph2 | 3% |
| $T_{NI}$/° C. | 85.7 |
| Δn | 0.103 |
| $n_o$ | 1.482 |
| Δε | −4.08 |
| $ε_⊥$ | 7.92 |
| η/mPa · s | 26.6 |
| $γ_1$/mPa · s | 172 |
| $γ_1/Δn^2 × 10^{−3}$ | 16.2 |
| $γ_1/Δn^2/|Δε|$ | 3.97 |

It is understood that the liquid-crystal composition 10 has a $T_{NI}$ which is practical as a liquid-crystal composition for a TV, a great absolute value of Δε, and a low η and an optimal Δn. Using the liquid-crystal composition 10, an FFS mode liquid-crystal display element was prepared, and when the burn-in, the drip marks, the process adaptability, and the solubility at low temperature were evaluated in the same manner described above, the evaluation results were excellent.

Example 11 (Liquid-Crystal Composition 11)

A liquid-crystal composition having the compositional ratio described below, which was designed to have the same $T_{NI}$, the same Δn value, and the same Δε value, as those of the liquid-crystal compositions 7 to 10, was prepared, and the physical properties thereof were measured. The results are shown in the following Table.

TABLE 15

| Example 11 | |
|---|---|
| 3CyCy2 | 24% |
| 3CyCy4 | 8% |
| 3CyPh5O2 | 9% |
| 3PhPh5O2 | 8% |
| 3CyCyPh5O2 | 12% |
| 3CyCyPh5O3 | 10% |
| 4CyCyPh5O2 | 10% |
| 2CyPhPh5O2 | 6% |
| 3CyPhPh5O2 | 6% |
| 3PhPh5Ph2 | 4% |

TABLE 15-continued

| Example 11 | |
|---|---|
| 4PhPh5Ph2 | 3% |
| $T_{NI}$/° C. | 86.0 |
| Δn | 0.103 |
| $n_o$ | 1.483 |
| Δε | −4.03 |
| $ε_⊥$ | 7.67 |
| η/mPa · s | 24.3 |
| $γ_1$/mPa · s | 164 |
| $γ_1/Δn^2 × 10^{−3}$ | 15.5 |
| $γ_1/Δn^2/|Δε|$ | 3.84 |

It is understood that the liquid-crystal composition 11 has a $T_{NI}$ which is practical as a liquid-crystal composition for a TV, a great absolute value of Δε, and a low η and an optimal Δn. Using the liquid-crystal composition 11, an FFS mode liquid-crystal display element was prepared, and when the burn-in, the drip marks, the process adaptability, and the solubility at low temperature were evaluated in the same manner described above, the evaluation results were excellent.

Example 12 (Liquid-Crystal Composition 12)

A liquid-crystal composition (liquid-crystal composition 12) having the compositional ratio described below, which was designed to have the same $T_{NI}$, the same Δn value, and the same Δε value, as those of the liquid-crystal compositions 7 to 11, was prepared, and the physical properties thereof were measured. The results are shown in the following Table.

TABLE 16

| Example 12 | |
|---|---|
| 3CyCy2 | 24% |
| 3CyCy4 | 5% |
| 3CyCyPh1 | 9% |
| 3CyPh5O2 | 10% |
| 5CyPh5O2 | 3% |
| 3PhPh5O2 | 8% |
| 3CyCyPh5O2 | 10% |
| 4CyCyPh5O2 | 9% |
| 2CyPhPh5O2 | 11% |
| 3CyPhPh5O2 | 11% |
| $T_{NI}$/° C. | 86.0 |
| Δn | 0.103 |
| $n_o$ | 1.484 |
| Δε | −4.03 |
| $ε_⊥$ | 7.69 |
| η/mPa · s | 22.5 |
| $γ_1$/mPa · s | 145 |
| $γ_1/Δn^2 × 10^{−3}$ | 13.7 |
| $γ_1/Δn^2/|Δε|$ | 3.39 |

It is understood that the liquid-crystal composition 12 has a $T_{NI}$ which is practical as a liquid-crystal composition for a TV, a great absolute value of Δε, and a low η and an optimal Δn. Using the liquid-crystal composition 12, an FFS mode liquid-crystal display element was prepared, and when the burn-in, the drip marks, the process adaptability, and the solubility at low temperature were evaluated in the same manner described above, the evaluation results were excellent.

Example 13 (Liquid-Crystal Composition 13)

A liquid-crystal composition (liquid-crystal composition 13) having the compositional ratio described below, which was designed to have the same $T_{NI}$, the same Δn value, and the same Δε value, as those of the liquid-crystal compositions 7 to 12, was prepared, and the physical properties thereof were measured. The results are shown in the following Table.

TABLE 17

| Example 13 | |
|---|---|
| 3CyCyV | 20% |
| 3CyCyV1 | 10% |
| 3CyCyPh1 | 7% |
| 3CyPhPh2 | 3% |
| 3CyPh5O2 | 13% |
| 5CyPh5O2 | 12% |
| 3CyCyPh5O2 | 10% |
| 4CyCyPh5O2 | 5% |
| 2CyPhPh5O2 | 10% |
| 3CyPhPh5O2 | 10% |
| $T_{NI}/°C$ | 85.8 |
| Δn | 0.103 |
| $n_o$ | 1.482 |
| Δε | −4.02 |
| $ε_⊥$ | 7.82 |
| η/mPa·s | 20.9 |
| $γ_1$/mPa·s | 123 |
| $γ_1/Δn^2 × 10^{-3}$ | 11.6 |
| $γ_1/Δn^2/|Δε|$ | 2.88 |

It is understood that the liquid-crystal composition 13 has a $T_{NI}$ which is practical as a liquid-crystal composition for a TV, a great absolute value of Δε, and a low η and an optimal Δn. Using the liquid-crystal composition 13, an FFS mode liquid-crystal display element was prepared in the same manner as in Example 1, and when the burn-in, the drip marks, the process adaptability, and the solubility at low temperature were evaluated in the same manner described above, the evaluation results were excel lent.

Example 14 (Liquid-Crystal Composition 14)

A liquid-crystal composition (liquid-crystal composition 14) having the compositional ratio described below, which was designed to have the same $T_{NI}$, the same Δn value, and the same Δε value, as those of the liquid-crystal compositions 7 to 13, was prepared, and the physical properties thereof were measured. The results are shown in the following Table.

TABLE 18

| Example 14 | |
|---|---|
| 3CyCy2 | 22% |
| 3CyCy4 | 3% |
| 3CyCyPh1 | 7% |
| 3CyCyPh2 | 4% |
| 3CyPh5O2 | 13% |
| 5CyPh5O2 | 12% |
| 3CyCyPh5O2 | 9% |
| 4CyCyPh5O2 | 6% |
| 2CyPhPh5O2 | 12% |
| 3CyPhPh5O2 | 12% |
| $T_{NI}/°C$ | 85.0 |
| Δn | 0.103 |
| $n_o$ | 1.483 |
| Δε | −4.04 |
| $ε_⊥$ | 7.88 |
| η/mPa·s | 24.3 |
| $γ_1$/mPa·s | 152 |
| $γ_1/Δn^2 × 10^{-3}$ | 14.3 |
| $γ_1/Δn^2/|Δε|$ | 3.55 |

It is understood that the liquid-crystal composition 14 has a $T_{NI}$ which is practical as a liquid-crystal composition for a TV, a great absolute value of Δε, and a low η and an optimal Δn. Using the liquid-crystal composition 14, an FFS mode liquid-crystal display element was prepared in the same manner as in Example 1, and when the burn-in, the drip marks, the process adaptability, and the solubility at low temperature were evaluated in the same manner described above, the evaluation results were excellent.

REFERENCE SIGNS LIST 1, 8 polarizing plate
2 first substrate
3 electrode layer
4 alignment film
5 liquid-crystal layer
6 color filter
7 second substrate
11 gate electrode
12 gate insulating film
13 semiconductor layer
14 insulating layer
15 ohmic contact layer
16 drain electrode
17 source electrode
18 insulation protecting layer
21 pixel electrode
22 common electrode
23 storage capacitor
25 data bus line
27 source bus line
29 common line

The invention claimed is:
1. A liquid-crystal display element, comprising:
a first substrate and a second substrate disposed to face each other;
a liquid-crystal layer containing a liquid-crystal composition between the first substrate and the second substrate is filled;
an electrode layer including a common electrode including a transparent conductive material, a plurality of gate bus lines and a plurality of data bus lines disposed in a matrix shape, a thin film transistor provided at an intersection at which each of the plurality of gate bus lines and each of the plurality of data bus lines intersect each other, and a pixel electrode including a transparent conductive material and forming an electric field between the common electrode and the pixel electrode driven by the thin film transistor, and
photo-alignment film layers which are formed between the liquid-crystal layer and the first substrate and between the liquid-crystal layer and the second substrate, respectively,
wherein the liquid-crystal composition has negative dielectric anisotropy, a nematic phase-isotropic liquid transition temperature of equal to or higher than 60° C., and an absolute value of the dielectric anisotropy of equal to or greater than 2, and contains at least one compound selected from the group consisting of compounds represented by the following General Formula (I):

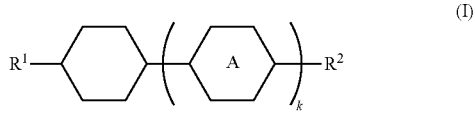
(I)

wherein each of $R^1$ and $R^2$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, A represents a 1,4-phenylene group or a trans-1,4-cyclohexylene group, k represents 1 or 2, and in a case where k is 2, two A's may be the same as or different from each other.

2. The liquid-crystal display element according to claim 1, wherein the liquid-crystal composition further contains at least one compound selected from the group consisting of compounds represented by the following General Formula (II) and compounds represented by the following General Formula (IV):

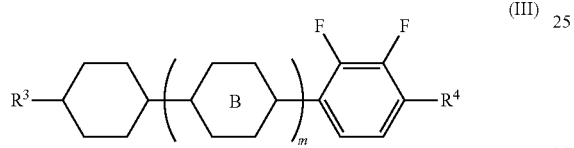
(III)

wherein $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, B represents a 1,4-phenylene group or a trans-1,4-cyclohexylene group, m represents 0, 1, or 2, and in a case where m is 2, two B's may be the same as or different from each other; and

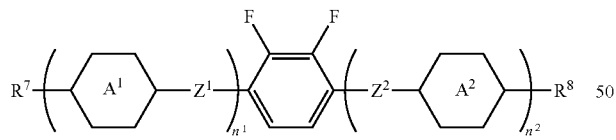
(IV)

wherein each of $R^7$ and $R^8$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, any methylene group in the alkyl group, the alkenyl group, the alkoxy group, or the alkenyloxy group may be substituted with an oxygen atom as long as the oxygen atom is not continuously bonded to another oxygen atom or may be substituted with a carbonyl group as long as the carbonyl group is not continuously bonded to another carbonyl group, each of $A^1$ and $A^1$ independently represents a 1,4-cyclohexylene group, a 1,4-phenylene group, or a tetrahydropyran-2,5-diyl group, in a case where $A^1$ or/and $A^1$ represent a 1,4-phenylene group, one or more hydrogen atoms in the 1,4-phenylene group may be substituted with a fluorine atom, each of $Z^1$ and $Z^2$ independently represents a single bond, —OCH$_2$—, —OCF$_2$—, —CH$_2$O—, or CF$_2$O—, each of $n^1$ and $n^2$ independently represents 0, 1, 2, or 3, $n^1+n^2$ is 1 to 3, and in a case where a plurality of $A^1$'s, $A^2$'s, $Z^1$'s, and/or $Z^2$'s are present, these may be the same as or different from each other, with the proviso that a compound in which $n^1$ is 1 or 2, $n^2$ is 0, at least one of $A^1$'s is a 1,4-cyclohexylene group, and all $Z^1$'s are single bonds is excluded.

3. The liquid-crystal display element according to claim 1, comprising:
at least one compound selected from compounds represented by the following General Formula (III) as the compound represented by General Formula (I):

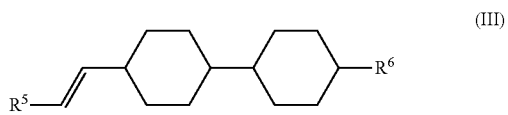
(III)

wherein $R^5$ represents a hydrogen atom or a methyl group, and $R^6$ represents an alkyl group having 1 to 5 carbon atoms, an alkenyl group having 2 to 5 carbon atoms, or an alkoxy group having 1 to 4 carbon atoms.

4. The liquid-crystal display element according to claim 1, comprising:
one or more compounds represented by the following General Formula (IV):

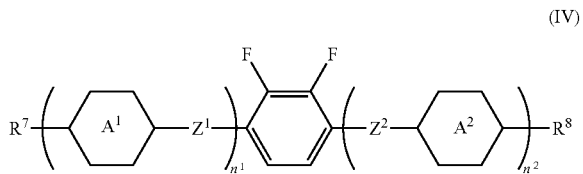
(IV)

wherein each of $R^7$ and $R^8$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, any methylene group in the alkyl group, the alkenyl group, the alkoxy group, or the alkenyloxy group may be substituted with an oxygen atom as long as the oxygen atom is not continuously bonded to another oxygen atom or may be substituted with a carbonyl group as long as the carbonyl group is not continuously bonded to another carbonyl group, each of $A^1$ and $A^1$ independently represents a 1,4-cyclohexylene group, a 1,4-phenylene group, or a tetrahydropyran-2,5-diyl group, in a case where $A^1$ or/and $A^1$ represent a 1,4-phenylene group, one or more hydrogen atoms in the 1,4-phenylene group may be substituted with a fluorine atom, each of $Z^1$ and $Z^2$ independently represents a single bond, —OCH$_2$—, —$OCF_2$—, —$CH_2O$—, or $CF_2O$—, each of $n^1$ and $n^2$ independently represents 0, 1, 2, or 3, $n^1+n^2$ is 1 to 3, and in a case where a plurality of $A^1$'s, $A^2$'s, $Z^1$'s, and/or $Z^2$'s are present, these may be the same as or different from each other, with the proviso that a compound in which $n^1$ is 1 or 2, $n^2$ is 0, at least one of $A^1$'s is a 1,4-cyclohexylene group, and all $Z^1$'s are single bonds is excluded.

5. The liquid-crystal composition according to claim 4, comprising:
at least one compound selected from compounds represented by each of the following General Formula (IVa1) and the following General Formula (IVa2) as the compound represented by General Formula (IV):

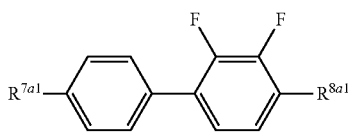

(IVa1)

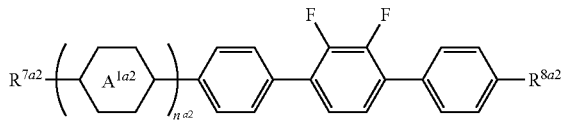

(IVa2)

wherein each of $R^{7a1}$, $R^{7a2}$, $R^{8a1}$, and $R^{8a2}$ independently represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms in the alkyl group, the alkenyl group, the alkoxy group, or the alkenyloxy group may be substituted with a fluorine atom, any methylene group in the alkyl group, the alkenyl group, the alkoxy group, or the alkenyloxy group may be substituted with an oxygen atom as long as the oxygen atom is not continuously bonded to another oxygen atom or may be substituted with a carbonyl group as long as the carbonyl group is not continuously bonded to another carbonyl group, $n^{a2}$ represents 0 or 1, $A^{1a2}$ represents a 1,4-cyclohexylene group, a 1,4-phenylene group, or a tetrahydropyran-2,5-diyl group, and one or more hydrogen atoms in the 1,4-phenylene group of General Formulas (IVa1) and (IVa2) may be substituted with a fluorine atom.

6. The liquid-crystal display element according to claim 1, wherein the photo-alignment film is at least one selected from the group consisting of a photoresponsive decomposition type polymer, a photoresponsive dimerization type polymer, and a photoresponsive isomerization type polymer.

* * * * *